(12) United States Patent
Yamamoto et al.

(10) Patent No.: US 11,421,636 B2
(45) Date of Patent: Aug. 23, 2022

(54) FUEL INJECTION VALVE

(71) Applicant: DENSO CORPORATION, Kariya (JP)

(72) Inventors: Shinsuke Yamamoto, Kariya (JP);
Kouichi Mochizuki, Kariya (JP);
Atsuya Okamoto, Kariya (JP); Yuki Watanabe, Kariya (JP); Tohru Sekido, Kariya (JP)

(73) Assignee: DENSO CORPORATION, Kariya (JP)

( * ) Notice: Subject to any disclaimer, the term of this patent is extended or adjusted under 35 U.S.C. 154(b) by 133 days.

(21) Appl. No.: 16/830,826

(22) Filed: Mar. 26, 2020

(65) Prior Publication Data
US 2020/0224622 A1    Jul. 16, 2020

Related U.S. Application Data

(63) Continuation of application No. PCT/JP2018/034652, filed on Sep. 19, 2018.

(30) Foreign Application Priority Data

Sep. 29, 2017 (JP) ............................. JP2017-189886
Sep. 11, 2018 (JP) ............................. JP2018-169995

(51) Int. Cl.
*F02M 51/06*    (2006.01)
*F16K 31/06*    (2006.01)

(52) U.S. Cl.
CPC ..... *F02M 51/0682* (2013.01); *F02M 2200/50* (2013.01); *F16K 31/0655* (2013.01)

(58) Field of Classification Search
CPC ............ F02M 51/0675; F02M 51/0682; F16K 31/0655

(Continued)

(56) References Cited

U.S. PATENT DOCUMENTS 6,422,488 B1 * 7/2002 Fochtman .......... F02M 51/0664
                                                    239/585.5
2012/0080542 A1    4/2012 Imai
(Continued)

FOREIGN PATENT DOCUMENTS

JP    2006-322430    11/2006
JP    2013-104340     5/2013
(Continued)

OTHER PUBLICATIONS

U.S. Appl. No. 16/830,780, filed Mar. 26, 2020 to Yamamoto, et al., entitled "Fuel Injection Valve" (108 pages).

(Continued)

*Primary Examiner* — Seth W. Mackay-Smith
(74) *Attorney, Agent, or Firm* — Nixon & Vanderhye P.C.

(57) ABSTRACT

A fuel injection valve includes a valve body, a fixed core, a movable core, a spring, and a cup. The spring is elastically deformed according to valve opening operation of the valve body, and exerts a valve closing elastic force for closing the valve body. The cup contacts a valve closing contact surface of the valve body, and transmits the valve closing elastic force to the valve body. At a start of predetermined-distance movement of the movable core together with the cup, the cup is in contact with the valve closing contact surface, and the valve body or the cup has a supply flow channel through which fuel is supplied to the valve body closing contact surface which is in a state contacting the cup.

11 Claims, 35 Drawing Sheets

(58) Field of Classification Search
USPC .................................................. 251/129.15
See application file for complete search history.

(56) References Cited

U.S. PATENT DOCUMENTS

| | | |
|---|---|---|
| 2014/0131483 A1 | 5/2014 | Adachi |
| 2016/0097358 A1 | 4/2016 | Miyake et al. |
| 2018/0080420 A1* | 3/2018 | Yamamoto ......... F02M 51/0671 |
| 2018/0238282 A1* | 8/2018 | Yamamoto ......... F02M 51/0685 |
| 2018/0245557 A1* | 8/2018 | Oikawa .............. F02M 51/0653 |

FOREIGN PATENT DOCUMENTS

| | | |
|---|---|---|
| JP | 2015-232334 | 12/2015 |
| JP | 2017-053253 | 3/2017 |
| JP | 2017053253 A * | 3/2017 |
| WO | 2016/004869 | 1/2016 |
| WO | 2019/065406 | 4/2019 |
| WO | 2019/065408 | 4/2019 |
| WO | 2019/065412 | 4/2019 |
| WO | 2019/065414 | 4/2019 |

OTHER PUBLICATIONS

U.S. Appl. No. 16/830,812, filed Mar. 26, 2020 to Yamamoto, et al., entitled "Fuel Injection Valve"(108 pages).

U.S. Appl. No. 16/830,839, filed Mar. 26, 2020 to Mochizuki, et al., entitled "Fuel Injection Valve"(112 pages).

* cited by examiner

VALVE CLOSED

FUEL INJECTION VALVE

CROSS REFERENCE TO RELATED APPLICATIONS

The present application is a continuation application of International Patent Application No. PCT/JP2018/034652 filed on Sep. 19, 2018, which designated the U.S. and claims the benefit of priority from Japanese Patent Application No. 2017-189886 filed on Sep. 29, 2017, and Japanese Patent Application No. 2018-169995 filed on Sep. 11, 2018. The entire disclosures of all of the above applications are incorporated herein by reference.

TECHNICAL FIELD

The present disclosure relates to a fuel injection valve that injects fuel.

BACKGROUND

A conventional fuel injection valve includes a fixed core that generates a magnetic attraction force upon energization of a coil, a movable core that is attracted and moved by the fixed core, and a valve body that is actuated by the moving movable core to open the valve such that fuel is jetted from a nozzle hole. In recent years, fuel pressure becomes high, and a valve closing force urging the valve body tends to increase. Hence, a large valve opening force is required in order to open the valve against the large valve closing force.

SUMMARY

According to at least one embodiment of the present disclosure, a fuel injection valve includes: a valve body that opens and closes a nozzle hole for injecting a fuel; a fixed core that generates a magnetic attraction force upon energization of a coil; a movable core that is attracted and moved by the fixed core, the movable core coming into contact with a valve opening contact surface of the valve body when the movable core is moved by a predetermined distance to cause the valve body to start a valve opening operation; a spring member that is elastically deformed by the valve opening operation of the valve body and exerts a valve closing elastic force that causes the valve body to perform a valve closing operation; and a valve closing force transmission member that transmits the valve closing elastic force to the valve body by contacting a valve closing contact surface of the valve body. The valve closing force transmission member is in contact with the valve closing contact surface at a start of the predetermined-distance movement of the movable core together with the valve closing force transmission member. The valve closing force transmission member or the valve body has a supply flow channel that supplies the fuel to the valve closing contact surface which is in a state contacting the valve closing force transmission member.

BRIEF DESCRIPTION OF DRAWINGS

The details of one or more embodiments are set forth in the accompanying drawings and the description below. Other features and advantages will be apparent from the description and drawings, and from the claims.

DETAILED DESCRIPTION

Figure 1:
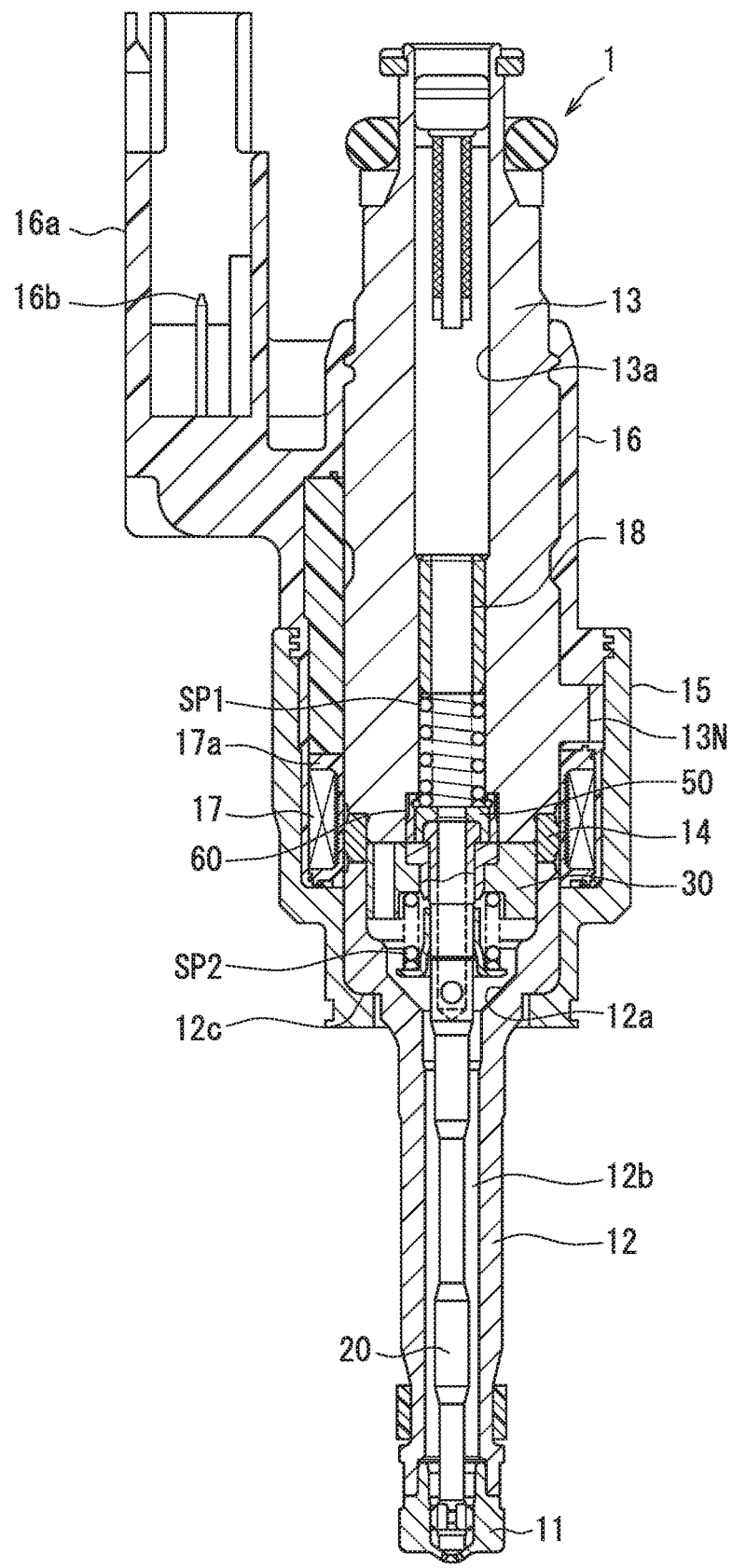
FIG. 1 is a sectional view of a fuel injection valve according to a first embodiment.

A general fuel injection valve includes a fixed core that generates a magnetic attraction force upon energization of a coil, a movable core that is attracted and moved by the fixed core, and a valve body that is actuated by the moving movable core to open the valve such that fuel is jetted from a nozzle hole. In recent years, fuel pressure becomes high, and a valve closing force urging the valve body tends to increase. Hence, a large valve opening force is required in order to open the valve against the large valve closing force.

As a countermeasure against the above, a core boost structure may be proposed as a comparative example. That is, for the valve opening operation of the valve body, first, movement of the movable core is started in a state in which the movable core is not engaged with the valve body. And thereafter, when the movable core is moved by a predetermined distance, the movable core is brought into contact with the valve body to start the valve opening operation.

According to the core boost structure described above, since the movable core is not yet engaged with the valve body immediately after a start of energization, the movable core which is not subjected to a force of a fuel pressure can quickly raise a moving speed of the movable core by an initial small magnetomotive force. Then, since the movable core comes into contact with the valve body and starts the valve opening operation when the moving speed becomes sufficiently high, that is, when the movable core is moved by the predetermined distance, the valve opening operation can be performed by the aid of a collision force of the movable core in addition to a magnetic attraction force. Therefore, the valve opening operation of the valve body can be performed even when the fuel pressure is high. Further, magnetic attraction force required for opening the valve can be reduced.

However, in the core boost structure described above, the movable core moves in two stages: a movement from the start of the energization to the contact with the valve body; and a subsequent movement while keeping contact with the valve body. For that reason, variation in time period from the start of the energization to the start of the valve opening operation is directly linked to variation in amount of injected fuel in one valve opening operation. Further, not only such variation in time period from the start of energization to opening of the valve, but also variation in time period from an end of the energization to closure of the valve can be considered.

In contrast to the comparative example, according to one aspect of the present disclosure, a fuel injection valve includes: a valve body that opens and closes a nozzle hole for injecting a fuel; a fixed core that generates a magnetic attraction force upon energization of a coil; a movable core that is attracted and moved by the fixed core, the movable core coming into contact with a valve opening contact surface of the valve body when the movable core is moved by a predetermined distance to cause the valve body to start a valve opening operation; a spring member that is elastically deformed by the valve opening operation of the valve body and exerts a valve closing elastic force that causes the valve body to perform a valve closing operation; and a valve closing force transmission member that transmits the valve closing elastic force to the valve body by contacting a valve closing contact surface of the valve body. The valve closing force transmission member is in contact with the valve closing contact surface at a start of the predetermined-distance movement of the movable core together with the valve closing force transmission member. The valve closing force transmission member or the valve body has a supply flow channel that supplies the fuel to the valve closing contact surface which is in a state contacting the valve closing force transmission member.

In a core boost structure in which the valve closing force transmission member is in contact with the valve body at a start of the predetermined-distance movement of the movable core together with the valve closing force transmission member due to a start of the energization of the coil, the following concerns arise. That is, if the valve closing force transmission member and the valve body are in tight contact with each other, a phenomenon (i.e., linking phenomenon) in which the valve closing force transmission member is hardly separated from the valve body may occur. As a result, the start of the predetermined-distance movement of the movable core may be delayed, and the valve opening response may be deteriorated.

In order to cope with the above concern, the present embodiment has the supply flow channel for supplying the fuel to the valve closing contact surface which is in contact with the valve closing force transmission member. Therefore, when the movable core starts to move by a predetermined distance, the fuel is supplied to the valve closing contact surface which is in contact with the valve closing force transmission member. Thus, the valve closing force transmission member can be inhibited from coming into tight contact with the valve body and becoming difficult to be separated from the valve body. The delay of the start of the predetermined-distance movement of the movable core due to the above-mentioned force of tight contact can be reduced. Therefore, a valve opening response time from the start of energization of the coil to the start of the opening of the valve body can be shortened, and thus valve opening response can be improved. In addition, variation in valve opening timing due to interference of the movement of the movable core can be reduced, and variation in fuel injection amount can be reduced.

Hereinafter, multiple embodiments for implementing the present disclosure will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A fuel injection valve 1 shown in FIG. 1 is attached to a cylinder head or a cylinder block of an ignition type internal combustion engine mounted on a vehicle. A gasoline fuel accumulated in a vehicle-mounted fuel tank is pressurized by a fuel pump (not shown) and supplied to a fuel injection valve 1, and the supplied high-pressure fuel is directly injected into a combustion chamber of the internal combustion engine from nozzle holes 11a provided in the fuel injection valve 1.

The fuel injection valve 1 includes a nozzle hole body 11, a main body 12, a fixed core 13, a non-magnetic member 14, a coil 17, a support member 18, a first spring member SP1, a second spring member SP2, a needle 20, a movable core 30, a sleeve 40, a cup 50, a guide member 60, and the like. The nozzle hole body 11, the main body 12, the fixed core 13, the support member 18, the needle 20, the movable core 30, the sleeve 40, the cup 50, and the guide member 60 are made of metal.

Figure 2:
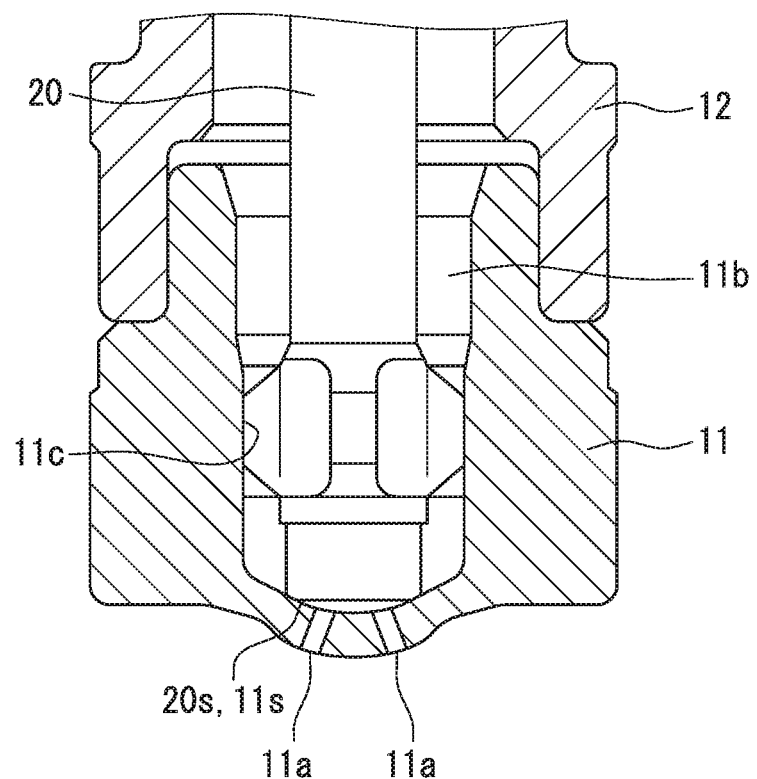
FIG. 2 is an enlarged view of a nozzle hole portion of FIG. 1.

As shown in FIG. 2, the nozzle hole body 11 has the multiple nozzle holes 11a for injecting a fuel. The needle 20 is located inside the nozzle hole body 11, and a flow channel 11b for allowing a high-pressure fuel to flow to the nozzle holes 11a is provided between an outer peripheral surface of the needle 20 and an inner peripheral surface of the nozzle hole body 11. A body-side seat 11s on which a valve body-side seat 20s formed on the needle 20 is separated and seated is formed on the inner peripheral surface of the nozzle hole body 11. The valve body-side seat 20s and the body-side seat 11s are shaped to extend annularly around an axis line C of the needle 20. When the needle 20 is separated and seated on the body-side seat 11s, the flow channel 11b is opened and closed, and the nozzle holes 11a are opened and closed.

The main body 12 and the non-magnetic member 14 are cylindrical in shape. A cylindrical end portion of the main body 12, which is closer to the nozzle holes 11a with respect to the main body 12 (on a nozzle hole side), is fixed to the nozzle hole body 11 by welding. A cylindrical end portion of the main body 12 on a side facing away from the nozzle holes 11a with respect to the main body 12 (on a side opposite to the nozzle holes), is fixed to a cylindrical end portion of the non-magnetic member 14 by welding. A cylindrical end portion of the non-magnetic member 14 on the side opposite to the nozzle hole is fixed to the fixed core 13 by welding.

A nut member 15 is fastened to a threaded portion 13N of the fixed core 13 in a state of being locked to a locking portion 12c of the main body 12. An axial force generated by the fastening generates a surface pressure pressing the nut member 15, the main body 12, the non-magnetic member 14, and the fixed core 13 against each other in a direction of the axis line C (in a vertical direction in FIG. 1). Instead of generating such a surface pressure by fastening screws, the surface pressure may be generated by press-fitting.

Figure 9:
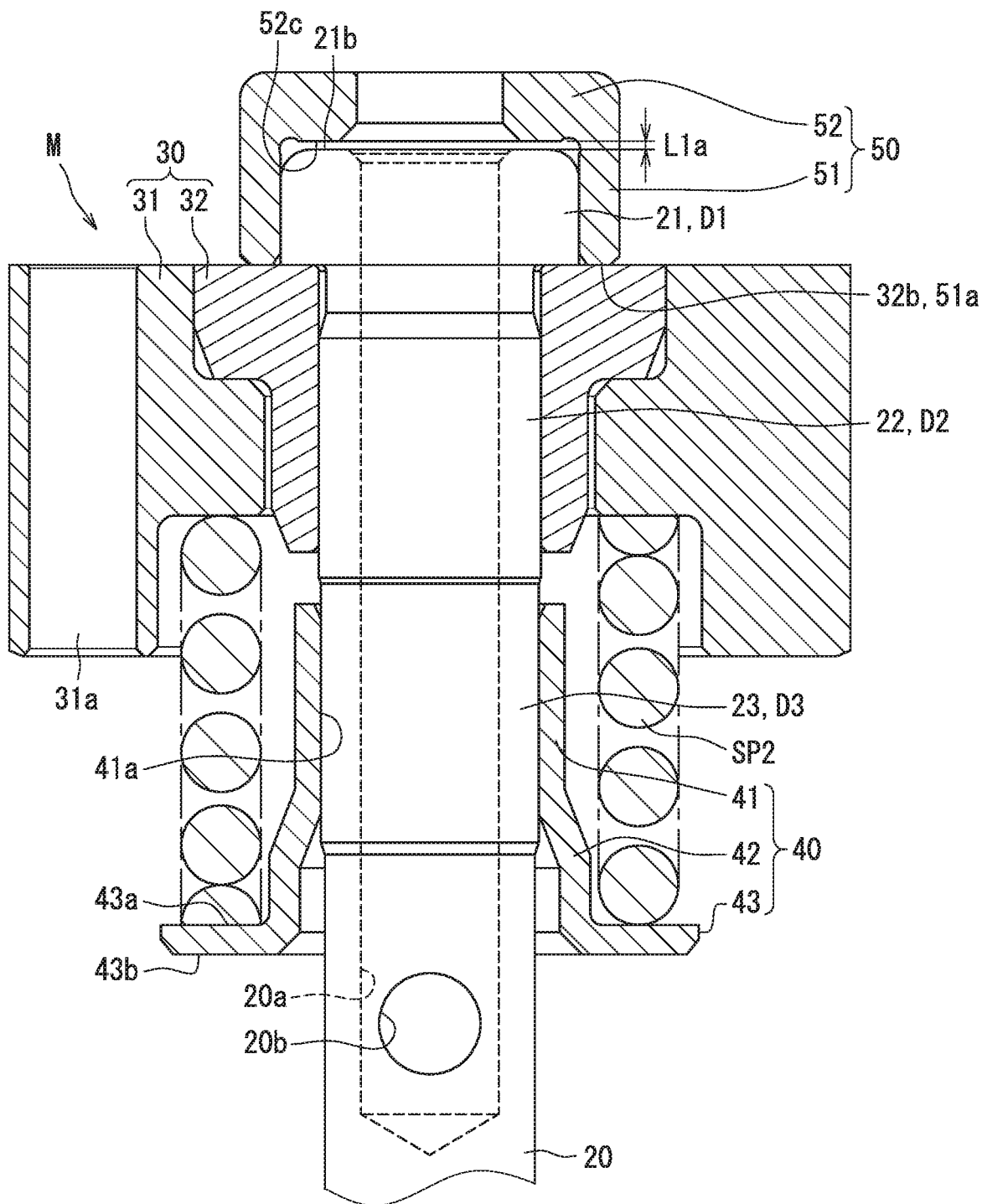
FIG. 9 is a sectional view of the movable portion showing a state in which a first press-fitting of FIG. 6 has been completed.
Figure 10:
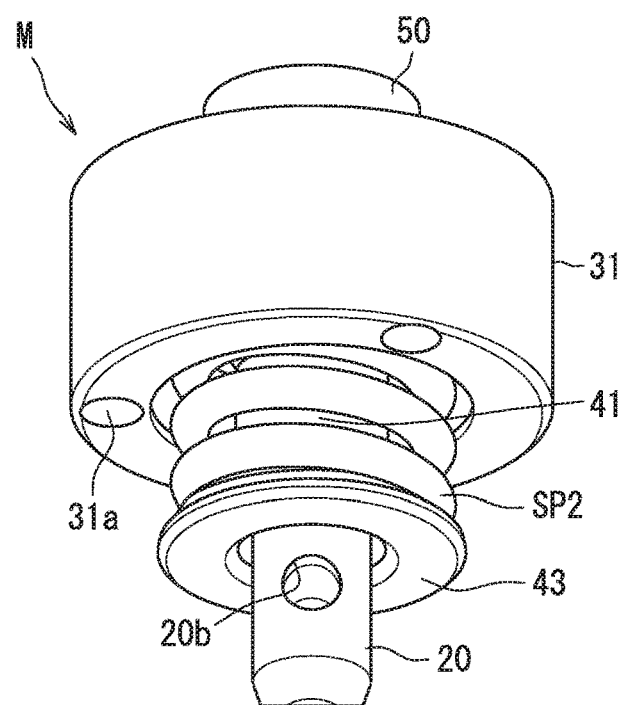
FIG. 10 is a perspective view of FIG. 9.

The main body 12 is made of a magnetic material such as stainless steel, and has a flow channel 12b for allowing the fuel to flow in the nozzle holes 11a inside. In the flow channel 12b, the needle 20 is accommodated so as to be movable in the direction of the axis line C. The main body 12 and the non-magnetic member 14 correspond to a "holder" having a movable chamber 12a filled with the fuel. A movable portion M (refer to FIGS. 9 and 10) which is an assembly in which the needle 20, the movable core 30, the second spring member SP2, the sleeve 40, and the cup 50 are assembled together is movably accommodated in the movable chamber 12a. A gap L1a shown in FIG. 9 indicates a size of a gap between a valve closing contact surface 21b and a valve closing force transmission contact surface 52c in the direction of the axis line C. The size of the gap L1a is the same as a gap L1 shown in a column (a) of FIG. 4.

The flow channel 12b is shaped to communicate with a downstream side of the movable chamber 12a and extend in the direction of the axis line C. A center line of the flow channel 12b and the movable chamber 12a coincides with a cylindrical center line (axis line C) of the main body 12. A nozzle hole side portion of the needle 20 is slidably supported by an inner wall surface 11c of the nozzle hole body 11, and a portion of the needle 20 on a side opposite to the nozzle holes is slidably supported by an inner wall surface 51b of the cup 50 (refer to FIGS. 8 and 12). Two positions of an upstream end portion and a downstream end portion of the needle 20 are slidably supported in this manner, whereby the movement of the needle 20 in a radial direction is limited, and the inclination of the needle 20 relative to the axis line C of the main body 12 is limited.

The needle 20 corresponds to a "valve body" that opens and closes the nozzle holes 11a, and is made of a magnetic material such as stainless steel, and has a shape extending in the direction of the axis line C. The valve body-side seat 20s described above is formed on a downstream-side end face of the needle 20. When the needle 20 moves to the downstream side in the direction of the axis line C (valve closing operation), the valve body-side seat 20s is seated on the body-side seat 11s to close the flow channel 11b and the nozzle holes 11a. When the needle 20 moves to the upstream side in the direction of the axis line C (valve opening operation), the valve body-side seat 20s is separated from the body-side seat 11s to open the flow channel 11b and the nozzle holes 11a.

Figure 3:
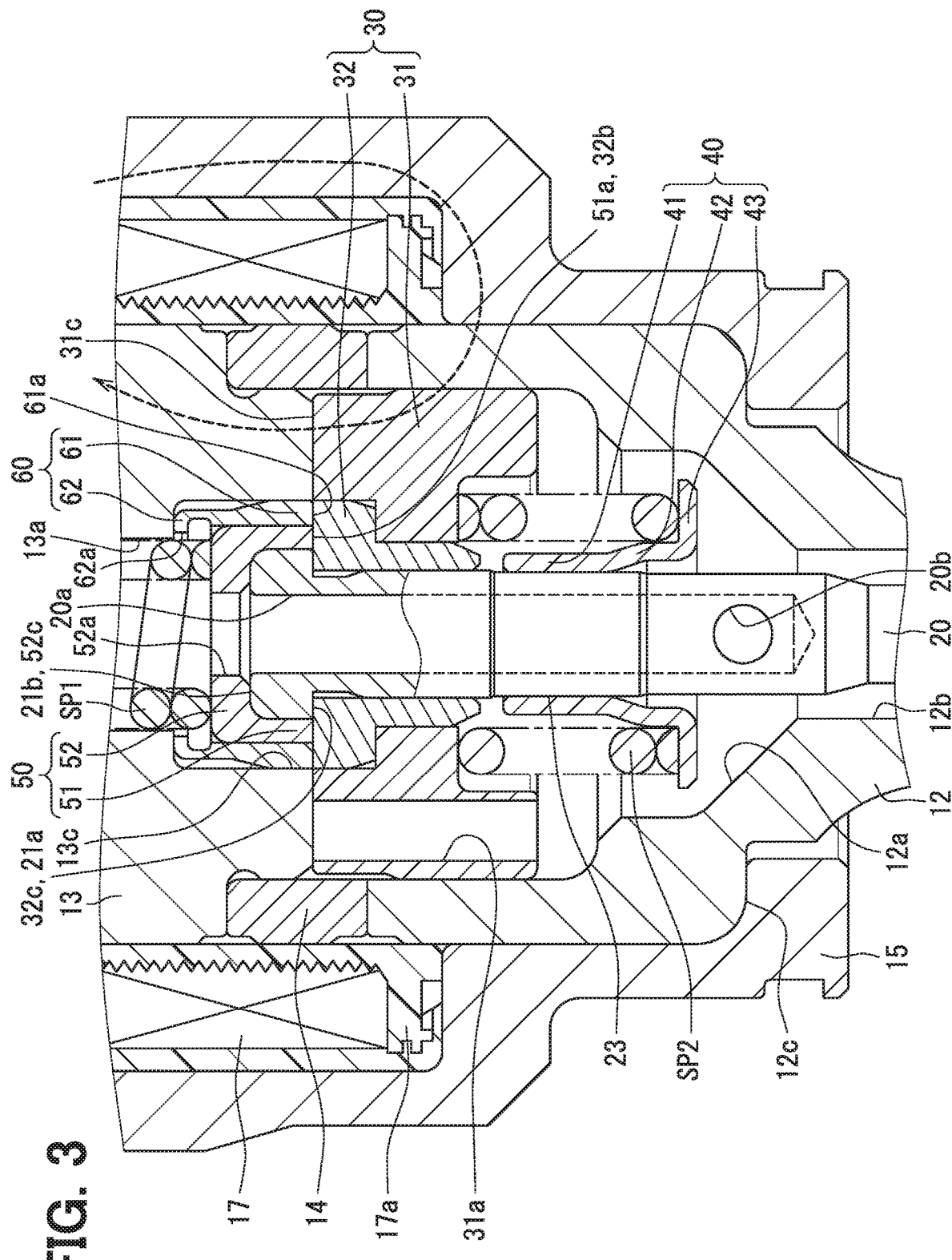
FIG. 3 is an enlarged view of a movable core portion of FIG. 1.

The needle 20 has an internal passage 20a and lateral holes 20b for allowing the fuel to flow through the nozzle holes 11a (refer to FIG. 3). The multiple lateral holes 20b are provided in a circumferential direction. The multiple lateral holes 20b are provided at regular intervals in the circumferential direction. The internal passage 20a has a shape extending in the direction of the axis line C of the needle 20. An inflow port is provided at an upstream end of the internal passage 20a, and the lateral holes 20b are connected to a downstream end of the internal passage 20a. The lateral holes 20b extend in a direction crossing the direction of the axis line C and communicate with the movable chamber 12a.

Figure 7:
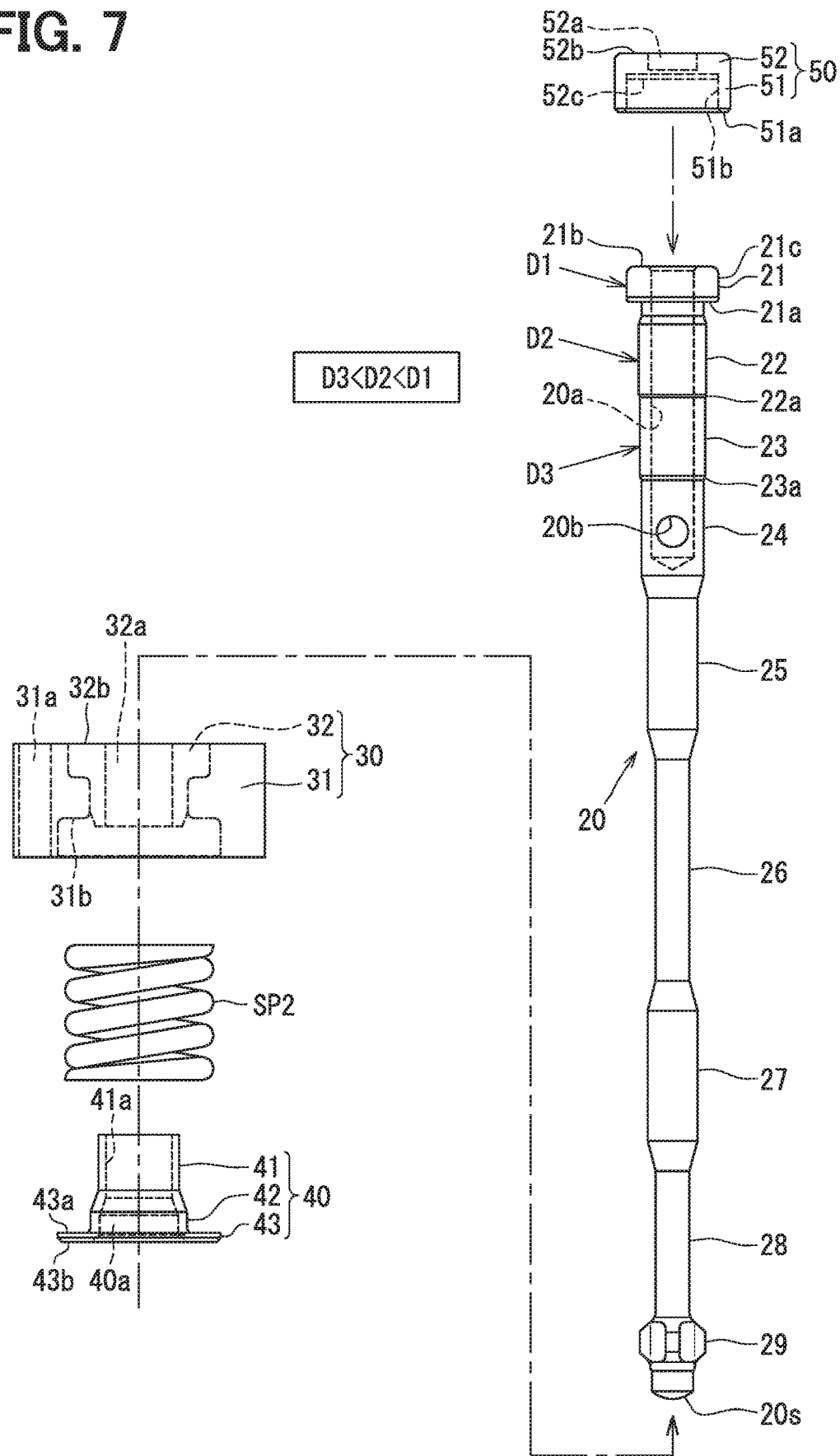
FIG. 7 is an exploded view of a movable portion according to the first embodiment.

As shown in FIG. 7, the needle 20 has a contact portion 21, a core sliding portion 22, a press-fit portion 23, an outflow portion 24, a first large diameter portion 25, a first small diameter portion 26, a second large diameter portion 27, a second small diameter portion 28, and a nozzle hole-side support portion 29 in a stated order from the opposite side (upper end side) to the lower end side of the valve body-side seat 20s. The contact portion 21 has the valve closing contact surface 21b contacting the valve closing force transmission contact surface 52c of the cup 50.

The cup 50 is slidably assembled to the contact portion 21, and an outer peripheral surface of the contact portion 21 slides with an inner peripheral surface of the cup 50. The movable core 30 is slidably assembled to the core sliding portion 22, and an outer peripheral surface of the core sliding portion 22 slides with an inner peripheral surface of the movable core 30. A sleeve 40 is press-fitted into the press-fit portion 23. The lateral holes 20b are provided in the outflow portion 24.

An outer diameter D1 of the contact portion 21 is set to be larger than an outer diameter D2 of the core sliding portion 22, the outer diameter D2 of the core sliding portion 22 is set to be larger than an outer diameter D3 of the press-fit portion 23, and the outer diameter D3 of the press-fit portion 23 is set to be larger than an outer diameter of the outflow portion 24. A connection part 22a between the core sliding portion 22 and the press-fit portion 23 and a connection portion 23a between the press-fit portion 23 and the outflow portion 24 are each formed in a tapered shape. A diameter of an inner peripheral surface 41a of the sleeve 40 in a state before press-fitting is set to be smaller than the outer diameter D3 of the press-fit portion 23, and press-fitting can be performed.

The outer diameters of the first large diameter portion 25 and the second large diameter portion 27 are larger than the outer diameters of the first small diameter portion 26 and the second small diameter portion 28. The weight reduction is achieved by having the first small diameter portion 26 and the second small diameter portion 28. The first large diameter portion 25 and the second large diameter portion 27 function as a support portion when the needle 20 is cut. The second small diameter portion 28 functions as an escape portion so that a cutting tool does not interfere with cutting of the nozzle hole-side support portion 29. The nozzle hole-side support portion 29 is slidably supported by the inner wall surface 11c of the nozzle hole body 11.

The cup 50 has a circular plate portion 52 having a circular plate shape and a cylindrical portion 51 having a cylindrical shape. The circular plate portion 52 has a through hole 52a penetrating in the direction of the axis line C. A surface of the circular plate portion 52 on a side opposite to the nozzle holes functions as a spring contact surface 52b that contacts the first spring member SP1. A surface of the circular plate portion 52 on a nozzle hole side functions as a valve closing force transmission contact surface 52c that contacts the needle 20 and transmits a first elastic force (a valve closing elastic force). The circular plate portion 52 corresponds to a "valve body transmission portion" that contacts the first spring member SP1 and the needle 20 to transmit the first elastic force to the needle 20. The cylindrical portion 51 has a cylindrical shape extending from an outer peripheral end of the circular plate portion 52 to the nozzle hole side. A nozzle hole-side end face of the cylindrical portion 51 functions as a core contact end face 51a that contacts the movable core 30. The inner wall surface 51b of the cylindrical portion 51 slides with the outer peripheral surface of the contact portion 21 of the needle 20.

The fixed core 13 is made of a magnetic material such as stainless steel, and has a flow channel 13a for allowing the fuel to flow through the nozzle holes 11a. The flow channel 13a communicates with the internal passage 20a provided inside the needle 20 (refer to FIG. 3) and an upstream side of the movable chamber 12a, and extends in the direction of the axis line C. The flow channel 13a accommodates the guide member 60, the first spring member SP1, and the support member 18.

The support member 18 has a cylindrical shape and is press-fitted into an inner wall surface of the fixed core 13. The first spring member SP1 is a coiled spring disposed on the downstream side of the support member 18, and elastically deforms in the direction of the axis line C. An upstream-side end face of the first spring member SP1 is supported by the support member 18, and a downstream-side end face of the first spring member SP1 is supported by the cup 50. A force generated by the elastic deformation of the first spring member SP1 (a first elastic force) urges the cup 50 toward the downstream side. The degree of press-fitting of the support member 18 in the direction of the axis line C is adjusted, to thereby adjust a magnitude of the elastic force for urging the cup 50 (first set load).

As shown in FIG. 3, the guide member 60 has a cylindrical shape made of a magnetic material such as stainless steel, and is press-fitted into an enlarged diameter portion 13c formed in the fixed core 13. The enlarged diameter portion 13c has a shape in which the flow channel 13a is enlarged in the radial direction. The guide member 60 has a circular plate portion 62 having a circular plate shape and a cylindrical portion 61 having a cylindrical shape. The circular plate portion 62 has a through hole 62a penetrating in the direction of the axis line C. A surface of the circular plate portion 62 on the side opposite to the nozzle holes contacts an inner wall surface of the enlarged diameter portion 13c. The cylindrical portion 61 has a cylindrical shape extending from the outer peripheral end of the circular plate portion 62 to the nozzle hole side. A nozzle hole-side end face of the cylindrical portion 61 functions as a stopper contact end face 61a that contacts the movable core 30. An inner wall surface of the cylindrical portion 61 forms a sliding surface 61b that slides with an outer peripheral surface 51d of the cylindrical portion 51 of the cup 50 (refer to FIG. 12).

In short, the guide member 60 has a guide function of sliding the outer peripheral surface of the cup 50 moving in the direction of the axis line C, and a stopper function of contacting the movable core 30 moving in the direction of the axis line C and restricting the movable core 30 from moving to the side opposite to the nozzle holes. In other words, the guide member 60 corresponds to a "stopper member" that contacts the movable core 30 and restricts the movable core 30 from moving away from the nozzle holes 11a.

A resin member 16 is provided on an outer peripheral surface of the fixed core 13. The resin member 16 has a connector housing 16a, and a terminal 16b is accommodated in the connector housing 16a. The terminal 16b is electrically connected to the coil 17. An external connector (not shown) is connected to the connector housing 16a, and an electric power is supplied to the coil 17 through the terminal 16b. The coil 17 is wound around a bobbin 17a having an electrical insulation property to form a cylindrical shape, and is disposed on a radially outer side of the fixed core 13, the non-magnetic member 14, and the movable core 30. The fixed core 13, the nut member 15, the main body 12, and the movable core 30 form a magnetic circuit for flowing a magnetic flux generated accompanying a power supply (energization) to the coil 17 (refer to a dotted arrow in FIG. 3).

As shown in FIG. 3, the movable core 30 is disposed on the nozzle hole side with respect to the fixed core 13, and is accommodated in the movable chamber 12a in a state of being movable in the direction of the axis line C. The movable core 30 has an outer core 31 and an inner core 32. The outer core 31 has a cylindrical shape made of a magnetic material such as stainless steel, and the inner core 32 has a cylindrical shape made of a nonmagnetic material such as stainless steel having a magnetic property. The outer core 31 is press-fitted into an outer peripheral surface of the inner core 32.

The needle 20 is inserted into a cylindrical inner portion of the inner core 32. The inner core 32 is assembled to the needle 20 so as to be slidable relative to the needle 20 in the axis line C. A gap (inner gap) between an inner peripheral surface of the inner core 32 and an outer peripheral surface of the needle 20 is set to be smaller than a gap (outer gap) between an outer peripheral surface of the outer core 31 and an inner peripheral surface of the main body 12. Those gaps are set so that the outer core 31 does not contact the main body 12 while allowing the inner core 32 to contact the needle 20.

The inner core 32 contacts the guide member 60 as a stopper member, the cup 50, and the needle 20. For that reason, a material having a higher hardness than that of the outer core 31 is used for the inner core 32. The outer core 31 has a movable core facing surface 31c facing the fixed core 13, and a gap is provided between the movable core facing surface 31c and the fixed core 13. Therefore, in a state in which a magnetic flux flows by energizing the coil 17 as described above, a magnetic attraction force attracted to the fixed core 13 acts on the outer core 31 by provision of the gap.

The sleeve 40 corresponds to a "fixed member" that is press-fitted into the needle 20. The sleeve 40 is made of a cylindrical metal having a through hole 40a (refer to FIG. 7), and has an insertion cylindrical portion 41, a connection portion 42, and a support portion 43. The insertion cylindrical portion 41 has a cylindrical shape, and is press-fitted into the press-fit portion 23 of the needle 20. The connection portion 42 has a cylindrical shape in which the insertion cylindrical portion 41 is enlarged in the radial direction, and connects the insertion cylindrical portion 41 and the support portion 43. The connection portion 42 guides the second spring member SP2 to reduce a positional deviation of the second spring member SP2 in the radial direction. The support portion 43 has an annular flange shape extending toward the radially outer side from the nozzle hole side end portion of the connection portion 42. In other words, the support portion 43 has a plate shape extending toward the radially outer side from the nozzle hole side end portion of the connection portion 42, and has an annular shape extending around the axis line C. A surface of the support portion 43 on the side opposite to the nozzle hole functions as a support surface 43a for supporting the nozzle hole-side end face of the second spring member SP2.

The second spring member SP2 is a coiled spring disposed on the side opposite to the nozzle holes with respect to the support portion 43, and is elastically deformed in the direction of the axis line C. An end face of the second spring member SP2 on the side opposite to the nozzle hole is supported by the movable core 30, specifically, the outer core 31. A nozzle hole-side end face of the second spring member SP2 is supported by the support portion 43. The force generated by the elastic deformation of the second spring member SP2 (the second elastic force) urges the outer core 31 toward the side opposite to the nozzle holes. With adjustment of the degree of press-fitting of the insertion cylindrical portion 41 in the direction of the axis line C, a magnitude of the second elastic force for urging the movable core 30 (a second set load) at the time of closing the valve is adjusted. The second set load related to the second spring member SP2 is smaller than the first set load related to the first spring member SP1. Further, not only when the valve is closed, but also when the movable core 30 is urged in another situation, the magnitude of the second elastic force may be set as the second set load adjusted by the degree of press-fitting.

<Description of Operation>

Next, the operation of the fuel injection valve 1 will be described with reference to FIGS. 4 and 5.

Figure 4:
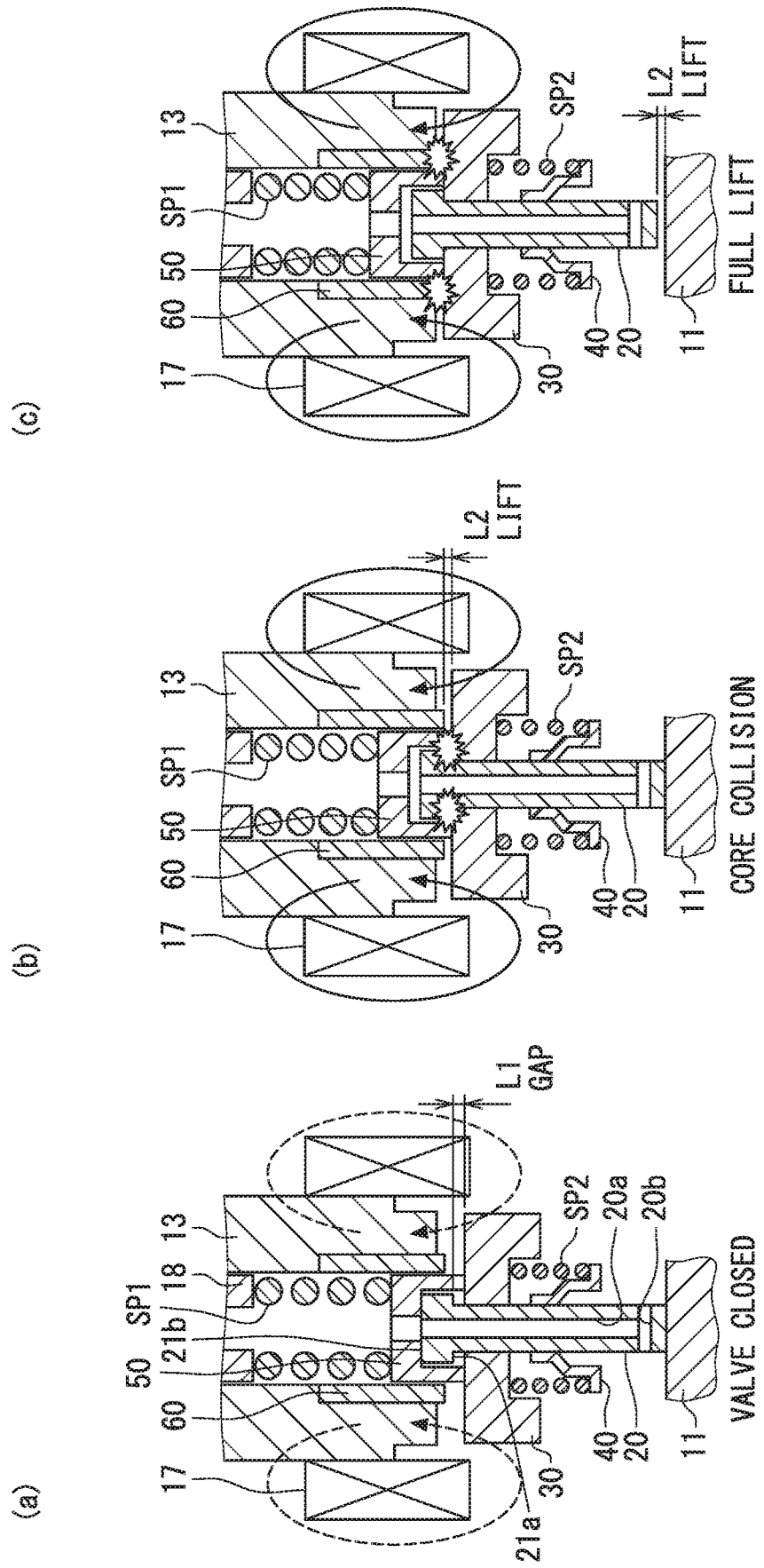
FIG. 4 is a schematic diagram showing the operation of the fuel injection valve according to the first embodiment, in which (a) in FIG. 4 shows a valve closed state, (b) in FIG. 4 shows a state in which a movable core moving by a magnetic attraction force collides with a valve body, and (c) in FIG. 4 shows a state in which the movable core moving further by the magnetic attraction force collides with a guide member.
Figure 5:
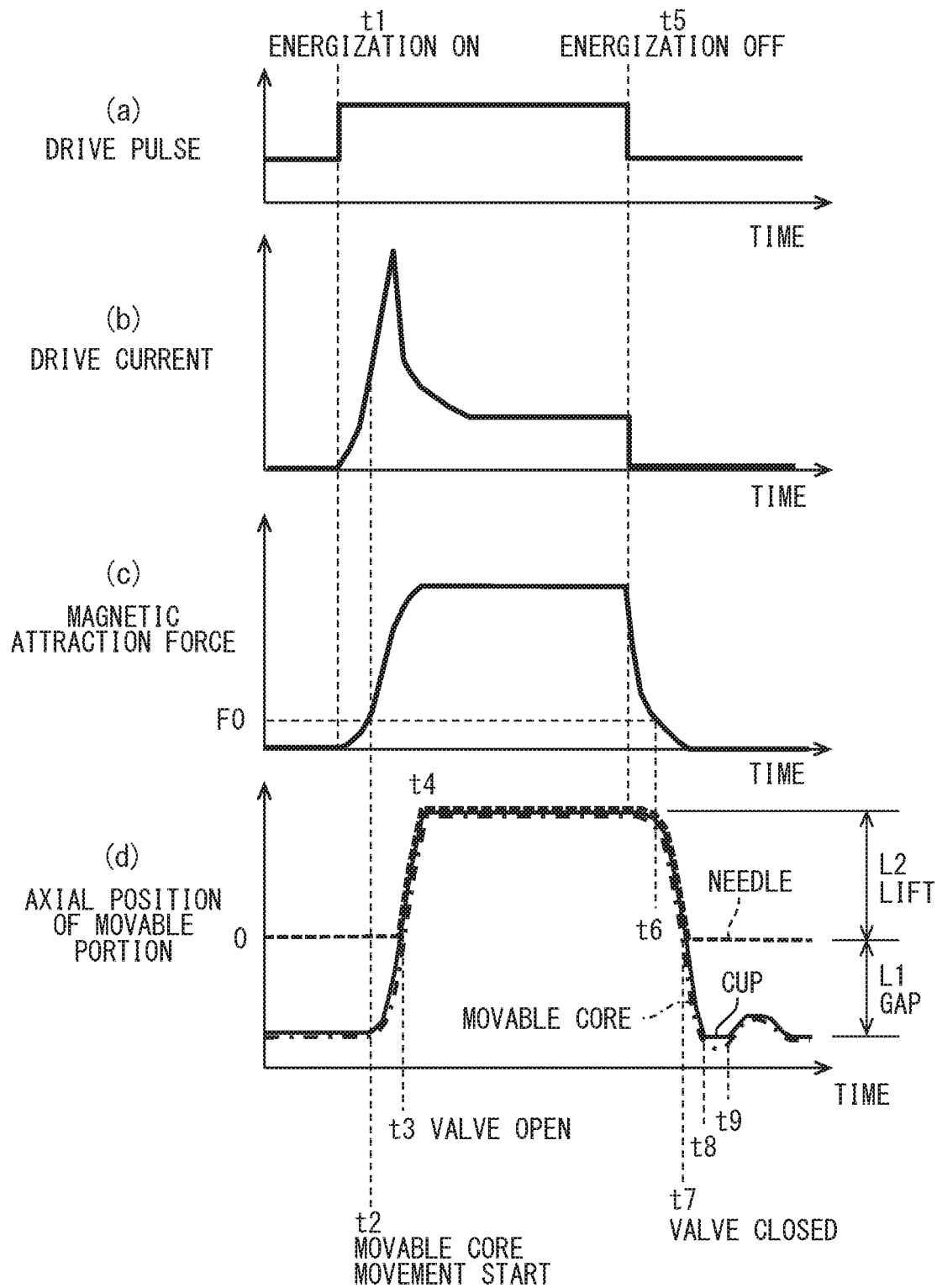
FIG. 5 is a time chart showing the operation of the fuel injection valve according to the first embodiment, in which (a) in FIG. 5 shows a change of a drive pulse, (b) in FIG. 5 shows a change of a drive current, (c) in FIG. 5 shows a change of a magnetic attraction force, and (d) in FIG. 5 shows the behavior of a movable portion.

As shown in a column (a) of FIG. 4, in a state in which the coil 17 is de-energized, no magnetic attraction force is generated, so that the magnetic attraction force urged toward the valve opening side does not act on the movable core 30. The cup 50 urged toward the valve closing side by the first elastic force generated by the first spring member SP1 contacts the valve closing contact surface 21b of the needle 20 (refer to FIG. 3) and the inner cores 32 to transmit the first elastic force.

The movable core 30 is urged toward the valve closing side by the first elastic force of the first spring member SP1 transmitted from the cup 50, and the movable core 30 is urged toward the valve opening side by the second elastic force of the second spring member SP2. Since the first elastic force is larger than the second elastic force, the movable core 30 is pushed by the cup 50 and is moved (lifted down) toward the nozzle holes. The needle 20 is urged to the valve closing side by the first elastic force transmitted from the cup 50, and is pushed by the cup 50 to move (lift down) to the nozzle hole side, that is, seated on the body-side seat 11s to close the valve. In the valve closed state, a gap is provided between the valve opening contact surface 21a (refer to FIG. 3) of the needle 20 and the movable core 30 (inner core 32), and a length of the gap in the direction of the axis line C in the valve closed state is referred to as a gap L1.

As shown in a column (b) of FIG. 4, in a state immediately after the energization of the coil 17 has been switched from OFF to ON, the magnetic attraction force urged to the valve opening side acts on the movable core 30, and the movable core 30 starts moving to the valve opening side. Then, when the movable core 30 moves while pushing up the cup 50 and the amount of movement reaches the gap L1, the inner core 32 collides with the valve opening contact surface 21a of the needle 20. At the time of the collision, a gap is provided between the guide member 60 and the inner core 32, and the length of the gap in the direction of the axis line C is referred to as a lift L2.

Since the elastic force of the first spring member SP1 does not act on the needle 20 until the time of the collision, the collision speed of the movable core 30 can be increased accordingly. Since such a collision force is added to the magnetic attraction force and used as the valve opening force of the needle 20, the needle 20 can be operated to open the valve even with a high-pressure fuel while inhibiting an increase in the magnetic attraction force required for opening the valve. The elastic force of the first spring member SP1 acts on the needle 20 toward the valve closing side in the state shown in the column (a), but does not act on the needle 20 in the state shown in the column (b). For that reason, an inhibition of the increase in the magnetic attraction force required for opening the valve can be further promoted.

After the collision, the movable core 30 continues to move further by the magnetic attraction force, and when the movement amount after the collision reaches the lift L2, the inner core 32 collides with the guide member 60 and stops moving as shown in the column (c) of FIG. 4. A separation distance between the body-side seat 11s and the valve body-side seat 20s in the direction of the axis line C at the time of stopping the movement corresponds to a full lift of the needle 20, and corresponds to the lift L2 described above.

When the operation described above will be described in detail with reference to FIG. 5, first, when the energization is switched on at a time t1 as shown in the column (a) of FIG. 5, a drive current flowing through the coil 17 starts to rise (refer to the column (b)), and the magnetic attraction force starts to rise with the rising of the drive current (refer to the column (c)). When a value obtained by subtracting the second elastic force from the first elastic force (valve closing elastic force) is defined as an actual valve closing elastic force F0, the movable core 30 starts moving to the valve opening side at a time t2 when the magnetic attraction force rises to the actual valve closing elastic force F0. Before the drive current reaches a peak value, the movable core 30 starts moving. A boost voltage obtained by boosting a battery voltage is applied to the coil 17 until the drive current reaches the peak value, and the battery voltage is applied to the coil 17 after the drive current has reached the peak value.

Thereafter, at a time t3 when the moving amount of the movable core 30 reaches the gap L1, the movable core 30 collides with the needle 20, and the needle 20 starts the valve opening operation (refer to a column (d)). As a result, the fuel is injected from the nozzle holes 11a. Thereafter, the movable core 30 lifts up the needle 20 against the valve closing elastic force, and at a time t4 when the movable core 30 collides with the guide member 60, the lift of the needle 20 reaches the full lift (lift L2). A zero point shown on a vertical axis of the column (d) indicates a collision position between the movable core 30 and the needle 20 at the time t3.

Thereafter, a full lift state of the needle 20 is maintained by the magnetic attraction force, and the fuel injection is continued. Thereafter, when the energization is switched off at a time t5, the magnetic attraction force also decreases with a decrease in the drive current. At a time t6 when the magnetic attraction force reaches the actual valve closing elastic force F0, the movable core 30 starts moving to the valve closing side together with the cup 50. The needle 20 is pushed by a pressure of the fuel filled between the needle 20 and the cup 50 to start the lift-down operation (the valve closing operation) simultaneously with the start of the movement of the movable core 30.

Thereafter, at a time t7 when the needle 20 is lifted down by the lift L2, the valve body-side seat 20s is seated on the body-side seat 11s to close the flow channel 11b and the nozzle holes 11a. Thereafter, the movable core 30 continues to move to the valve closing side together with the cup 50, and the movement of the cup 50 to the valve closing side is stopped at a time t8 when the cup 50 contacts the needle 20. Thereafter, the movable core 30 continues to move to the valve closing side (inertial movement) by an inertial force, and then the movable core 30 moves (rebounds) to the valve opening side by the elastic force of the second spring member SP2. Thereafter, the movable core 30 collides with the cup 50 at a time t9 and moves (rebounds) to the valve opening side together with the cup 50, but is quickly pushed back by the valve closing elastic force and converges to an initial state shown in the column (a) of FIG. 4.

Therefore, the smaller such rebound and the shorter the time required for convergence, the shorter the time from the end of injection to the return to the initial state. For that reason, when the multi-stage injection in which the fuel is injected multiple times per one combustion cycle of the internal combustion engine is executed, an interval between the injections can be shortened, and the number of injections included in the multi-stage injection can be increased. In addition, when the convergence time is shortened as described above, the injection amount when a partial lift injection to be described below is executed can be controlled with a high accuracy. The partial lift injection is injection of a small amount due to a short valve opening time by stopping the energization of the coil 17 and starting the valve closing operation before the needle 20 performing the valve opening operation reaches the full lift position.

<Description of Manufacturing Method>

Next, a method of manufacturing the fuel injection valve 1 will be described.

This manufacturing method includes the first set load adjustment process, the movable portion assembling process, the welding process, the fastening process and the resin molding process described below.

In a movable portion manufacturing process, the movable core 30, the second spring member SP2, the sleeve 40, and the cup 50 are assembled to the needle 20 to manufacture the movable portion M. As will be described later in detail, the movable portion M is manufactured so that the elastic force of the second spring member SP2 urged by the movable core 30 becomes a target value of the second set load.

In the welding process to be executed next, first, the nozzle hole body 11 is welded and joined to the main body 12. Next, the movable portion M is disposed in the movable chamber 12a of the main body 12, and thereafter, the fixed core 13 to which the support member 18 and the first spring member SP1 are assembled, the main body 12 to which the movable portion M is disposed, and the non-magnetic member 14 are welded and coupled to each other.

In the fastening process to be executed next, the bobbin 17a in a state in which the coil 17 is wound is disposed between the nut member 15 and the fixed core 13. Thereafter, the nut member 15 is fastened to the fixed core 13 so that the main body 12, the non-magnetic member 14, and the fixed core 13 are assembled by generating a surface pressure.

In the resin molding process to be executed next, the resin member 16 having the connector housing 16a is resin molded by pouring and solidifying molten resin on the outer peripheral surface of the fixed core 13.

In the first set load adjusting process to be performed thereafter, first, the first spring member SP1 is assembled to the flow channel 13a of the fixed core 13. Thereafter, the support member 18 is press-fitted into the flow channel 13a of the fixed core 13 to a predetermined position. The predetermined position of the press-fit may be determined in accordance with variations in the elastic modulus of the first spring member SP1 and the length in the direction of the axis line C, and variations in the dimensions of the respective portions of the fixed core 13. In any case, the predetermined position (press-fit position) is set so that the first elastic force urged by the needle 20 becomes a target value of the first set load. The fuel injection valve 1 is manufactured by the manufacturing method including the above processes.

<Detailed Description of Configuration Group A>

Next, among the configurations of the fuel injection valve 1 according to the present embodiment, a configuration group A including at least the press-fit portion 23 formed on the needle 20 and the configuration related to the press-fit portion 23 will be described in detail.

Figure 6:
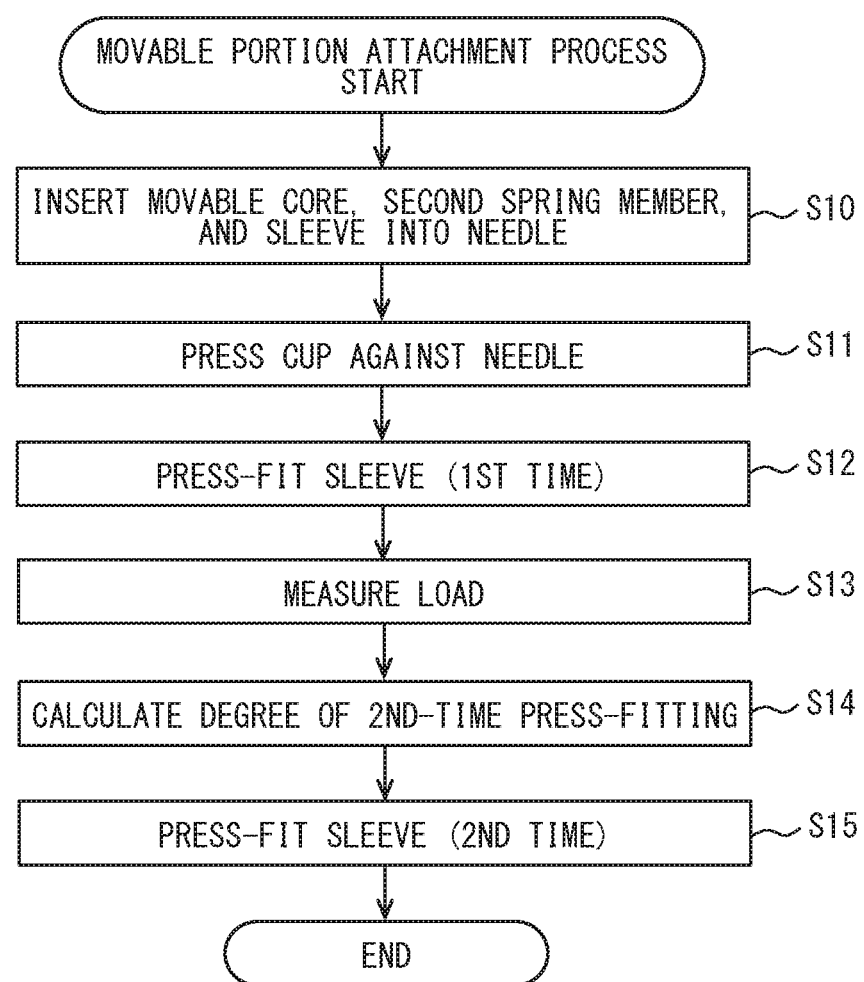
FIG. 6 is a flowchart showing an assembling operation procedure of the movable portion according to the first embodiment.

The movable portion assembling process described above includes Steps S10 to S15 shown in detail in FIG. 6. First, in Step S10, as shown in FIG. 7, the movable core 30, the second spring member SP2, and the sleeve 40 are inserted into the needle 20 from the side (the lower end side) of the valve body-side seat 20s. In this Step S10, as shown in FIG. 8, the insertion of the sleeve 40 is stopped at a position of the outflow portion 24 in front of the press-fit portion 23.

Figure 8:
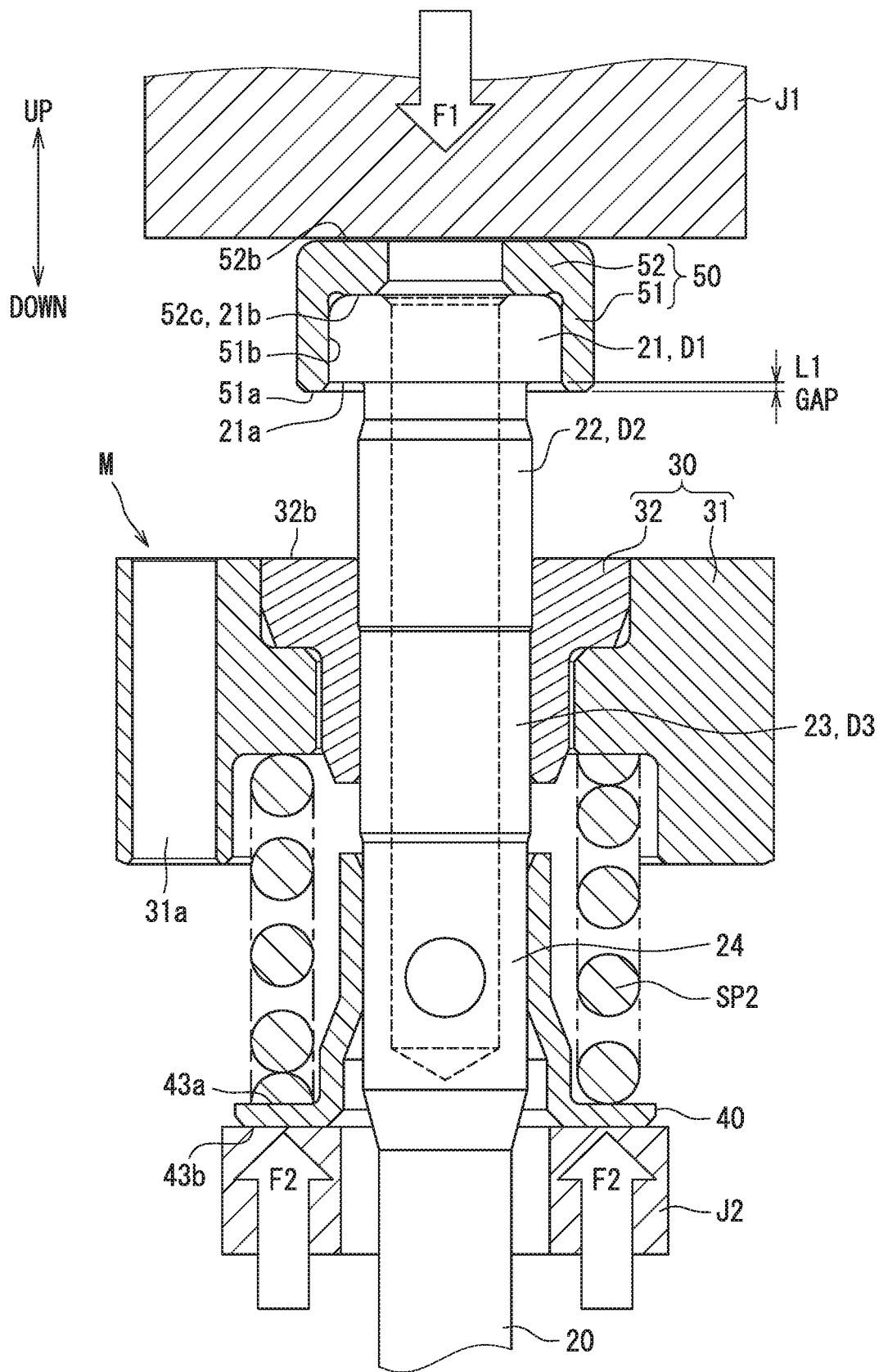
FIG. 8 is a sectional view of the movable portion showing a state of the operation of pressing a cup toward a needle in the assembling operation of FIG. 6.

In the subsequent Step S1, the needle 20 is pressed against the cup 50 in a state in which the cup 50 is assembled to the contact portion 21 of the needle 20, and the valve closing force transmission contact surface 52c contacts the valve closing contact surface 21b (refer to FIG. 8). As a result, the core contact end face 51a is positioned closer to the nozzle hole than the valve opening contact surface 21a by the amount corresponding to the gap L1.

In the subsequent Step S12, the sleeve 40 is temporarily press-fitted into the press-fit portion 23 by a predetermined degree of press-fitting. For example, while the cup 50 is supported in the direction of the axis line C with the use of a support device J1, the press-fit load F2 is applied to the load application surface 43b of the sleeve 40 in the direction of the axis line C with the use of the load application device J2. In a temporary press-fitting, the movable core 30 contacts the cup 50, the second spring member SP2 contacts the sleeve 40 and the movable core 30, and the second spring member SP2 is in an elastically deformed state. Therefore, the support device J1 exhibits a reaction force F1 against the second elastic force by the second spring member SP2 to support the cup 50.

The temporary press-fit is a first press-fit, and thereafter, a second press-fit (main press-fit) is performed in Step S15 (to be described later). The degree of press-fitting in the temporary press-fit is a predetermined amount regardless of a machine difference variation, and for example, the temporary press-fit is performed to a position separated from the nozzle hole side end portion of the press-fit portion 23 toward the side opposite to the nozzle holes by a predetermined length in the direction of the axis line C.

In the subsequent Step S13, the second elastic force by the second spring member SP2, that is, the second set load is measured. For example, a force (reaction force F1) by which the support device J1 is pushed by the second elastic force is measured with the use of a measurement device (not shown). In this Step S13, the measurement is performed in a state in which the cup 50 is positioned above the needle 20, that is, in a state in which the direction of the movable portion M is set in the direction of an arrow indicating the vertical direction in FIG. 8.

In the subsequent Step S14, a shortage amount of the measured second set load with respect to a target second set load is calculated, and an additional degree of press-fitting corresponding to the deficit amount is calculated. For example, an elastic modulus of the second spring member SP2 may be measured in advance, and the additional degree of press-fitting may be calculated based on the measured load shortage amount and the elastic modulus. Alternatively, the elastic modulus of the second spring member SP2 may be regarded as a standard value, and the additional degree of press-fitting may be calculated based on the measured load shortage amount and the standard value.

In the subsequent Step S15, the sleeve 40 is further press-fitted (main press-fitted) into the press-fit portion 23 by the additional degree of press-fitting calculated in Step S14. As described above, the assembling of the movable portion M is completed. In short, the second set load is measured during the press-fitting, and a main press-fit is executed in accordance with the measured value. Each step described above is an example of the configuration group A described above.

As described above, the fuel injection valve 1 according to the present embodiment includes the needle 20 (valve body), the fixed core 13, the movable core 30, the first spring member SP1, the sleeve 40 (fixed member), and the second spring member SP2. The movable core 30 contacts the needle 20 at a point in time when the movable core 30 is attracted by the fixed core 13 and moved by a predetermined amount to the side opposite to the nozzle holes, and opens the needle 20. The first spring member SP1 is elastically deformed accompanying the opening operation of the needle 20, and exhibits the first elastic force for closing the needle 20. The sleeve 40 is fixed to the needle 20. The second spring member SP2 is sandwiched between the sleeve 40 and the movable core 30 and elastically deformed, and exerts the second elastic force for urging the movable core 30 toward the side opposite to the nozzle hole. The needle 20 has the press-fit portion 23 into which the sleeve 40 is press-fitted into the side opposite to the nozzle holes, and the sleeve 40 is fixed to the needle 20 by being press-fit into the press-fit portion 23.

In short, the fuel injection valve 1 according to the present embodiment has the core boost structure in which the fuel injection valve 1 contacts the needle 20 at the time when the movable core 30 is moved by a predetermined distance to the side opposite to the nozzle holes to open the fuel injection valve 1, and includes the sleeve 40 that supports the second spring member SP2 that urges the movable core 30 toward the side opposite to the nozzle holes. The sleeve 40 is fixed to the needle 20 by press-fitting the sleeve 40, and the press-fitting direction of the sleeve 40 is the urging direction of the second spring member SP2. This makes it possible to adjust and fix the degree of press-fitting while measuring the second elastic force which increases with the progress of the press-fit. Therefore, the second elastic force at the time of completion of press-fitting can be set to the target set load of the second spring member SP2 with a high accuracy.

The set load is a second elastic force exerted by the elastic deformation of the second spring member in a state in which the second spring member is assembled to the fuel injection valve. Since the magnitude of the set load affects the valve opening and closing timing of the valve body, setting the set load to the target value with a high accuracy contributes to a reduction of the variation in the fuel injection amount. In contrast to the present embodiment in which the fixed member is press-fitted into the valve body, when a structure in which the fixed member is welded and fixed to the valve body is employed, the welded portion cannot be adjusted while measuring the second elastic force. For that reason, the set load varies due to variations among individuals such as variations in machine difference of the second spring member and variations in valve body length, and also due to thermal strain caused by welding.

On the other hand, in the present embodiment, since the fixed member is press-fitted into the valve body, the set load can be set to the target value with a high accuracy as described above. This makes it possible to reduce the variation of the fuel injection amount while adopting the core boost structure.

Further, in the fuel injection valve 1 according to the present embodiment, at least a portion of the sleeve 40 which is in contact with the press-fit portion 23 has a hardness different from that of the press-fit portion 23. For example, metal base materials having different hardness may be used for the sleeve 40 and the needle 20, or a surface treatment such as a thermal treatment may be performed on the metal base material of the sleeve 40 to locally make a portion of the sleeve 40 which is in contact with the press-fit portion 23 higher in hardness than the sleeve 40.

In contrast to the present embodiment, when the sleeve 40 and the press-fit portion 23 have the same hardness, there is a concern that the sleeve 40 and the press-fit portion 23 adhere to each other when the press-fit is temporarily stopped when the degree of press-fitting is adjusted while measuring. When the adhesion occurs, a load required to restart the press-fitting increases, and the workability of the press-fitting deteriorates. Therefore, according to the present embodiment having the different hardness, the above-mentioned adhesion concern can be reduced and the workability of press-fitting can be improved. The needle 20 is preferably harder than sleeve 40. The sleeve 40 preferably has a higher hardness than that of the movable core 30. A specific example of the material of the needle 20 is martensitic stainless steel. A specific example of the material of the sleeve 40 is ferritic stainless steel.

Further, in the fuel injection valve 1 according to the present embodiment, at least a portion of the sleeve 40 which is in contact with the press-fit portion 23 has a lower hardness than that of the press-fit portion 23.

In press-fitting, at least one of the two members to be press-fitted needs to be plastically deformed. As the hardness is lower, the member is more easily plastically deformed, and the press-fit load required for press-fitting can be reduced. In view of the above circumstance, since the needle 20 requires hardness to withstand the collision with the body-side seat 11s (valve seat), there is a fear that the press-fit load required for press-fitting may be increased if the sleeve 40 is made harder than the hardness of the needle 20 to produce a hardness difference. Therefore, according to the present embodiment in which the sleeve 40 has a hardness lower than that of the press-fit portion 23, the above-mentioned concern can be inhibited to improve the press-fit workability. Further, since the sleeve 40 according to the present embodiment is not in contact with the movable core 30, a material softer than that of the inner core 32 or the like requiring the contact can be employed.

Figure 11:
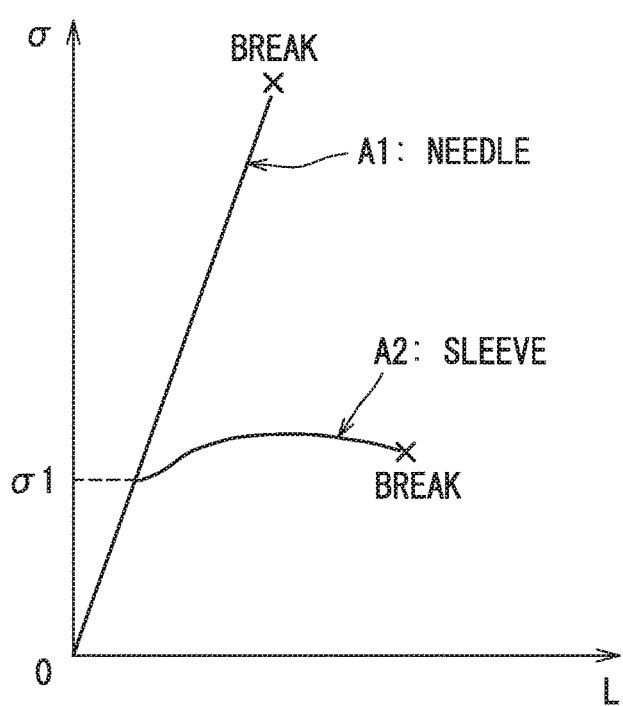
FIG. 11 is a stress-strain diagram of the needle and a sleeve according to the first embodiment.

For example, solid lines A1 and A2 in FIG. 11 shows stress a strain L diagrams of the needle 20 and the sleeve 40 obtained by a tensile test, respectively. As shown in the test result, a stress at a yield point (yield stress σ1) at which the sleeve 40 starts plastic deformation is lower than that of the needle 20. In the case of the needle 20, a test sample has broken as soon as the yield stress has been reached. The test result indicates that the yield stress σ1 can be lowered by making the sleeve 40 low in hardness, and the press-fit load required for press-fitting can be lowered.

Further, in the fuel injection valve 1 according to the present embodiment, the sleeve 40 and the movable core 30 are separated from each other without contacting each other even when the movable core 30 is moved to the maximum relative movement toward the nozzle holes with respect to the needle 20. For example, the movable core 30 moves further to the nozzle hole side after the valve has been closed, and rebound occurs as described above. A state in which the further movement of the movable core 30 after the closing of the valve occurs, and an interval between the lines of the second spring member SP2 becomes zero, so that the elastic deformation amount of the second spring member SP2 becomes maximum, is exemplified as a specific example of a case in which the relative movement is maximized.

In contrast to the present embodiment, in a structure in which the sleeve 40 and the movable core 30 are in contact with each other, since there is a need to strengthen the press-fit of the sleeve 40, there is a need to set a large press-fit margin and increase the amount of plastic deformation caused by the press-fit. Therefore, according to the present embodiment of the structure in which the sleeve 40 and the movable core 30 do not contact each other, the necessity of strengthening the press-fit can be reduced, so that the press-fit load required for the press-fit can be reduced, and the workability of the press-fit can be improved.

Further, in the fuel injection valve 1 according to the present embodiment, the sleeve 40 has the insertion cylindrical portion 41 having the cylindrical shape inserted into the press-fit portion 23, and the inner peripheral surface 41a of the insertion cylindrical portion 41 is press-fitted into the outer peripheral surface of the press-fit portion 23 over the entire circumference. According to the above configuration, since the internal stress generated in the insertion cylindrical portion 41 can be dispersed over the entire circumference, damage to the sleeve 40 due to concentration of the internal stress can be reduced.

In the method of manufacturing the fuel injection valve 1 according to the present embodiment, the fuel injection valve 1 having the following structure is to be manufactured. In other words, the needle 20 (valve body) that opens and closes the nozzle holes 11a for injecting the fuel is operated to close the valve by the first elastic force generated by the first spring member SP1 that is elastically deformed and exhibited, and is operated to open the valve by the movable core 30 that are moved by the magnetic attraction force. In addition, the movable core 30 is urged to the side opposite to the nozzle holes by the second elastic force generated by the second spring member SP2 elastically deformed by being sandwiched between the sleeve 40 (fixed member) fixed to the needle 20 and the movable core 30. The above manufacturing method includes Steps S12 and S15 (press-fitting process) of press-fitting the sleeve 40 (fixed member) into the press-fit portion 23 of the needle 20 that presses-fit the sleeve 40 into the press-fit portion 23 formed in the needle 20 that contacts the movable core 30 and starts the valve opening operation when the movable core 30 is moved by a predetermined amount by the magnetic attraction force. In addition, the above manufacturing method includes Step S13 (load measurement process) of measuring the second elastic force in a state in which the movable core 30 is made immovable during the press-fitting. In the press-fitting process, the degree of press-fitting is adjusted based on the measurement result to complete the press-fit.

In short, in the manufacturing method according to the present embodiment, the fuel injection valve 1 having the core boosting structure, which includes the sleeve 40 supporting the second spring member SP2 for urging the movable core 30 toward the side opposite to the nozzle holes is to be manufactured. While the sleeve 40 is press-fitted into the press-fit portion 23 of the needle 20, the second elastic force is measured while the movable core 30 is not moved, and the amount of press-fit is adjusted based on the measurement result to complete the press-fit. Therefore, the second elastic force at the time of completion of press-fitting can be set to the target set load of the second spring member SP2 with a high accuracy.

As described above, since the magnitude of the set load influences the valve opening and closing timing of the needle 20, setting the set load to the target value with a high accuracy contributes to the reduction of a variation in the fuel injection amount. For that reason, according to the present embodiment in which the set load can be set to the target value with a high accuracy as described above, the variation of the fuel injection amount can be reduced while employing the core boost structure.

Further, in the manufacturing method according to the present embodiment, the next fuel injection valve 1 is to be manufactured. The fuel injection valve 1 is disposed so as to be movable relative to the needle 20, and includes the cup 50 that contacts the needle 20 by moving relative to the fuel nozzle holes and transmits the first elastic force from the first spring member SP1 to the needle 20. In the manufacturing method described above, in Step S13 (load measurement process), the cup 50 is relatively moved to contact the needle 20, and the cup 50 in the contacting state is in contact with the movable core 30, thereby regulating the movement of the movable core 30.

The magnitude of the second set load due to the second spring member SP2 is important for inhibiting the movable core 30 from moving toward the nozzle hole after the valve has been closed, that is, important for quickly converging the rebound. Therefore, setting the second elastic force in the valve closed state as the second set load is advantageous for managing the rebound convergence. Therefore, since the second elastic force is measured by regulating the movement of the movable core 30 by contacting the cup 50, which contacts the needle 20, on the movable core 30, the second elastic force in the valve closed state is measured. This makes it possible to easily manage the rebound convergence.

<Detailed Description of Configuration Group B>

Next, among the configurations of the fuel injection valve 1 according to the present embodiment, a configuration group B including at least the fuel storage chamber B1, which will be described below, and the configuration related to the fuel storage chamber B1 will be described in detail with reference to FIGS. 12 to 14. In addition, a modification of the configuration group B will be described later with reference to FIGS. 15 to 23.

Figure 12:
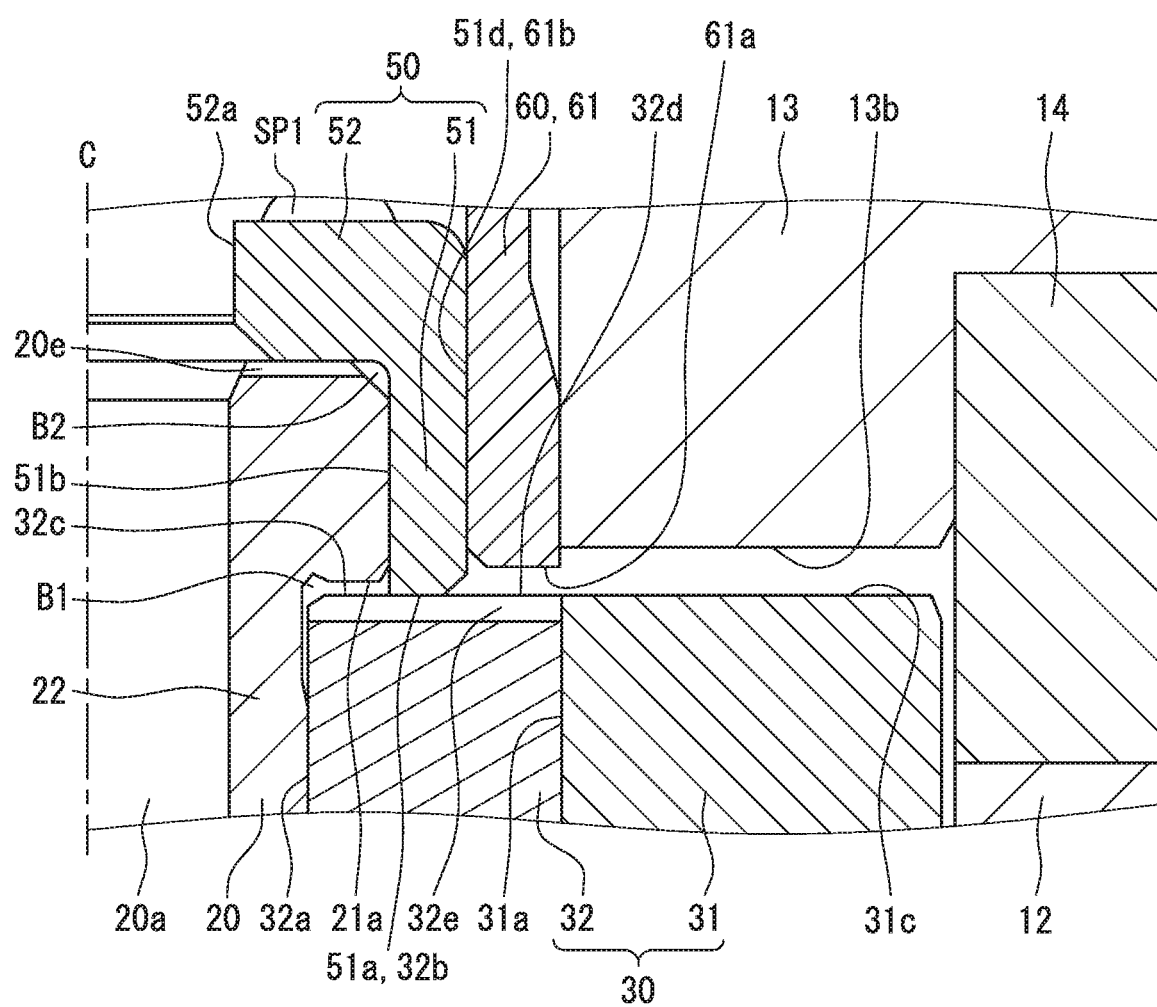
FIG. 12 is a sectional view showing a shape of a communication groove provided in the movable core according to the first embodiment.

As shown in FIG. 12, the fuel storage chamber B1 is a portion in which the fuel is accumulated in a state surrounded by the movable core 30, the cup 50, and the needle 20. In the following description, a surface of the inner core 32 on the side opposite to the nozzle hole, which contacts the needle 20, is referred to as a first core contact surface 32c, a surface of the inner core 32, which contacts the cup 50, is referred to as a second core contact surface 32b, and a surface of the inner core 32, which contacts the guide member 60, is referred to as a third core contact surface 32d.

Since the movable core 30 is urged to the cup 50 by the second elastic force, the movable core 30 is always in contact with the cup 50 except when the movable core 30 is inertially moved after the valve is closed and separated from the cup 50. More specifically, the second core contact surface 32b of the inner core 32 is always in contact with the core contact end face 51a of the cup 50. The cylindrical portion 51 of the cup 50, which forms the core contact end face 51a, separates the inside and the outside of the fuel storage chamber B1 from each other. The outside is a region where the fuel exists radially outside the outer peripheral surface 51d of the cup 50, the first core contact surface 32c is located inside the fuel storage chamber B1, and the third core contact surface 32d is located outside the fuel storage chamber B1.

The fuel storage chamber B1 is a region surrounded by the outer peripheral surface of the core sliding portion 22 of the needle 20, the valve opening contact surface 21a, the inner wall surface of the through hole 32a of the inner core 32, the first core contact surface 32c, and the inner peripheral surface of the cylindrical portion 51 of the cup 50. The fuel storage chamber B1 is a region surrounded as described above in a state in which the movable core 30 and the cup 50 contact each other. The fuel storage chamber B1 is a region surrounded as described above in a state in which the valve body-side seat 20s contacts the body-side seat 11s and the needle 20 is closed.

Communication grooves 32e are provided in the first core contact surface 32c and the second core contact surface 32b of the inner core 32. The communication grooves 32e communicate the inside and the outside of the fuel storage chamber B1 with each other in a state in which the second core contact surface 32b contacts the core contact end face 51a. The outside is a space different from the fuel storage chamber B1 when the cup 50 and the movable core 30 contact each other.

Here, the outside of the fuel storage chamber B1 corresponds to a region which will be exemplified below. In other words, a first region between the stopper contact end face 61a and the third core contact surface 32d of the guide member 60 corresponds to an outside. The first region is a region formed in a state in which the cup 50 and the movable core 30 contact each other and the movable core 30 and the guide member 60 do not contact each other. A surface of the fixed core 13 facing the movable core 30 is referred to as a fixed side core facing surface 13b. A surface of the outer core 31 facing the fixed core 13 is referred to as a movable core facing surface 31c. A second region between the fixed side core facing surface 13b and the movable core facing surface 31c, which is a region communicating with the first region, corresponds to the outside. A third region, which communicates with the second region, between the inner peripheral surfaces of the main body 12 (holder) and the non-magnetic member 14 (holder) and the outer peripheral surface of the outer core 31 corresponds to the outside.

Figure 13:
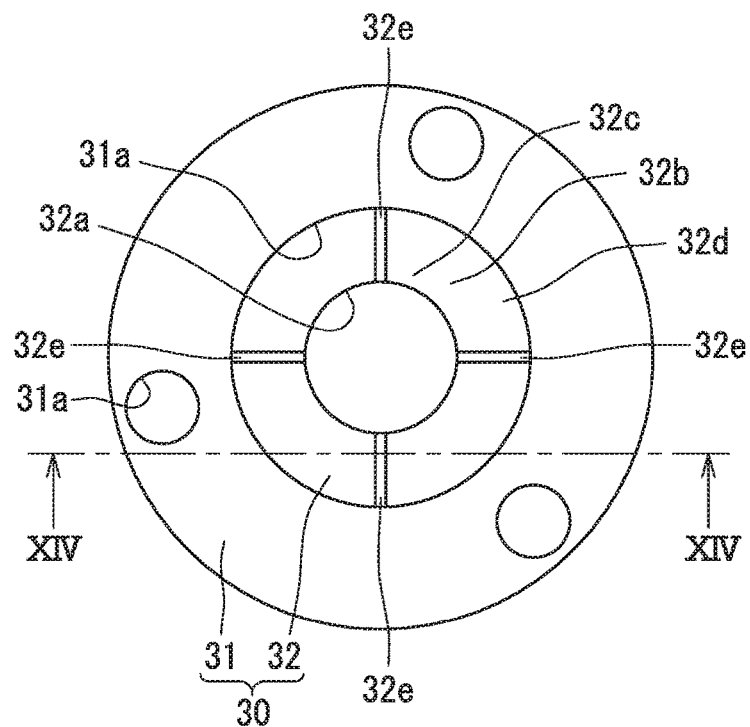
FIG. 13 is a top view of the movable core shown in FIG. 12 as seen from a side opposite to a nozzle hole.

As shown in FIG. 13, the multiple (for example, four) communication grooves 32e are provided, and the multiple communication grooves 32e are arranged at regular intervals in the circumferential direction when viewed from the moving direction of the movable core 30. The communication grooves 32e each have a shape linearly extending in the radial direction. Each of the multiple communication grooves 32e has the same shape. Positions in the circumferential direction of the communication grooves 32e are different from positions in the circumferential direction of the through holes 31a.

The inner core 32 corresponds to a "contact portion" in which the first core contact surface 32c and the second core contact surface 32b are formed. The outer core 31 corresponds to a "core body portion" made of a material different from that of the inner core 32 on which the movable core facing surface 31c facing the fixed core 13 is formed. The core body portion is outside a range in which the communication grooves 32e extend. In other words, the communication grooves 32e are provided in the inner core 32 but are not provided in the outer core 31.

The communication grooves 32e are provided over the entire area in the radial direction of the inner core 32, and are provided over the inner peripheral surface to the outer peripheral surface of the inner core 32. In other words, the communication grooves 32*e* are provided over the entire area in the radial direction of the first core contact surface 32*c*, the second core contact surface 32*b*, and the third core contact surface 32*d*.

Figure 14:
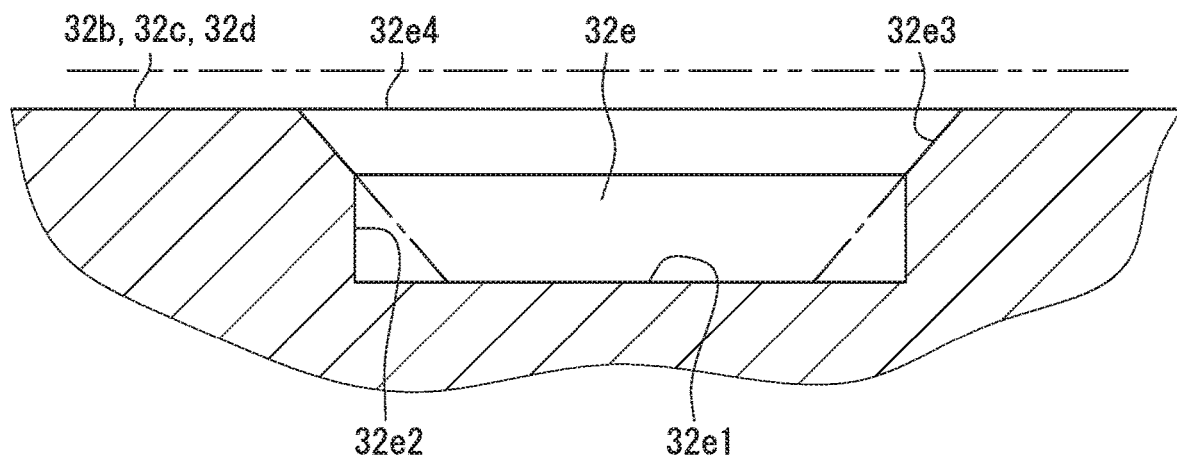
FIG. 14 is a sectional view taken along a line XIV-XIV of FIG. 13.

As shown in FIG. 14, the communication grooves 32*e* each have a bottom wall surface 32*e*1, a vertical wall surface 32*e*2, and a tapered surface 32*e*3. The bottom wall surface 32*e*1 has a shape extending perpendicularly to the moving direction of the movable core 30, the vertical wall surface 32*e*2 has a shape extending from the bottom wall surface 32*e*1 in the moving direction of the movable core 30, and the tapered surface 32*e*3 has a shape extending from the vertical wall surface 32*e*2 toward the groove opening 32*e*4 while increasing a flow area. In an example shown in FIG. 14, the tapered surface 32*e*3 has a shape linearly extending from an upper end of the vertical wall surface 32*e*2.

Examples of the method of machining the communication grooves 32*e* include laser machining, electric discharge machining, cutting with an end mill, and the like. First, a groove having a rectangular cross-sectional shape including the vertical wall surface 32*e*2 and the bottom wall surface 32*e*1 is processed. At this point of time, a burr generated at the time of processing may remain in the peripheral portion of the groove opening 32*e*4 in the vertical wall surface 32*e*2. After that, however, the tapered surface 32*e*3 having a trapezoidal cross-sectional shape is processed to remove the burr.

Now, when the fuel existing in the fuel storage chamber B1 is compressed as the movable core 30 moves to the side opposite to the nozzle holes, the movement of the movable core 30 is hindered, so that the moving speed (collision speed) when the movable core 30 moves by a predetermined amount and contacts the needle 20 becomes low. As a result, the above-mentioned effect of the core boost structure, that is, the effect that the valve body can be operated to open even with the high-pressure fuel while reducing an increase in the magnetic attraction force required to open the valve, is reduced. In addition, since the movement of the movable core 30 is obstructed, a variation in the valve opening timing of the needle 20 becomes large, and a variation in the fuel injection amount becomes large.

On the other hand, the fuel injection valve 1 according to the present embodiment includes the needle 20 (valve body), the fixed core 13, the movable core 30, the first spring member SP1 (spring member), and the cup 50 (valve closing force transmission member). The movable core 30 contacts the needle 20 at a point in time when the movable core 30 is attracted by the fixed core 13 and moved by a predetermined amount to the side opposite to the nozzle holes, and opens the needle 20. The first spring member SP1 is elastically deformed accompanying the valve opening operation of the needle 20, and exhibits a valve closing elastic force for closing the needle 20. The cup 50 is disposed so as to be movable relative to the needle 20, and when the cup 50 is moved relative to the nozzle hole side, the cup 50 contacts the needle 20 to transmit the valve closing elastic force to the needle 20. The movable core 30 has the first core contact surface 32*c* and the second core contact surface 32*b*, and the communication grooves 32*e* are provided in the first core contact surface 32*c* and the second core contact surface 32*b* to communicate the inside and the outside of the fuel storage chamber B1 with each other.

For that reason, when the movable core 30 moves to the side opposite to the nozzle holes, the fuel accumulated in the fuel storage chamber B1 flows out to the outside through the communication grooves 32*e*. Therefore, the compression of the fuel accumulated in the fuel storage chamber B1 is inhibited, so that the movable core 30 easily moves. For that reason, the reduction in the collision speed of the movable core 30 can be inhibited, so that the effect of reducing the magnetic attraction force by the core boost structure can be promoted. In addition, since the movable core 30 easily moves, the variation in the valve opening timing of the needle 20 can be reduced, and consequently, the variation in the fuel injection amount can be reduced.

Further, in the fuel injection valve 1 according to the present embodiment, the multiple communication grooves 32*e* are provided, and the multiple communication grooves 32*e* are arranged at regular intervals in the circumferential direction when viewed from the moving direction of the movable core 30.

According to the above configuration, the portions that easily flow out from the fuel storage chamber B1 to the outside are present at regular intervals around the axial direction. For that reason, when the movable core 30 moves in the axial direction, a change in the inclination direction of the movable core 30 with respect to the axial direction can be reduced. Therefore, since the behavior of the movable core 30 can be inhibited from becoming unstable, the variation in the valve opening response can be further reduced. If three or more communication grooves 32*e* are provided at regular intervals in the circumferential direction, the effect of inhibiting the behavior instability is promoted.

Further, in the fuel injection valve 1 according to the present embodiment, the movable core 30 includes the inner core 32 (contact portion) and the outer core 31 (core body portion) made of a material different from that of the inner core 32. The inner core 32 is formed with the first core contact surface 32*c* and the second core contact surface 32*b*, and the outer core 31 is formed with the movable core facing surface 31*c* facing the fixed core 13. The outer core 31 is excluded from a range in which the communication grooves 32*e* are provided.

According to the above configuration, since the movable core facing surface 31*c* of the outer core 31 can have a flat shape having no groove, the magnetic attraction force attracted to the fixed core 13 can be inhibited from being reduced by the communication grooves.

Further, in the fuel injection valve 1 according to the present embodiment, the third core contact surface 32*d* of the movable core 30 which contacts the guide member 60 is located outside the fuel storage chamber B1. The communication grooves 32*e* are also provided in the third core contact surface 32*d* in addition to the first core contact surface 32*c* and the second core contact surface 32*b*.

When the needle 20 is in the full lift position, the inner core 32 contacts the guide member 60. In the above contact state, if the stopper contact end face 61*a* of the guide member 60 and the third core contact surface 32*d* of the inner core 32 are in close contact with each other, there is a concern that a phenomenon (linking phenomenon) occurs in which the third core contact surface 32*d* is hardly separated from the stopper contact end face 61*a*. In view of the above concern, in the present embodiment, since the communication grooves 32*e* are also provided in the third core contact surface 32*d*, when the movable core 30 starts moving to the nozzle hole side with the energization off, the fuel is supplied to the third core contact surface 32*d* in a state of contacting the stopper contact end face 61*a*. For that reason, since the movable core 30 can be inhibited from coming into close contact with the guide member 60 and from becoming difficult to separate from the guide member 60, the possibility that the start of the movement of the movable core 30 to the nozzle hole side is delayed due to the above-mentioned force of adhesion can be reduced. Therefore, a valve closing response time from when the energization is turned off to when the needle 20 closes the valve can be reduced, and the valve closing response can be improved.

Further, in the fuel injection valve 1 according to the present embodiment, the communication grooves 32e each have the bottom wall surface 32e1 extending perpendicularly to the moving direction of the movable core 30, and the vertical wall surface 32e2 extending from the bottom wall surface 32e1 in the moving direction.

In order to remove burrs generated in the groove opening 32e4 of the communication grooves 32e, it is desirable to polish the first core contact surface 32c and the second core contact surface 32b. For example, polishing is performed from a position indicated by a two-dot chain line in FIG. 14 to a position indicated by a solid line. In the present embodiment, after the inner core 32 has been assembled to the outer core 31, the communication grooves 32e and outer communication grooves 31e are provided by cutting or the like, and thereafter, the above-mentioned polishing is performed on both the outer core 31 and the inner core 32 simultaneously.

Contrary to the present embodiment, in the case where the vertical wall surface 32e2 is not provided and the shape is shown by a one-dot chain line, a cross-sectional area of the communication grooves 32e becomes small, and a ratio of the cross-sectional area to be polished to the cross-sectional area of the communication grooves 32e becomes large. As a result, an influence of the variation in the polishing depth on the cross-sectional area of the communication grooves 32e becomes large, so that the variation in the cross-sectional area of the communication grooves 32e becomes large. For that reason, a variation in the degree of the fuel flowing out from the fuel storage chamber B1 to the outside through the communication grooves 32e becomes large, and a variation in the ease of movement of the movable core 30 becomes large, which hinders a reduction of the variation in the valve opening timing of the needle 20. On the other hand, according to the present embodiment, since the vertical wall surface 32e2 is provided, the ratio of the cross-sectional area to be polished becomes small, and the influence of the variation in a polishing depth on the cross-sectional area of the communication grooves 32e becomes small. For that reason, the variation in the degree of outflow of the fuel from the fuel storage chamber B1 to the outside through the communication grooves 32e is reduced, and the variation in the valve opening timing of the needle 20 can be promoted.

[Modification B1]

Figure 15:
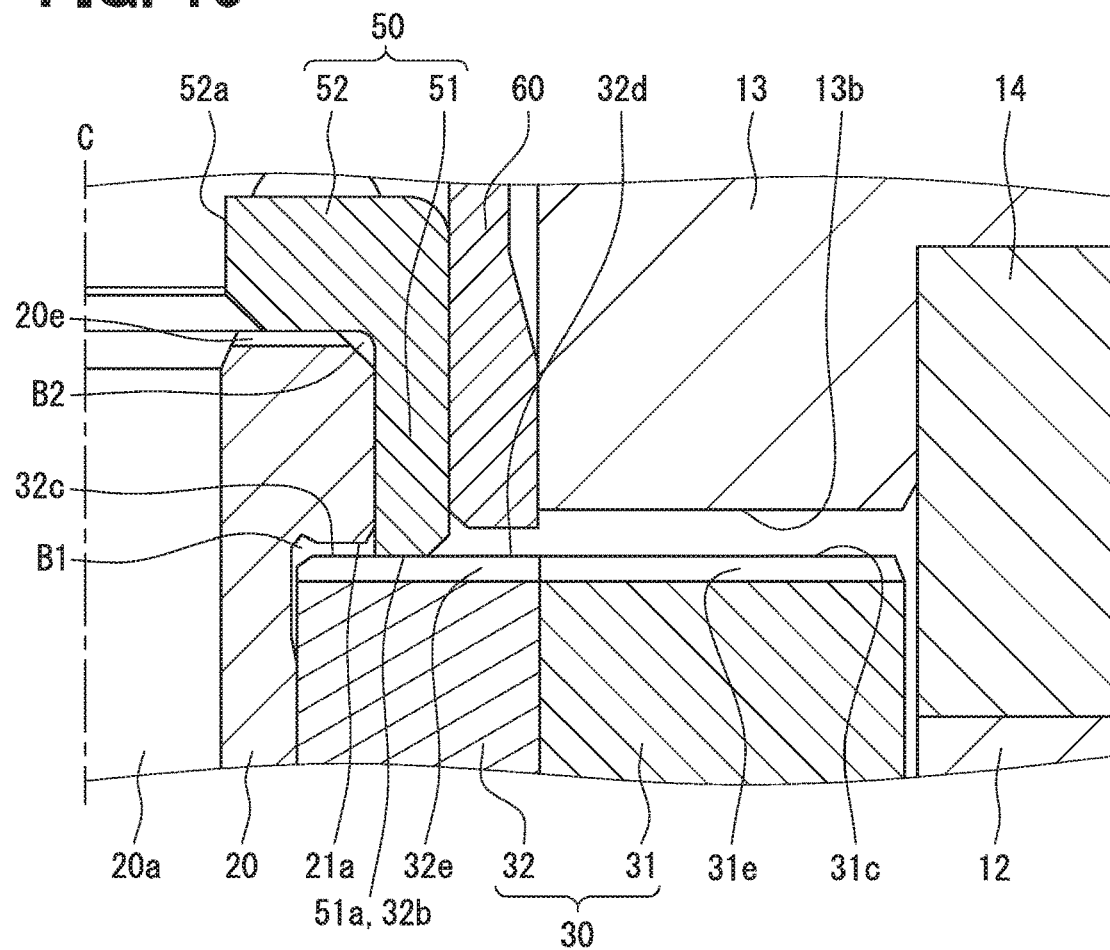
FIG. 15 is a sectional view showing Modification B1 with respect to FIG. 12.

Although the communication grooves 32e shown in FIG. 12 are not provided in the outer core 31, as shown in FIG. 15, in addition to the communication grooves 32e provided in the inner core 32, communication grooves (outer communication grooves 31e) may be provided in the outer core 31. In an example shown in FIG. 15, the inner diameter side end portion of the outer communication grooves 31e directly communicates with the outer diameter side end portion of the communication grooves 32e.

Figure 16:
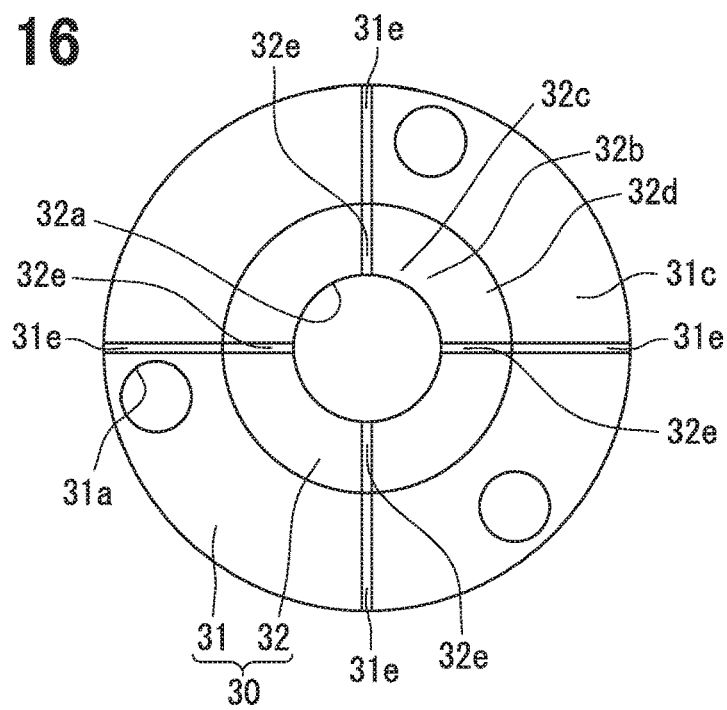
FIG. 16 is a top view of the movable core shown in FIG. 15 as seen from the side opposite to the nozzle hole.

As shown in FIG. 16, the multiple (for example, four) outer communication grooves 31e are provided and the multiple outer communication grooves 31e are arranged at regular intervals in the circumferential direction when viewed from the moving direction of the movable core 30.

The outer communication grooves 31e each have a shape linearly extending in the radial direction. Each of the multiple outer communication grooves 31e has the same shape. The position of the outer communication grooves 31e in the circumferential direction is different from the position of the through holes 31a in the circumferential direction.

The outer communication grooves 31e and the communication grooves 32e have the same position in the circumferential direction. In an example of FIG. 16, four outer communication grooves 31e are arranged at regular intervals in the circumferential direction, but six outer communication grooves 31e may be arranged at regular intervals in the circumferential direction. In that case, it is desirable to set the position of the through holes 31a in the circumferential direction so that a circumferential distance to the adjacent outer communication grooves 31e is the same.

The outer communication grooves 31e are provided over the entire area of the outer core 31 in the radial direction, and is provided from the inner peripheral surface to the outer peripheral surface of the outer core 31. In other words, the outer communication grooves 31e are provided over the entire area of the movable core facing surface 31c in the radial direction. The cross-sectional shape of the outer communication grooves 31e is the same as the cross-sectional shape of the communication grooves 32e shown in FIG. 14, and the outer communication grooves 31e have the same bottom wall surface, vertical wall surface, and tapered surface as those of the communication grooves 32e. As described above, FIG. 14 is a sectional view taken along a line XIV-XIV of FIG. 13, and shows the cross-sectional shape of the communication groove 32e extending in the radial direction of the movable core 30, which are taken perpendicularly to the extending direction. The cross-sectional shape of the outer communication grooves 31e is the same as that of the communication grooves 32e, and the cross-sectional shape has a bottom wall surface, a vertical wall surface, and a tapered surface in a cross-section of the outer communication grooves 31e taken perpendicularly to the extending direction.

As described above, according to the present modification having the outer communication grooves 31e, since the fuel flowing out from the outer diameter side end portion of the communication grooves 32e is diffused through the outer communication grooves 31e, an increase in a fuel pressure at the outer diameter side end portion of the communication grooves 32e can be inhibited, and the fuel flowing out through the communication grooves 32e can be promoted. This makes it possible to inhibit an increase in the fuel pressure between the guide member 60 and the inner core 32.

Further, in the present modification, since the inner diameter side end portion of the outer communication grooves 31e directly communicates with the outer diameter side end portion of the communication grooves 32e, the outflow of the fuel from the outer diameter side end portion can be further promoted.

Further, in the present modification, since the outer communication grooves 31e are provided over the entire area of the movable core facing surface 31c in the radial direction, the fuel flowing out from the outer diameter side end portion of the outer communication grooves 31e directly flows into the gap between the inner peripheral surface of the holder and the outer peripheral surface of the outer core 31. For that reason, an increase in the fuel pressure at the outer diameter side end portion of the outer communication grooves 31e can be inhibited, and the fuel outflow through the communication grooves 32e and the outer communication grooves 31e can be promoted.

Further, in the present modification, with respect to the dimension of the outer communication grooves 31e, a width dimension (dimension in circumferential direction) of a portion of the outer communication grooves 31e which opens toward the fixed core 13 is set to be smaller than a depth dimension (dimension in the axis line C) of the outer communication grooves 31e. According to the above configuration, the flow channel cross-sectional area of the outer communication grooves 31e can be increased while a decrease in the area of the movable core facing surface 31c caused by the provision of the outer communication grooves 31e can be inhibited. The "flow channel cross-sectional area" is an area of a cross section perpendicular to the flow direction when the fuel in the fuel storage chamber B1 flows radially outward through the outer communication grooves 31e. In other words, since the width dimension is smaller than the depth dimension as described above, the fuel discharge from the fuel storage chamber B1 at the time of the valve opening operation can be realized while inhibiting the reduction of the magnetic attraction force.

[Modification B2]

Figure 17:
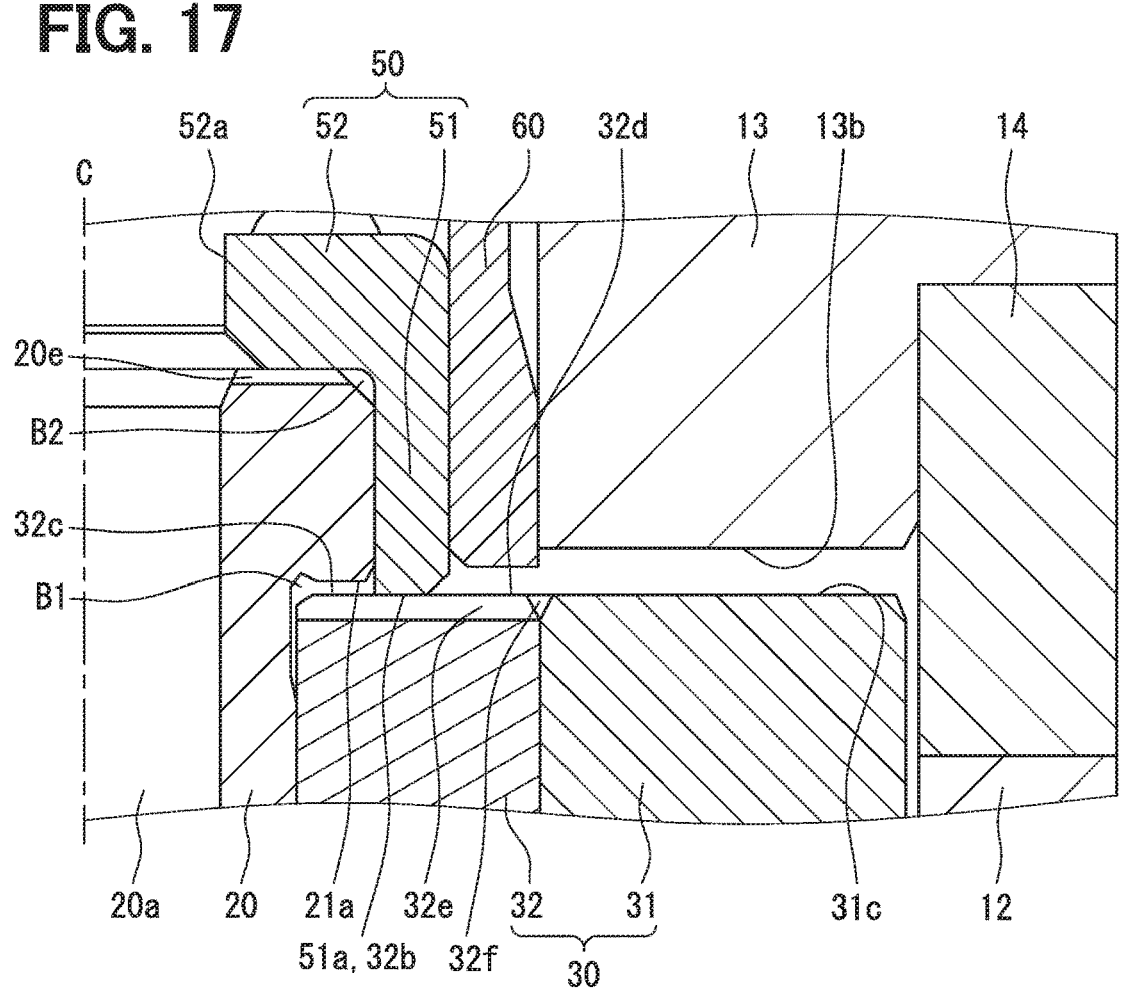
FIG. 17 is a sectional view showing Modification B2 with respect to FIG. 12.
Figure 18:
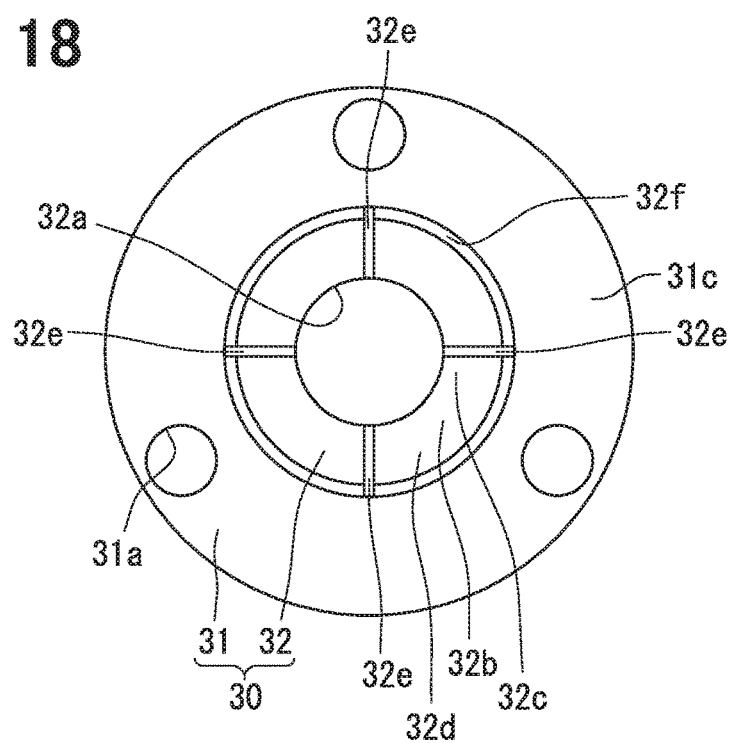
FIG. 18 is a top view of the movable core shown in FIG. 17 as seen from the side opposite to the nozzle hole.

In the present modification shown in FIGS. 17 and 18, a connection groove 32f for connecting the multiple communication grooves 31e is provided. The connection groove 32f has a shape extending annularly around the through hole 32a, and connects all (four in an example of FIG. 18) communication grooves 31e to each other. The connection groove 32f connects the outer diameter side end portion of the communication grooves 31e. The connection groove 32f is provided by cutting the outer diameter side corner portion of the inner core 32. Further, the inner diameter side corner portion of the outer core 31 is cut so that the connection groove 32f is provided to extend over both the outer core 31 and the inner core 32.

Also, in the embodiment shown in FIGS. 15 and 16, the connection groove 32f shown in FIGS. 17 and 18 may be provided, and each of the multiple communication grooves 32e and the multiple outer communication grooves 31e may be connected to each other by the connection groove 32f.

As described above, according to the present modification having the connection groove 32f, since the fuel flowing out from the outer diameter side end portion of the communication grooves 32e is diffused through the connection groove 32f, an increase in the fuel pressure at the outer diameter side end portion of the communication grooves 32e can be inhibited, and the fuel flowing out through the communication grooves 32e can be promoted.

Further, with the connection of the multiple communication grooves 31e, since the fuel can be promoted to flow out uniformly from the multiple communication grooves 31e, a change in the inclination direction of the movable core 30 with respect to the axial direction can be inhibited when the movable core 30 moves in the axial direction. Therefore, since the behavior of the movable core 30 can be inhibited from becoming unstable, the variation in the valve opening response can be further reduced.

[Modification B3]

Figure 19:
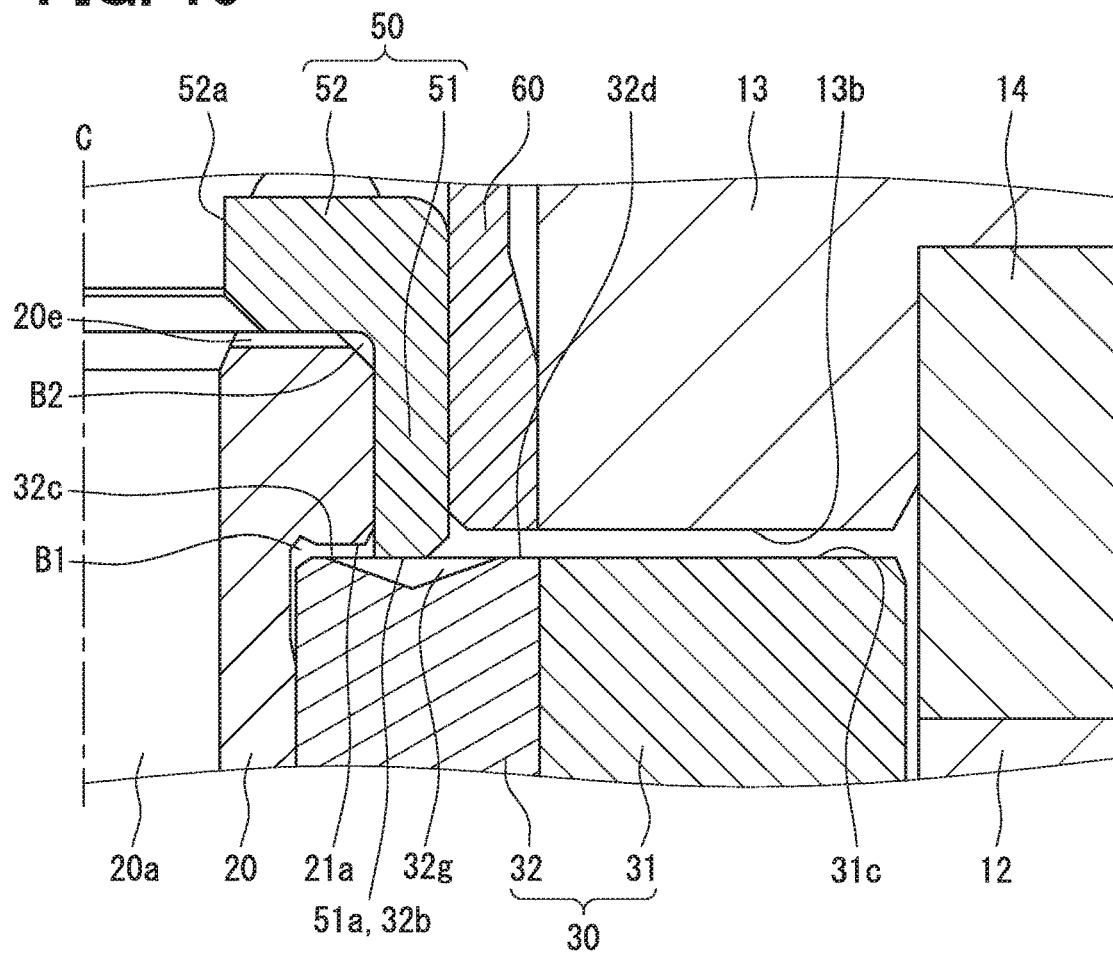
FIG. 19 is a sectional view showing Modification B3 with respect to FIG. 12.
Figure 20:
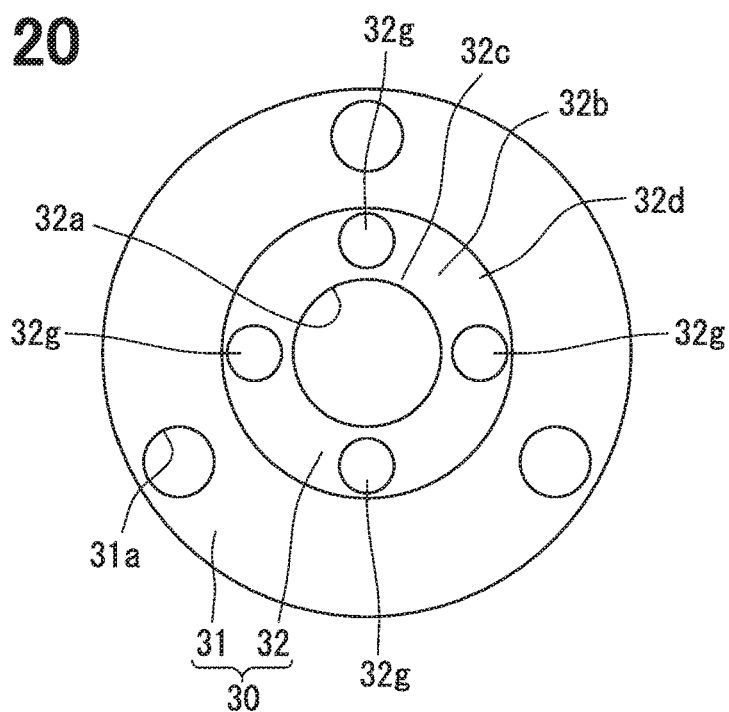
FIG. 20 is a top view of the movable core shown in FIG. 19 as seen from the side opposite to the nozzle hole.

The communication grooves 32e shown in FIG. 12 are formed over the entire end face of the inner core 32. On the other hand, communication grooves 32g according to the present modification shown in FIGS. 19 and 20 are provided across a part of the first core contact surface 32c, the entire area of the second core contact surface 32b, and a part of the third core contact surface 32d. More specifically, the communication grooves 32g are not provided over the entire area of the first core contact surface 32c in the radial direction, but are partially provided in a portion of the first core contact surface 32c which is adjacent to the second core contact surface 32b. The communication grooves 32g are provided over the entire area of the second core contact surface 32b in the radial direction. The communication grooves 32g are not provided over the entire area of the third core contact surface 32d in the radial direction, and are partially provided in a portion of the third core contact surface 32d which is adjacent to the second core contact surface 32b.

The communication grooves 32e shown in FIG. 12 have a shape linearly extending in the radial direction, whereas the communication grooves 32g according to the present modification have a conical shape. In other words, as shown in FIG. 20, the communication grooves 32g are circular as seen from the direction of the axis line C, and as shown in FIG. 19, the communication grooves 32g are triangular in sectional view.

As described above, according to the present modification having the conical communication grooves 32g, the communication grooves 32g can be provided only by pressing a tip of a drill blade against the movable core 30, and therefore the communication grooves 32g can be easily processed.

[Modification B4]

In the embodiment shown in FIG. 12, the communication grooves 32e are provided in the contact surface of the movable core 30, so that the inside and the outside of the fuel storage chamber B1 communicate with each other. On the other hand, in the present modification shown in FIG. 21, with the provision of communication holes 20c in the needle 20, the interior of the fuel storage chamber B1 and the internal passage 20a of the needle 20 are communicated with each other.

In a state in which the cup 50 contacts the valve closing contact surface 21b and in a state in which the cup 50 contacts the second core contact surface 32b, the communication holes 20c are disposed at a position including the first core contact surface 32c in the direction of the axis line C. Alternatively, the entirety of the communication holes 20c is disposed on the side opposite to the nozzle holes with respect to the first core contact surface 32c. The multiple communication holes 20c are provided, and the multiple communication holes 20c are arranged at regular intervals in the circumferential direction when viewed from the moving direction of the needle 20. The communication holes 20c have a shape linearly extending in the radial direction of the needle 20.

As described above, according to the present modification in which the communication holes 20c are provided in the needle 20, when the movable core 30 moves to the side opposite to the nozzle holes, the fuel accumulated in the fuel storage chamber B1 flows out to the internal passage 20a (the outside) of the needle 20 through the communication holes 20c. Therefore, the compression of the fuel accumulated in the fuel storage chamber B1 is inhibited, so that the movable core 30 easily moves. For that reason, the reduction in the collision speed of the movable core 30 can be inhibited, so that the effect of reducing the magnetic attraction force by the core boost structure can be promoted. In addition, since the movable core 30 easily moves, the variation in the valve opening timing of the needle 20 can be reduced, and consequently, the variation in the fuel injection amount can be reduced.

[Modification B5]

Figure 22:
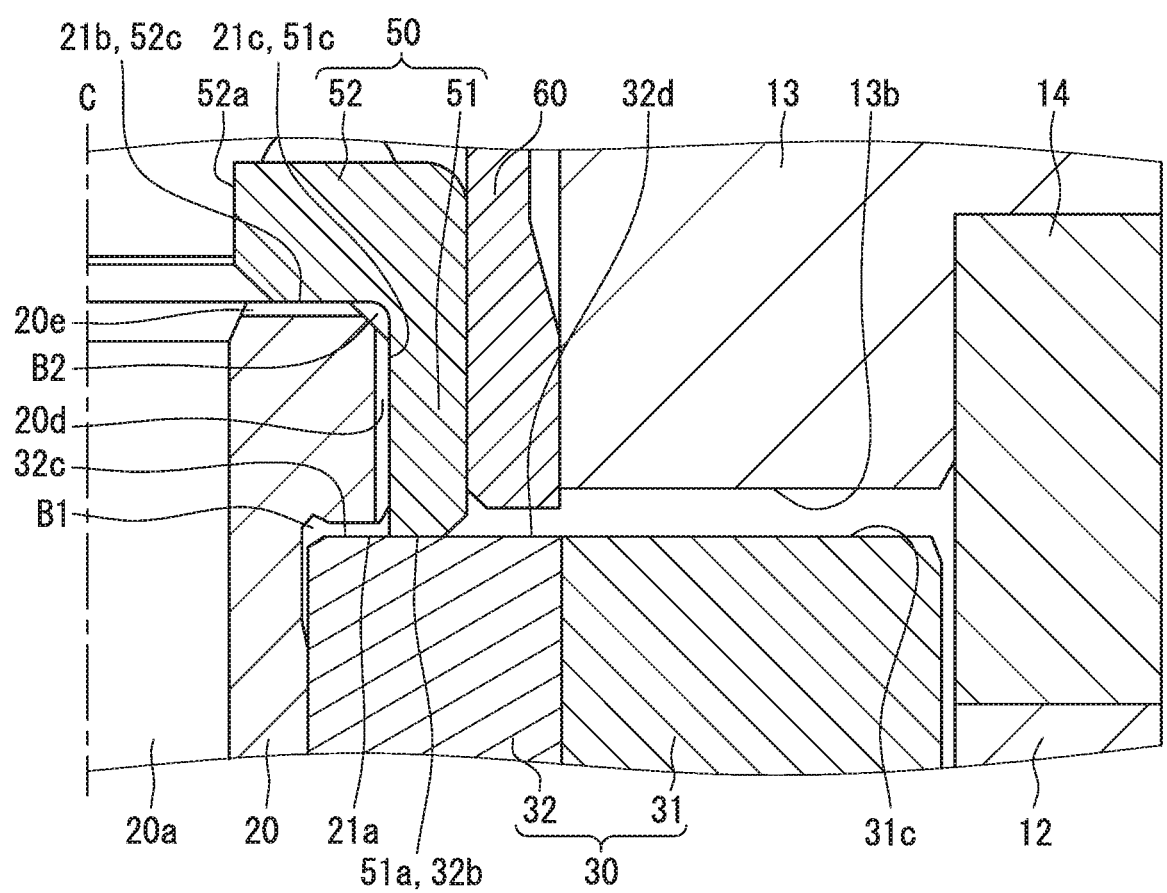
FIG. 22 is a sectional view showing Modification B5 with respect to FIG. 12.

In the present modification shown in FIG. 22, sliding surface communication grooves 20d are provided in the needle 20, so that the interior of the fuel storage chamber B1 and the internal passage 20a of the needle 20 communicate with each other. The sliding surface communication grooves 20d are provided in the valve body-side sliding surface 21c (refer to FIG. 7) of the needle 20 on which the cup 50 slides.

The multiple sliding surface communication grooves 20d are provided, and the multiple sliding surface communication grooves 20d are arranged at regular intervals in the circumferential direction when viewed from the moving direction of the needle 20. The sliding surface communication grooves 20d each have a shape linearly extending in the direction of the axis line C of the needle 20.

As described above, according to the present modification in which the sliding surface communication grooves 20d are provided in the valve body-side sliding surface 21c which is the sliding surface between the needle 20 and the cup 50, when the movable core 30 moves to the side opposite to the nozzle holes, the fuel accumulated in the fuel storage chamber B1 flows out to the outside through the sliding surface communication grooves 20d. In the present specification, the outside is a gap between the valve closing contact surface 21b and the valve closing force transmission contact surface 52c, and the internal passage 20a. Therefore, the compression of the fuel accumulated in the fuel storage chamber B1 is inhibited, so that the movable core 30 easily moves. For that reason, the reduction in the collision speed of the movable core 30 can be inhibited, so that the effect of reducing the magnetic attraction force by the core boost structure can be promoted. In addition, since the movable core 30 easily moves, the variation in the valve opening timing of the needle 20 can be reduced, and consequently, the variation in the fuel injection amount can be reduced.

[Modification B6]

Figure 23:
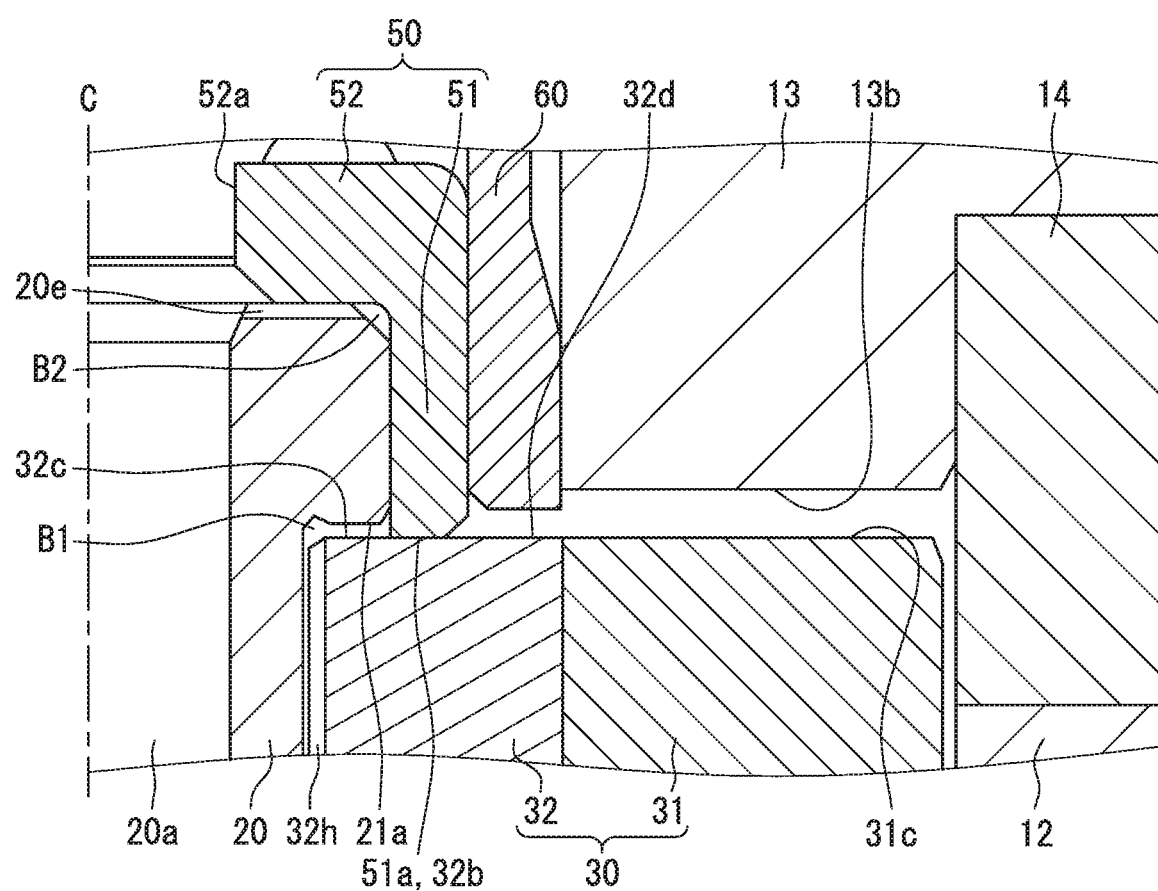
FIG. 23 is a sectional view showing Modification B6 with respect to FIG. 12.

In the present modification shown in FIG. 23, second sliding surface communication grooves 32h are provided in the inner core 32, so that the inside of the fuel storage chamber B1 and the movable chamber 12a are communicated with each other. The second sliding surface communication grooves 32h are provided on the surface of the inner core 32 on which the needle 20 slides, that is, on the inner peripheral surface of the inner core 32.

The multiple second sliding surface communication grooves 32h are provided, and the multiple second sliding surface communication grooves 32h are arranged at regular intervals in the circumferential direction when viewed from the moving direction of the movable core 30. The second sliding surface communication grooves 32h each have a shape linearly extending in the direction of the axis line C of the movable core 30.

As described above, according to the present modification in which the second sliding surface communication grooves 32h are provided on the sliding surface between the needle 20 and the inner core 32, when the movable core 30 moves to the side opposite to the nozzle holes, the fuel accumulated in the fuel storage chamber B1 flows out to the movable chamber 12a (the outside) through the second sliding surface communication grooves 32h. Therefore, the compression of the fuel accumulated in the fuel storage chamber B1 is inhibited, so that the movable core 30 easily moves. For that reason, the reduction in the collision speed of the movable core 30 can be inhibited, so that the effect of reducing the magnetic attraction force by the core boost structure can be promoted. In addition, since the movable core 30 easily moves, the variation in the valve opening timing of the needle 20 can be reduced, and consequently, the variation in the fuel injection amount can be reduced.

<Detailed Description of Configuration Group C>

Next, among the configurations of the fuel injection valve 1 according to the present embodiment, a configuration group C including at least a supply flow channel to be described below and a configuration related to the supply flow channel will be described in detail with reference to FIGS. 24 to 26 and 12. In addition, a modification of the configuration group C will be described later with reference to FIGS. 27 to 35.

Figure 24:
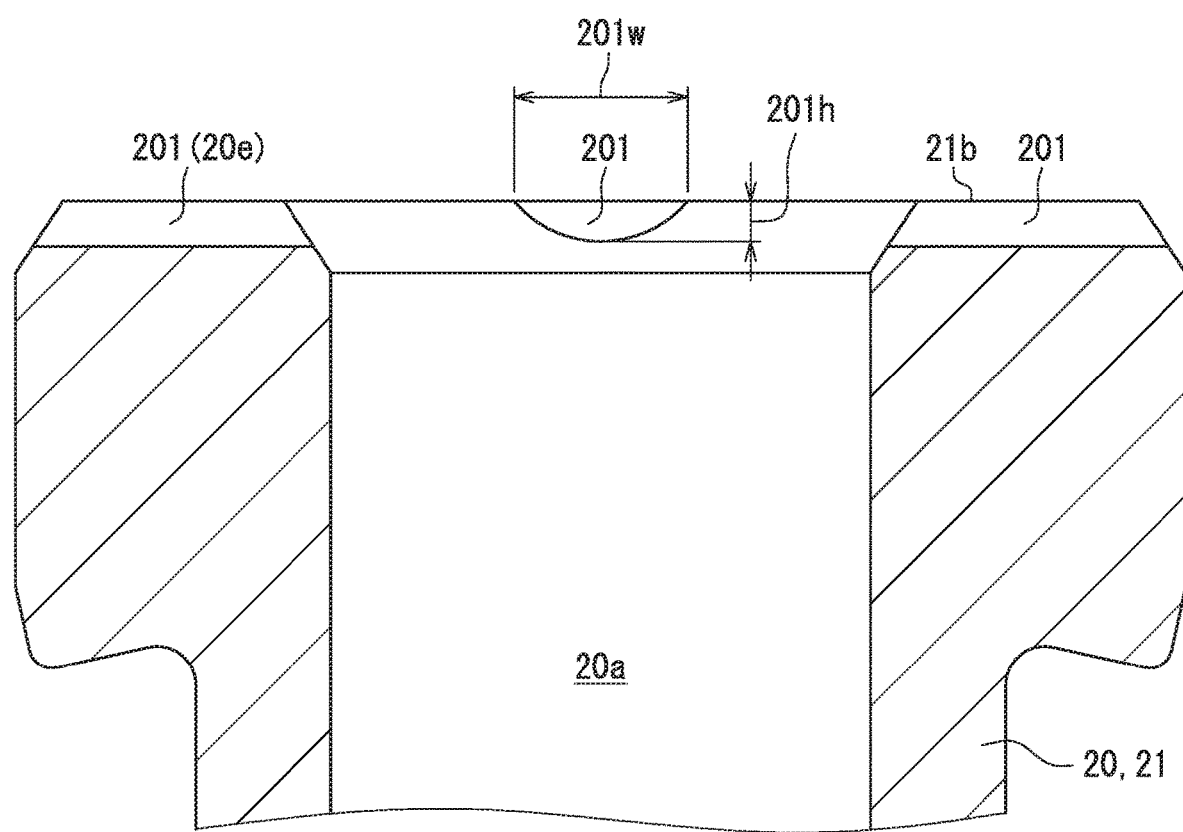
FIG. 24 is a sectional view showing the shape of a supply flow channel provided in a needle according to the first embodiment.
Figure 25:
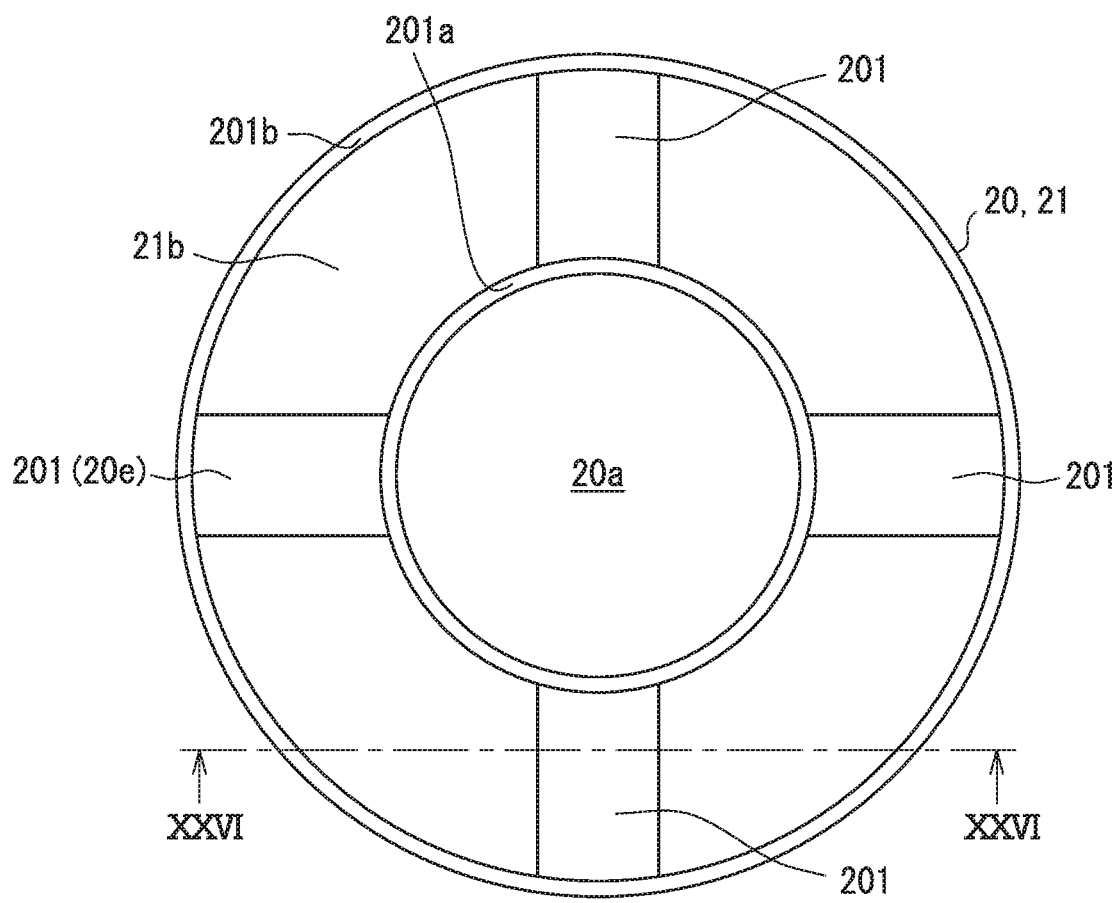
FIG. 25 is a top view of the needle shown in FIG. 24 as seen from the side opposite to the nozzle hole.

As shown in FIG. 24, main flow channels 20e having grooves are provided in the valve closing contact surface 21b of the needle 20. As shown in FIG. 25, the valve closing contact surface 21b is formed in a region extending annularly as seen from the moving direction of the movable core 30, and the main flow channels 20e are each shaped to extend so as to connect an annular inner side and an annular outer side across an annular region in which the valve closing contact surface 21b is formed. The main flow channels 20e each have a straight portion 201 extending linearly when viewed from the moving direction of the movable core. In the case of the present embodiment, the whole of the main flow channels 20e matches the whole of the straight portion 201.

The annular inner side corresponds to an internal passage 20a of the needle 20. The annular outer side corresponds to a gap B2 (refer to FIG. 12) between the inner surface of the cup 50 and the outer surface of the needle 20, which is provided in a state in which the valve closing contact surface 21b contacts the cup 50. Therefore, the main flow channels 20e communicate the internal passage 20a of the needle 20 with the gap B2 in a state in which the valve closing contact surface 21b contacts the cup 50.

The main flow channels 20e (supply flow channels) each have a shape extending so as to connect an inner peripheral surface of the needle 20 that defines the internal passage 20a and an outer peripheral surface of the needle 20. The outer peripheral surface of the needle 20 functions as a wall surface of a passage through which the fuel flows through the nozzle holes 11a. The fuel flowing through the passage provided by the gap between the outer peripheral surface of the needle 20 and the inner peripheral surface of the cylindrical portion 51 flows into the fuel storage chamber B1. Thereafter, the fuel flows into the movable chamber 12a through a gap between the inner peripheral surface of the movable core 30 and the outer peripheral surface of the needle 20 and a gap between the outer peripheral surface of the movable core 30 and the inner peripheral surface of the main body 12, and flows into the nozzle holes 11a through the flow channel 12b.

As shown in FIG. 25, an inner peripheral edge portion 201a and an outer peripheral edge portion 201b of the valve closing contact surface 21b in the needle 20 are chamfered. The main flow channels 20e (supply flow channels) each have a shape connecting the inner peripheral edge portion 201a and the outer peripheral edge portion 201b.

Figure 26:
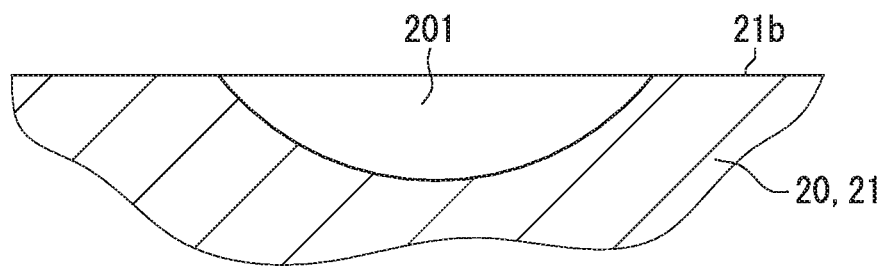
FIG. 26 is a sectional view taken along a line XXVI-XXVI of FIG. 25.

As shown in FIG. 25, a plurality of (e.g., four) main flow channels 20e are provided, and the multiple main flow channels 20e are arranged at regular intervals in the circumferential direction when viewed from the moving direction of the movable core 30. In other words, the multiple main flow channels 20e are arranged at regular intervals in the circumferential direction on the valve closing contact surface 21b of the needle 20. The main flow channels 20e each have a shape linearly extending in the radial direction. Each of the multiple main flow channels 20e has the same shape. As shown in FIG. 26, the cross section of the straight portion 201 of the main flow channels 20e has a shape having an arc-shaped bottom surface convex toward the nozzle hole side. Corner portions of the outer peripheral portion and the inner peripheral portion of the contact portion 21 of the needle 20 are chamfered, and the outer peripheral portion and the inner peripheral portion of the contact portion 21 are formed in a tapered shape.

A depth dimension 201h of the main flow channels 20e is defined as a dimension of the main flow channels 20e in the direction of the axis line C, and a width dimension 201w of the main flow channels 20e is defined as a dimension of the needle 20 around the direction of the axis line C (refer to FIG. 24). The depth dimension 201h of the main flow channels 20e is set to be larger than the width dimension 201w of the main flow channels 20e.

Now, in the case of the core boost structure in which the cup 50 contacts the needle 20 at the time when the movable core 30 starts to move together with the cup 50 by a predetermined amount by the start of energization of the coil, the following concern arises. In other words, if the cup 50 and the needle 20 are in close contact with and contacts each other, a phenomenon that the cup 50 is difficult to separate from the needle 20 (linking phenomenon) occurs, as a result of which, the start of the movement of the movable core 30 by a predetermined amount is delayed, which leads to a concern that the valve opening response is deteriorated.

To cope with the above concern, the present embodiment includes the needle 20 (valve body), the fixed core 13, the movable core 30, the first spring member SP1 (spring member), and the cup 50 (valve closing force transmission member). When the movable core 30 is attracted by the fixed core 13 and moved by a predetermined amount, the movable core 30 contacts the valve opening contact surface 21a, which is formed on the needle 20, and operates the needle 20 to open the valve. The first spring member SP1 is elastically deformed accompanying the valve opening operation of the needle 20, and exhibits a valve closing elastic force for closing the needle 20. The cup 50 contacts the valve closing contact surface 21b formed on the needle 20, and transmits the valve closing elastic force to the needle 20. When the movable core 30 starts to move together with the cup 50 by the predetermined amount, the cup 50 contacts the valve closing contact surface 21b. The needle 20 has the main flow channels 20e (supply flow channels) for supplying the fuel to the valve closing contact surface 21b in a state of contacting the cup 50.

Therefore, when the movable core 30 starts to move by the predetermined amount, the fuel is supplied to the valve closing contact surface 21b in a state in which the movable core 30 contacts the cup 50. For that reason, since the cup 50 can be inhibited from coming into close contact with the needle 20 and becoming difficult to separate from the needle 20, the possibility that the start of the movement of the movable core 30 by the predetermined amount is delayed due to the above-mentioned force of close contact can be reduced. Therefore, the valve opening response time from the start of the energization of the coil 17 to the start of the valve opening of the needle 20 can be shortened, and the valve opening response can be improved. In addition, the variation in the valve opening timing due to the obstruction of the movement of the movable core 30 can be reduced, and the variation in the fuel injection amount can be reduced.

Further, in the fuel injection valve 1 according to the present embodiment, the main flow channels 20e (supply flow channels) are provided by the grooves provided in the valve closing contact surface 21b of the needle 20. For that reason, the processing of the supply flow channels can be simplified and the supply flow channels can be easily provided as compared with the case where the through holes as the supply flow channels are provided in the needle 20 or the cup 50.

Further, in the fuel injection valve 1 according to the present embodiment, the valve closing contact surface 21b is formed in a region extending annularly as viewed from the moving direction of the movable core 30, and the supply flow channels have the main flow channels 20e extending so as to connect the annular inner side and the annular outer side across the region. For that reason, the fuel is supplied from both sides of the annular inner side and the annular outer side to the valve closing contact surface 21b, so that the reduction of the linking phenomenon due to the above-mentioned close contact can be promoted.

Further, in the fuel injection valve 1 according to the present embodiment, the multiple main flow channels 20e are provided, and the multiple main flow channels 20e are arranged at regular intervals in the circumferential direction when viewed from the moving direction of the movable core 30. According to the above configuration, the portions where a force of the cup 50 coming into close contact with the needle 20 is alleviated exist at regular intervals around the axial direction. For that reason, when the movable core 30 starts to move by the predetermined amount in the axial direction, the inclination direction of the movable core 30 with respect to the axial direction can be inhibited from changing. Therefore, since the behavior of the movable core 30 can be inhibited from becoming unstable, the variation in the valve opening response can be further reduced. If three or more main flow channels 20e are provided at regular intervals in the circumferential direction, the effect reducing the behavior instability is promoted.

In this example, when the depth dimension 201h of the main flow channels 20e is excessively small, if the flow channel cross-sectional area of the main flow channels 20e becomes small as the wear of the valve closing contact surface 21b progresses, the flow rate of the fuel flowing through the main flow channels 20e cannot be sufficiently ensured. Further, when the width dimension 201w of the main flow channels 20e is excessively large, the surface pressure when the cup 50 is pressed against the needle 20 by the valve closing elastic force becomes excessively large, and the pressure receiving area of the valve closing contact surface 21b cannot be sufficiently secured. As a result, the progress of wear of the valve closing contact surface 21b is accelerated.

In view of the above points, in the fuel injection valve 1 according to the present embodiment, the depth dimension 201h of the main flow channels 20e is set to be larger than the width dimension 201w of the main flow channels 20e. For that reason, the flow rate of the fuel flowing through the main flow channels 20e can be sufficiently ensured, and the progress of the wear of the valve closing contact surface 21b due to the excessive surface pressure can be inhibited.

[Modification C1]

Figure 27:
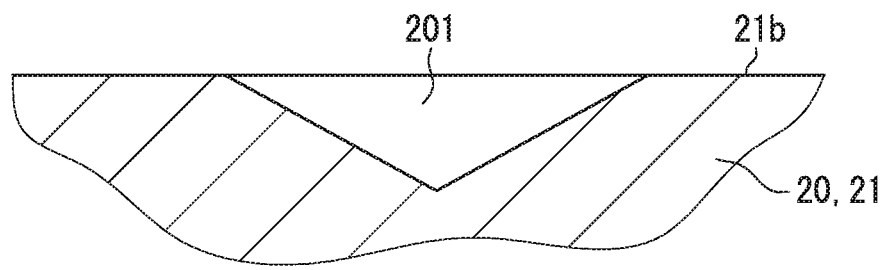
FIG. 27 is a sectional view showing Modification C1 with respect to FIG. 26.
Figure 28:
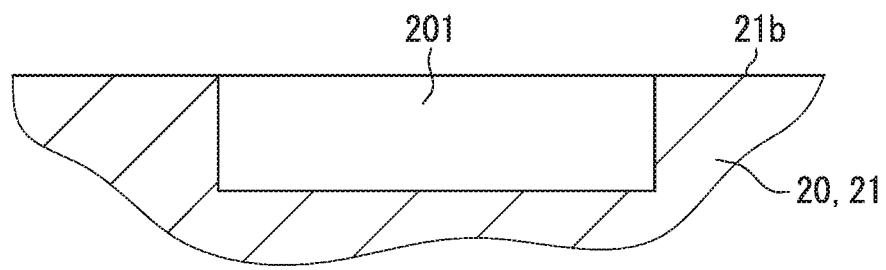
FIG. 28 is a sectional view showing Modification C2 with respect to FIG. 26.

In the present modification, the cross-sectional shape of the main flow channels 20e is modified. In other words, the straight portion 201 of the main flow channels 20e shown in FIG. 26 has a cross-sectional shape having an arc-shaped bottom surface. Alternatively, the straight portion 201 may have a triangular cross-sectional shape as shown in FIG. 27, or may have a rectangular cross-sectional shape as shown in FIG. 28.

Figure 29:
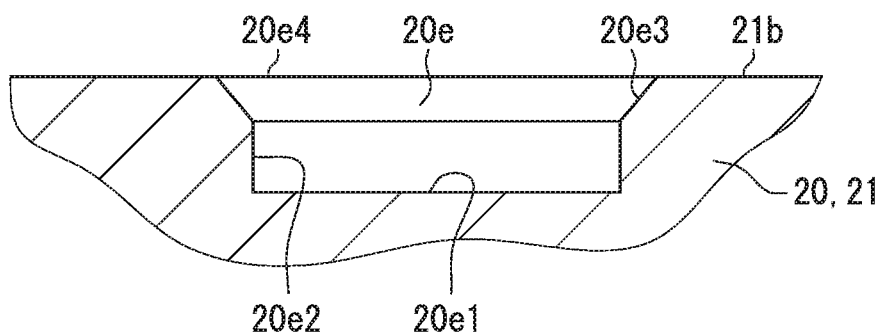
FIG. 29 is a sectional view showing Modification C3 with respect to FIG. 26.

As shown in FIG. 29, the straight portion 201 may have a cross-sectional shape combining a rectangle with a trapezoid. Specifically, the main flow channels 20e each have a bottom wall surface 20e1, a vertical wall surface 20e2, and a tapered surface 20e3. The bottom wall surface 20e1 has a shape extending perpendicularly to the moving direction of the movable core 30, the vertical wall surface 20e2 has a shape extending from the bottom wall surface 20e1 in the moving direction, and the tapered surface 20e3 has a shape extending from the vertical wall surface 20e2 toward a groove opening 20e4 while increasing the flow area. In an example shown in FIG. 29, the tapered surface 20e3 has a shape linearly extending from an upper end of the vertical wall surface 20e2.

As a machining method of the main flow channels 20e shown in FIG. 29, laser machining, electric discharge machining, cutting machining by an end mill, and the like are exemplified. First, a groove having a rectangular cross-sectional shape including the vertical wall surface 20e2 and the bottom wall surface 20e1 is processed. At this point of time, burrs generated at the time of processing may remain in a peripheral portion of the groove opening 20e4 in the vertical wall surface 20e2. After that, however, the above-mentioned burrs are removed by processing the tapered surface 20e3 having a trapezoidal cross-sectional shape.

[Modification C2]

Figure 30:
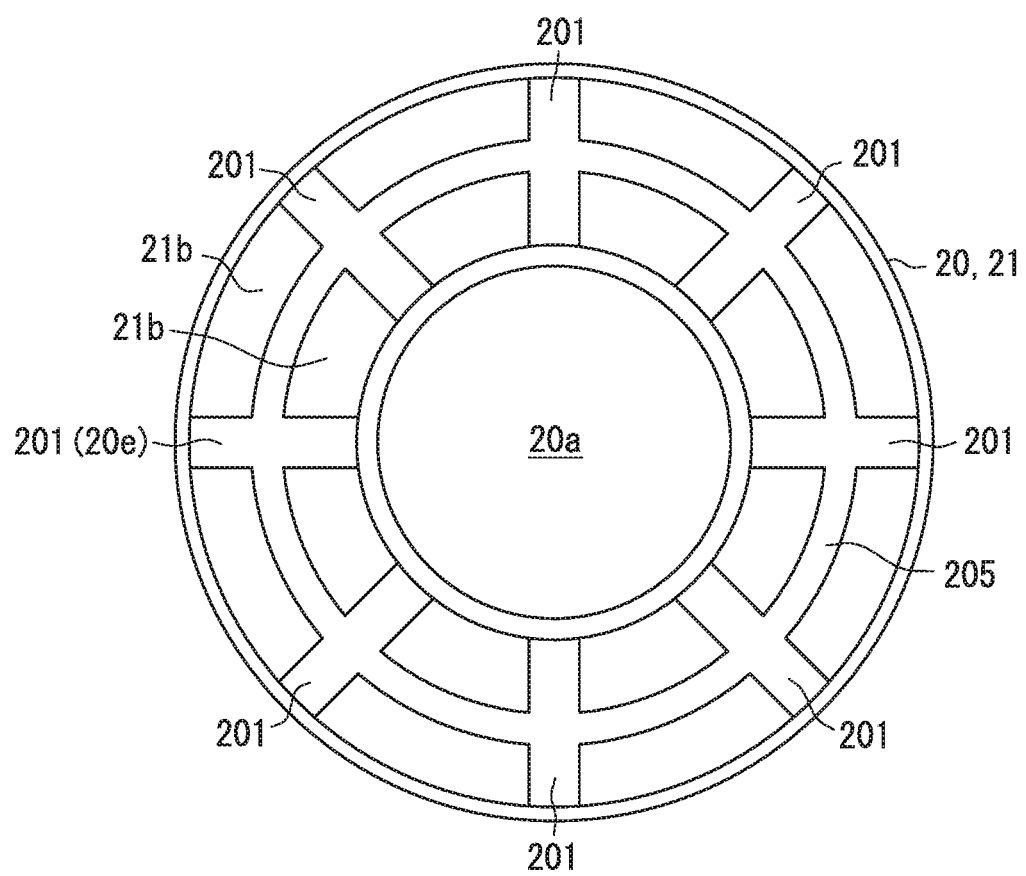
FIG. 30 is a top view of the needle as viewed from the side opposite to the nozzle hole, showing Modification C4 with respect to FIG. 25.

In the present modification shown in FIG. 30, the supply flow channel includes a branch flow channel 205 that branches from the main flow channels 20e and connects the main flow channels 20e to each other, in addition to the straight portions 201 that are the main flow channels 20e. The branch flow channel 205 has a shape extending annularly when viewed from the moving direction of the movable core 30. Specifically, the branch flow channel 205 has an annular shape surrounding the internal passage 20a. The branch flow channel 205 has a groove shape having the same depth as that of the straight portion 201. The branch flow channel 205 has a shape extending over the entire circumference so as to connect all the main flow channels 20e to each other.

In an example of FIG. 25, four main flow channels 20e are provided, but in the present modification, eight main flow channels 20e are provided, and the multiple main flow channels 20e are arranged at regular intervals in the circumferential direction when viewed from the moving direction of the movable core 30. One branch flow channel 205 having an annular shape is provided.

In an example of FIG. 25, the valve closing contact surface 21b is divided in the circumferential direction by the straight portion 201. On the other hand, in the present modification shown in FIG. 30, since the branch flow channel 205 is provided in addition to the straight portion 201, the valve closing contact surface 21b is divided in the radial direction in addition to the division in the circumferential direction.

In a state in which the needle 20 contacts the cup 50, a part of the fuel flowing into the main flow channels 20e from both sides of the annular inner side and the annular outer side is supplied to the valve closing contact surface 21b from the circumferential direction. Further, the fuel that has flowed into the branch flow channel 205 after having flowed into the main flow channels 20e is supplied to the valve closing contact surface 21b from the radial direction.

As described above, according to the present modification, the supply flow channel has the branch flow channel 205 branched from the main flow channels 20e in addition to the main flow channels 20e connecting the annular inner side and the annular outer side. For that reason, the fuel is supplied from both the main flow channels 20e and the branch flow channel 205 to the valve closing contact surface 21b. This makes it possible to promote a reduction of the linking phenomenon due to the above-mentioned close contact.

Further, in the fuel injection valve according to the present modification, the branch flow channel 205 has a shape extending annularly when viewed from the moving direction of the needle 20. For that reason, both ends of the branch flow channel 205 communicate with the main flow channels 20e, so that the inflow of the fuel from the main flow channels 20e to the branch flow channel 205 can be promoted, and the supply of the fuel to the valve closing contact surface 21b can be promoted.

[Modification C3]

Figure 31:
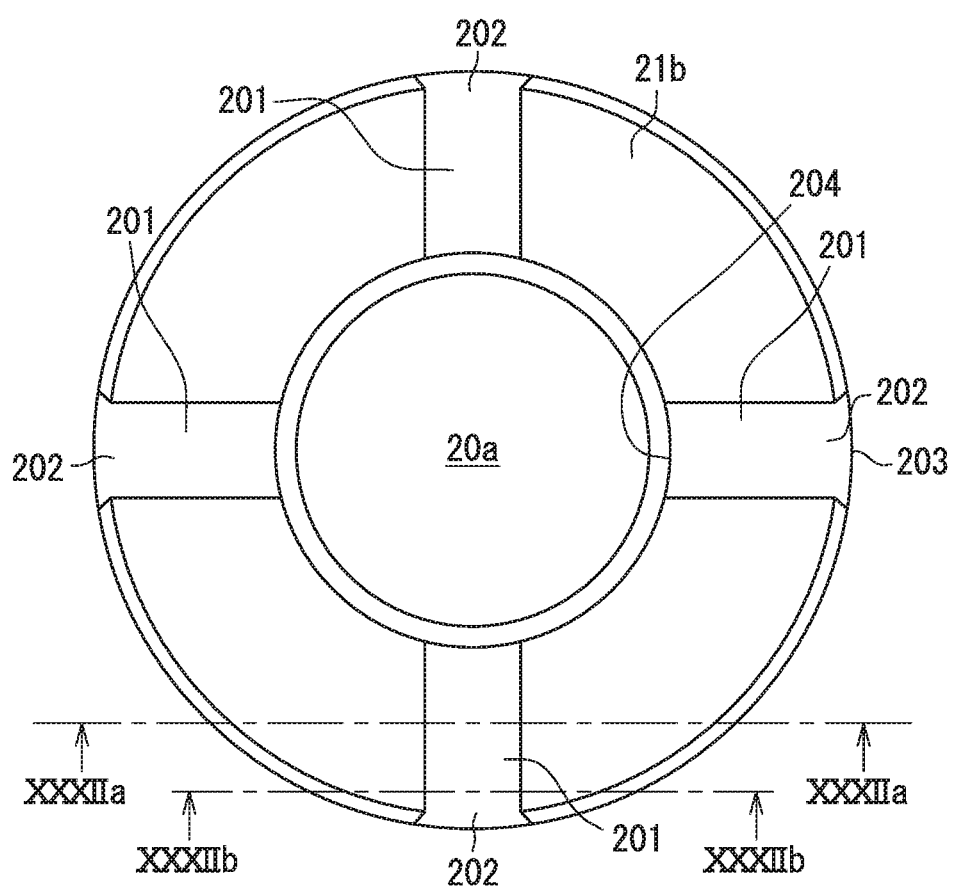
FIG. 31 is a top view of the needle as viewed from the side opposite to the nozzle hole, showing Modification C5 with respect to FIG. 25.

In the present modification shown in FIG. 31, the main flow channels 20e each have the straight portions 201 and inflow portions 202. The straight portions 201 each have a shape extending linearly when viewed from the moving direction of the movable core 30. The inflow portion 202 communicates with the straight portion 201 to form an inflow port 203 for the fuel to the main flow channel 20e. A flow channel cross section of the inflow portion 202 has a shape larger in area than a flow channel cross section of the straight portion 201. Specifically, in the sectional view shown in (b) of FIG. 32, the inflow portion 202 has a shape in which the groove width increases toward the nozzle hole. In a top view shown in FIG. 31, the inflow portion 202 has a shape in which the groove width increases toward the radially outer side.

Among the fuel inflow ports 203 and 204 provided at both ends of the main flow channels 20e, the inflow port 203 located outside the above-mentioned annularly extending region is provided with the inflow portion 202 having an enlarged area. On the other hand, the inflow port 204 located inside the annularly extending region is not provided with an inflow portion having an enlarged area. Corner portions of the outer peripheral portion and the inner peripheral portion of the contact portion 21 of the needle 20 are chamfered, and the outer peripheral portion and the inner peripheral portion of the contact portion 21 are formed in a tapered shape.

The main flow channels 20e are provided by laser processing. A one-dot chain line in FIG. 32 indicates a center of a laser beam. First, as shown in the column (a) of FIG. 32, a groove in a portion corresponding to the straight portion 201 is provided by a laser. More specifically, laser processing is started from the inside in the radial direction, and the laser beam is moved from the inside toward the outside. In the processing of the straight portion 201, a focal point of the laser beam is made to coincide with a bottom surface of the groove.

Figure 32:
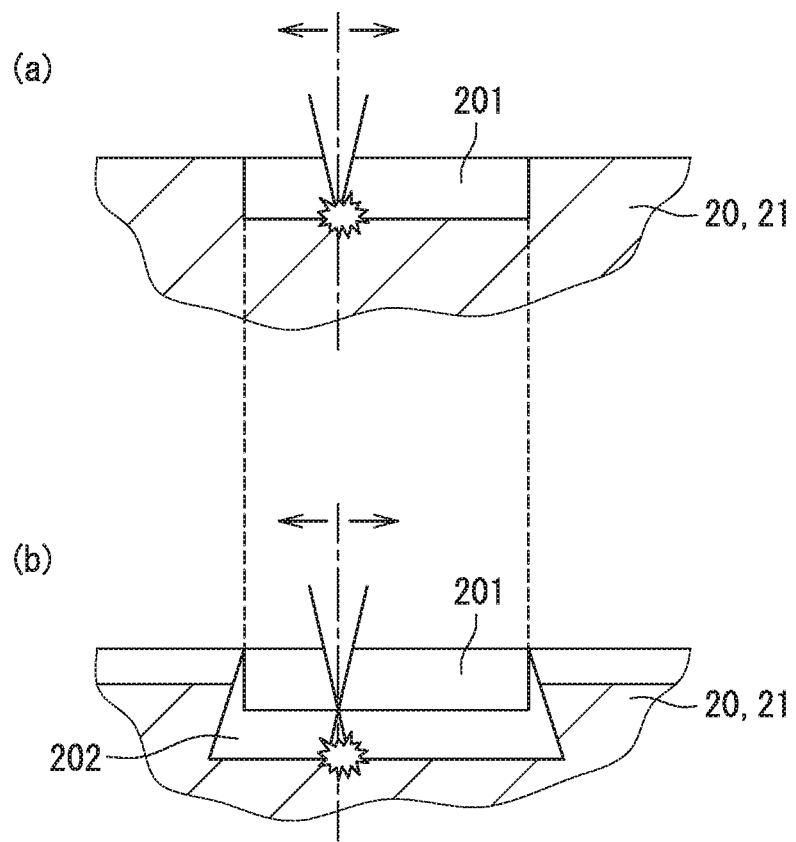
FIG. 32 is a sectional view of FIG. 31, (a) is a sectional view taken along a line XXXIIa-XXXIIa, and (b) is a sectional view taken along a line XXXIIb-XXXIIb.
Figure 33:
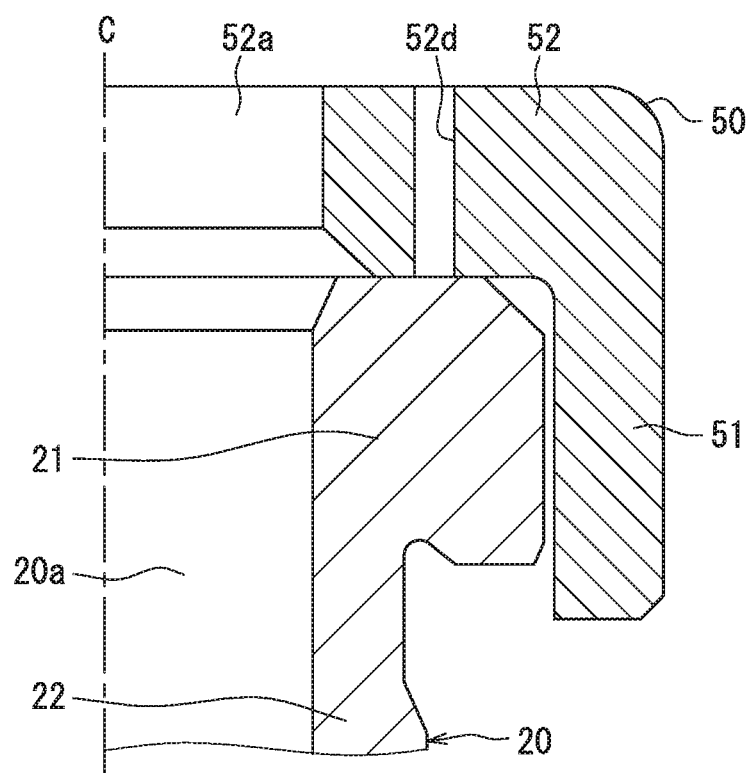
FIG. 33 is a sectional view showing Modification C6 with respect to FIG. 24.
Figure 34:
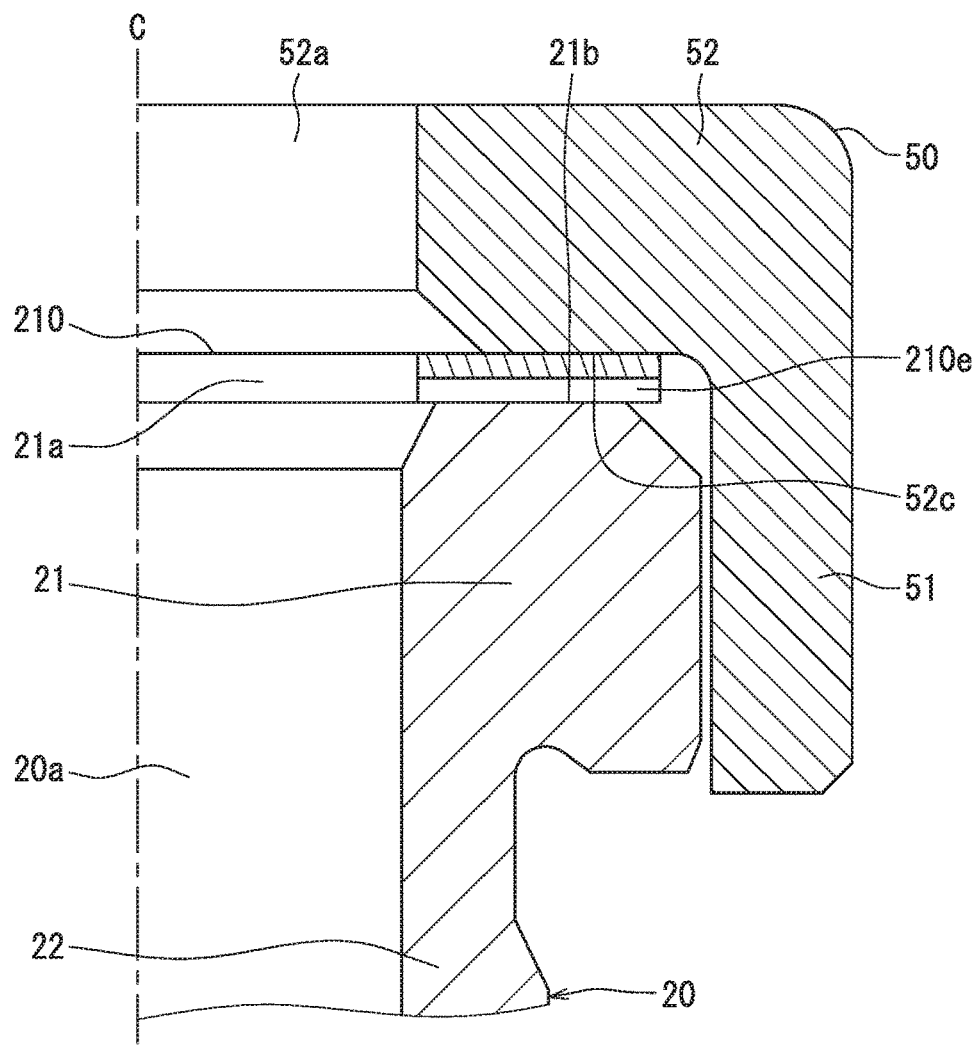
FIG. 34 is a sectional view showing Modification C7 with respect to FIG. 24.
Figure 35:
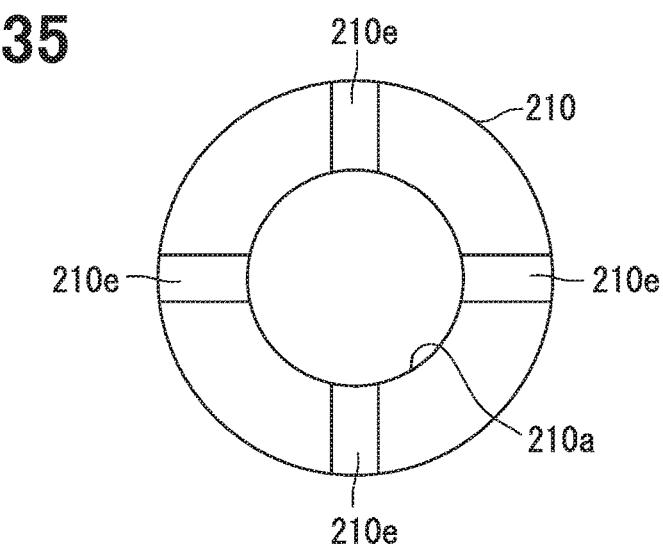
FIG. 35 is a top view of a plate shown in FIG. 34 as seen from a nozzle hole side.

After the laser beam has been moved to the outer end portion of the straight portion 201 to complete the processing of the straight portion 201, the laser beam is further moved to the radially outer side, and the groove in the portion corresponding to the inflow portion 202 is processed by the laser as shown in the column (b) of FIG. 32. The focal point of the laser beam at the time of processing the inflow portion 202 is set to be the same as the focal point of the laser beam at the time of processing the straight portion 201. Since the outer peripheral portion of the contact portion 21 is formed in a tapered shape, the bottom surface of the inflow portion 202 is cut at a position deviated from the focal point of the laser beam. As a result, since a cutting width at the bottom surface of the inflow portion 202 is made larger than a cutting width at the bottom surface of the straight portion 201, the inflow portion 202 is formed in a shape in which the groove width is larger toward the nozzle hole side.

As described above, according to the present modification, the main flow channels 20e have the straight portion 201 extending linearly as viewed from the moving direction of the movable core 30, and the inflow portion 202 communicating with the straight portion 201 to form the inflow port 203 of the fuel. The flow channel cross section of the inflow portion 202 has a shape in which the area is enlarged as compared with the flow channel cross section of the straight portion 201. For that reason, as compared with the case where the inflow portion 202 is not provided, the fuel easily flows from the inflow port 203 into the straight portion 201, and therefore, the fuel supply to the valve closing contact surface 21b can be promoted.

[Modification C4]

The supply flow channel shown in FIG. 24 is provided by the grooved main flow channel 20e provided in the needle 20. In contrast, in the present modification shown in FIG. 33, a through hole 52d is provided in the cup 50, and the through hole 52d provides a supply flow channel for supplying the fuel to the valve closing contact surface 21b.

According to the above configuration, when the movable core 30 starts to move by a predetermined amount, the fuel of the flow channel 13a is supplied to the valve closing contact surface 21b in a state in which the movable core 30 contacts the cup 50 through the through hole 52d. For that reason, similarly to the embodiment of FIG. 24, since the cup 50 can be inhibited from coming into close contact with the needle 20 and becoming difficult to separate from the needle 20, the valve opening responsiveness can be improved and the variation in the fuel injection amount due to the variation in the valve opening timing can be reduced.

[Modification C5]

In the supply flow channel shown in FIG. 24, the grooved main flow channels 20e are provided in the needle 20. On the other hand, in the present modification shown in FIGS. 34 and 35, a groove-d main flow channel 210e is provided in a plate 210 which will be described below.

The plate 210 is disposed between the needle 20 and the cup 50 and is circular plate-shaped and made of metal. In the illustrated example, the main flow channel 210e is provided on the surface of the plate 210 on the nozzle hole side, alternatively may be formed on the surface of the plate 210 on the side opposite to the nozzle hole side. The multiple (for example, four) main flow channels 210e are provided, and the multiple main flow channels 210e are arranged at regular intervals in the circumferential direction when viewed from the moving direction of the movable core 30. The main flow channels 210e each have a shape linearly extending in the radial direction. The multiple main flow channels 210e each have the same shape.

The main flow channels 210e each have a shape extending so as to connect the annular inner side and the annular outer side across the annular region in which the valve closing contact surface 21b is formed in the same manner as the main flow channels 20e shown in FIG. 25. Therefore, the main flow channels 210e each communicate the internal passage 20a of the needle 20 with the gap B2 in a state in which the valve closing contact surface 21b contacts the cup 50 through the plate 210.

The plate 210 is not coupled to the needle 20 and the cup 50, but is defined as a part of the needle 20 or the cup 50. A through hole 52a of the cup 50 and a through hole 210a communicating with the internal passage 20a of the needle 20 are provided in the plate 210.

As described above, according to the present modification, when the movable core 30 starts to move by a predetermined amount, the fuel in the flow channel 13a is supplied to the valve closing contact surface 21b in a state in which the movable core 30 contacts the cup 50 through the plate 210 through the main flow channel 210e. For that reason, similarly to the embodiment of FIG. 24, since the needle 20 can be inhibited from coming into close contact with the plate 210 and becoming difficult to separate from the plate 210, the valve opening responsiveness can be improved and the variation in the fuel injection amount due to the variation in the valve opening timing can be reduced.

[Modification C6]

The supply flow channel shown in FIG. 24 is provided by the grooved main flow channel 20e provided in the valve closing contact surface 21b of the needle 20. On the other hand, in the present modification, the main flow channel 20e is eliminated, and the supply flow channel is provided by unevenness which will be described below. In other words, shot blasting for causing an abrasive material to collide with the valve closing contact surface 21b is performed to increase the surface roughness of the valve closing contact surface 21b, whereby the valve closing contact surface 21b is provided with unevenness. The unevenness is substituted for the main flow channel 20e which provides the supply flow channel. In other words, the surface roughness of the valve closing contact surface 21b is made rougher than that of the inner peripheral surface of the part forming the internal passage 20a of the surface of the needle 20. Alternatively, the surface roughness of the valve closing contact surface 21b is made rougher than that of the outer peripheral surface of the needle 20.

According to the supply flow channel by the unevenness, the hardness of the valve closing contact surface 21b is increased by shot blasting. For that reason, the abrasion resistance of the valve closing contact surface 21b can be improved due to the repeated collision of the cup 50 with the needle 20.

Instead of performing the shot blasting on the needle 20 to form the unevenness as described above, shot blasting may be performed on the valve closing force transmission contact surface 52c of the cup 50 to form the unevenness. In that case, the supply flow channel is provided by the unevenness formed on the valve closing force transmission contact surface 52c.

<Detailed Description of Configuration Group D>

Figure 36:
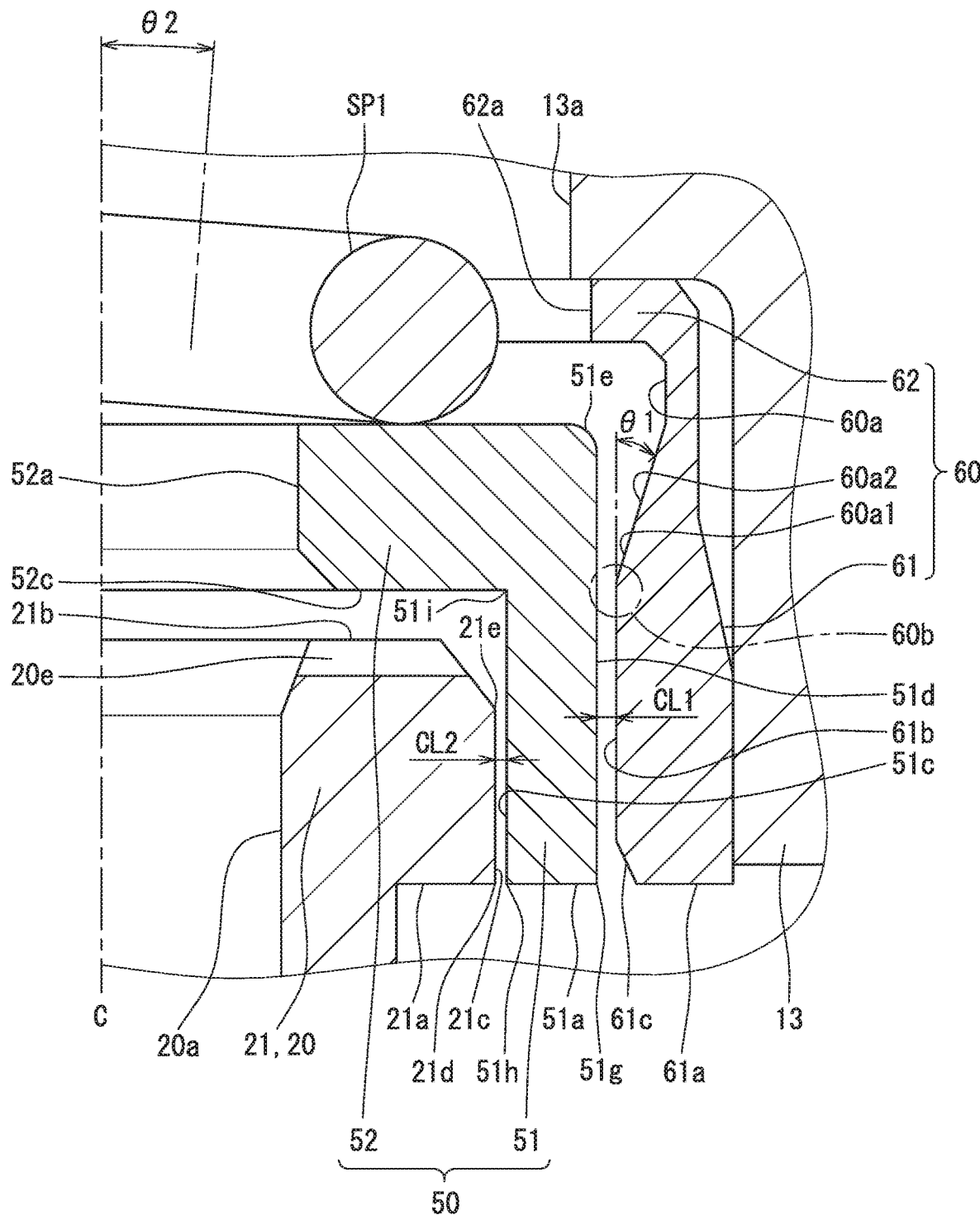
FIG. 36 is a sectional view showing a shape of a recessed surface provided in a guide member at the time of full lift according to the first embodiment.

Next, among the configurations of the fuel injection valve 1 according to the present embodiment, a configuration group D including at least a recessed surface 60a to be described below and a configuration related to the recessed surface 60a will be described in detail with reference to FIGS. 36 and 37.

As described above, the inner peripheral surface of the cylindrical portion 61 of the guide member 60 forms the sliding surface 61b that slides with the outer peripheral surface 51d of the cylindrical portion 51 of the cup 50. The sliding surface 61b slides the outer peripheral surface 51d of the cup 50 so as to guide the movement of the cup 50 in the direction of the axis line C while restricting the movement of the cup 50 in the radial direction. The sliding surface 61b is a surface having a shape extending in parallel with the direction of the axis line C.

The recessed surface 60a is formed on a surface of the inner surface of the guide member 60 which is connected to the side opposite to the nozzle holes of the sliding surface 61*b*. The recessed surface 60*a* is shaped to be recessed in a direction in which the gap to the cup 50 is enlarged in the radial direction. The recessed surface 60*a* has a shape extending annularly around the axis line C, and has the same shape in any cross section in the circumferential direction.

An adjacent surface 60*a*1 of the recessed surface 60*a* adjacent to the sliding surface 61*b* is a surface connected to the sliding surface 61*b* on the side opposite to the nozzle hole, and is shaped to gradually enlarge a gap CL1 from the cup 50 in the radial direction as a distance from the sliding surface 61*b* increases. The adjacent surface 60*a*1 includes a tapered surface 60*a*2 extending linearly in a cross section including the axis line C. A boundary portion 60*b* of the guide member 60 including a boundary between the adjacent surface 60*a*1 and the sliding surface 61*b* has a shape curved to be convex inward in the radial direction, that is, an R-shape. As a result, the cup 50 can be inhibited from being worn by the guide member 60.

A chamfered portion 61*c* formed in a tapered shape by chamfering is provided at a portion connecting the stopper contact end face 61*a* and the sliding surface 61*b*. The boundary portion including the boundary between the chamfered portion 61*c* and the sliding surface 61*b* has a shape curved to be convex inward in the radial direction, and inhibits the cup 50 from being worn by the guide member 60.

In the cup 50, a corner portion 51*g* connecting the outer peripheral surface 51*d* and the core contact end face 51*a* and a corner portion 51*h* connecting the transmission member-side sliding surface 51*c* and the core contact end face 51*a* are chamfered so as to have a tapered shape or an R shape. A corner portion 21*d* of the needle 20, which connects the valve body-side sliding surface 21*c* and the valve opening contact surface 21*a*, is also chamfered so as to have a tapered shape or an R-shape. A boundary portion 21*e* including a boundary between the chamfered portion formed on the side opposite to the nozzle hole with respect to the valve body-side sliding surface 21*c* and the valve body-side sliding surface 21*c* has a shape curved to be convex outward in the radial direction, and inhibits wear between the cup 50 and the needle 20.

In the following description, a part of the surface of the cup 50, which includes the outer peripheral surface 51*d* of the cylindrical portion 51 of the cup 50 and extends in parallel with the direction of the axis line C, is referred to as a parallel surface. In an example of FIG. 36, the entire outer peripheral surface 51*d* corresponds to a parallel surface, and a range indicated by a symbol M1 in FIG. 37 is a parallel surface in the surface of the cup 50.

Further, a surface which is connected to the side opposite to the nozzle holes of the parallel surface and which is located in the radially inner side of the parallel surface is referred to as a connection surface 51*e*. The connection surface 51*e* is curved to be convex outward of the cup 50 in the radial direction. In the surface of the cup 50, a range indicated by a symbol M2 in FIG. 37 is the connection surface 51*e*. The surface of the connection surface 51*e* connected to the side opposite to the parallel surface is a spring contact surface to which the first elastic force is applied by contacting the first spring member SP1. The spring contact surface has a shape extending perpendicularly to the direction of the axis line C.

Figure 37:
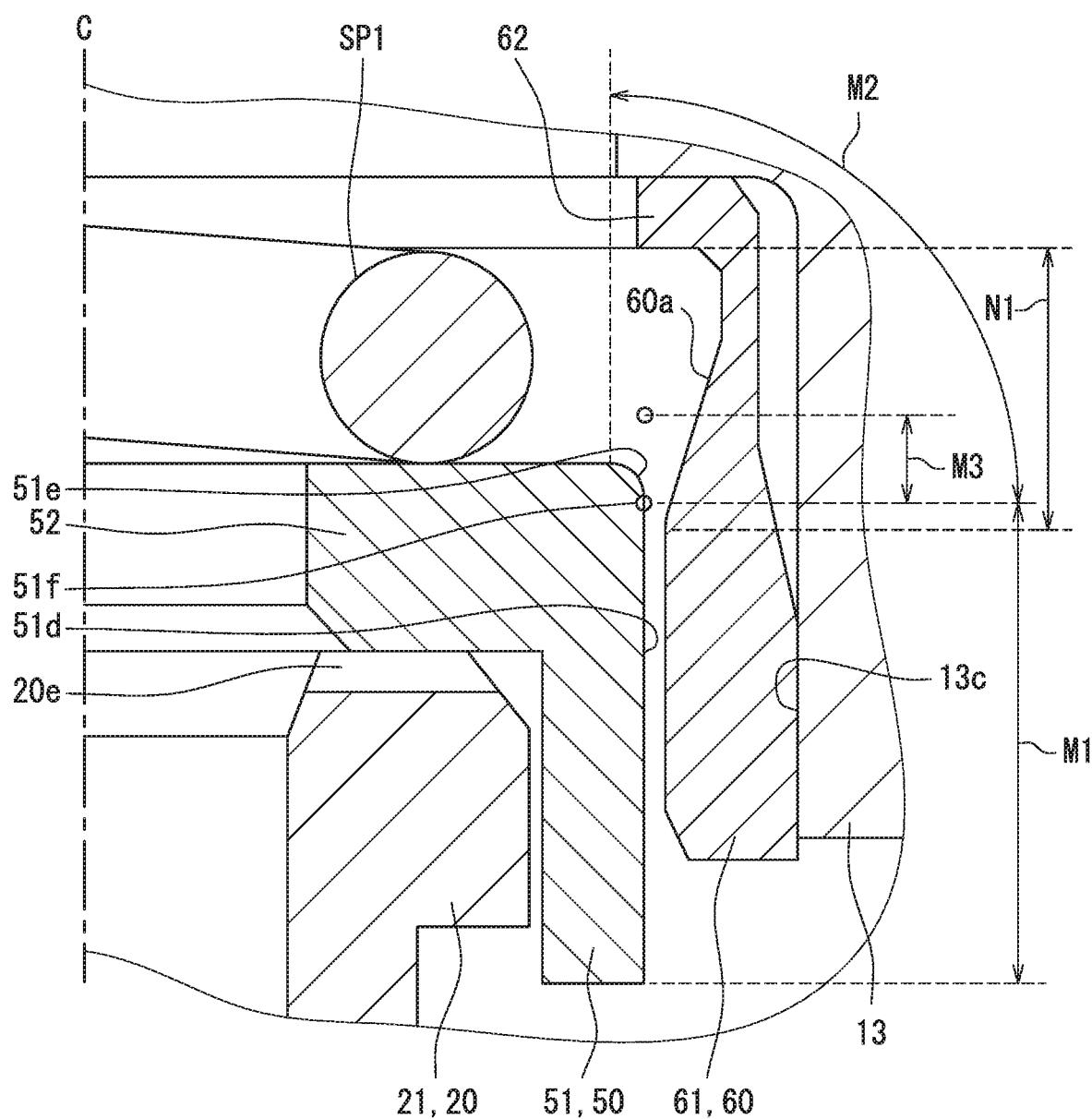
FIG. 37 is a sectional view showing the shape of the recessed surface provided in the guide member at the time of closing the valve according to the first embodiment.

A boundary line between the parallel surface and the connection surface 51*e* is referred to as a connection boundary line 51*f* (refer to a circle in FIG. 37). As the movable core 30 moves in the direction of the axis line C, the cup 50 also moves in the direction of the axis line C. A movable range M3 of the connection boundary line 51*f* in the direction of the axis line C by the above movement is entirely located within a range N1 of the recessed surface 60*a* in the direction of the axis line C.

The outer peripheral surface of the guide member 60 is press-fitted into the enlarged diameter portion 13*c* of the fixed core 13. In this manner, since the guide member 60 is press-fitted into the fixed core 13, the guide member 60 is not tilted with respect to the fixed core 13. However, a dimensional tolerance of the outer peripheral surface of the guide member 60 or the inner peripheral surface of the enlarged diameter portion 13*c* is tilted. On the other hand, since the cup 50 is slidably disposed with respect to the guide member 60, a gap CL1 for sliding is provided between the cup 50 and the guide member 60. Accordingly, the cup 50 can be tilted with respect to the fixed core 13 and the guide member 60. In other words, the axis line C of the cup 50 may be tilted with respect to the axis line C of the fixed core 13.

Since the needle 20 is slidably disposed on the cup 50, a gap CL2 for sliding is provided between the needle 20 and the cup 50. Therefore, the needle 20 may be further tilted with respect to the inclinable cup 50. In other words, the axis line C of the needle 20 may be further tilted relative to the axis line C of the inclinable cup 50. Therefore, an angle (maximum inclination angle) at which the needle 20 is tilted to the maximum and the cup 50 is tilted to the maximum in the same direction as that of the needle 20 corresponds to the assumed maximum inclination angle 62 (refer to FIG. 36) at which the cup 50 is tilted. The tapered surface 60*a*2 is formed so that an inclination angle 61 (refer to FIG. 36) at which the tapered surface 60*a*2 is tilted with respect to the sliding surface 61*b* of the guide member 60 is larger than the maximum inclination angle 62 of the cup 50.

The gap CL1 between the parallel surface of the cup 50 and the sliding surface 61*b* of the guide member 60 is set to be larger than the gap CL2 between the cup 50 and the needle 20. Therefore, the inclination angle of the cup 50 when the gap CL2 is zero is larger than the inclination angle of the needle 20 when the gap CL1 is zero.

A sliding distance between the cup 50 and the guide member 60 in the gap CL1 is set to be longer than a sliding distance between the cup 50 and the needle 20 in the gap CL2. In this example, the longer the sliding distance, the smaller the inclination caused by the gap. For example, the longer the sliding distance in the gap CL1, the smaller the inclination of the cup 50 with respect to the guide member 60. The longer the sliding distance in the gap CL2, the smaller the inclination of the needle 20 with respect to the cup 50. Even if both those inclinations are maximum, the connection surface 51*e* is set so as not to contact the guide member 60.

The guide member 60 is made of a magnetic material, and the cup 50 is made of a non-magnetic material. In general, a nonmagnetic material has a lower hardness than a magnetic material. Nevertheless, in the present embodiment, the cup 50 and the guide member 60 have the same hardness. In other words, a high hardness nonmagnetic material is used as the cup 50 instead of a general nonmagnetic material. The hardness of the cup 50 (cup hardness) and the hardness of the guide member 60 (guide member hardness) are, for example, values ranging from Vickers hardness HV600 to HV700. If the deviation of the guide member hardness with respect to the cup hardness falls within a range of −10% to +10% of the cup hardness, both the hardness are considered to have the same hardness.

When the wear progresses due to the sliding between the cup 50 and the guide member 60, the cup 50 is largely tilted with respect to the guide member 60, and consequently, the needle 20 is largely tilted together with the cup 50. When the inclination of the needle 20 increases, the valve opening and closing timing of the needle 20 varies, and the variation in the fuel injection amount increases.

To cope with the above concern, the present embodiment includes the needle 20 (valve body), the fixed core 13, the movable core 30, the first spring member SP1 (spring member), the cup 50 (valve closing force transmission member), and the guide member 60.

The movable core 30 contacts the needle 20 at a point of time when the movable core 30 is attracted by the fixed core 13 and moved by a predetermined amount, and causes the needle 20 to perform the valve opening operation. The first spring member SP1 is elastically deformed accompanying the valve opening operation of the needle 20, and exhibits a valve closing elastic force for closing the needle 20. The cup 50 has a valve body transmission portion (circular plate portion 52) that contacts the first spring member SP1 and the needle 20 to transmit the valve closing elastic force to the needle 20, and a cylindrical portion 51 that urges the movable core 30 toward the nozzle holes. The guide member 60 has a sliding surface 61b that slides the outer peripheral surface 51d of the cylindrical portion 51 so as to guide the movement of the cylindrical portion 51 in the direction of the axis line C while restricting the movement of the cylindrical portion 51 in the radial direction. The guide member 60 is provided with the recessed surface 60a which is a surface connected to the sliding surface 61b on the side opposite to the nozzle hole and which is recessed in a direction in which the gap with the cup 50 is enlarged in the radial direction. The valve body transmission portion is a circular plate portion 52 having a circular plate shape, and the cylindrical portion 51 is a shape extending from the circular plate outer peripheral edge of the circular plate portion 52 to the nozzle hole side.

In the surface of the cup 50, a surface that includes the outer peripheral surface of the cylindrical portion 51 and extends in parallel with the axis line C direction is the parallel surface, a surface that is connected to the parallel surface on the side opposite to the nozzle holes and is located on the radially inner side of the parallel surface is the connection surface 51e, and a boundary line between the parallel surface and the connection surface 51e is the connection boundary line 51f. The movable range M3 of the connection boundary line 51f in the axial direction is entirely located within a range N1 of the recessed surface 60a in the axial direction. In other words, the position of the connection boundary line 51f in the axial direction is in the range N1 in which the recessed surface 60a is provided, regardless of whether the needle 20 is fully lifted or closed.

For that reason, when the cup 50 moves in the axial direction while sliding on the guide member 60, the connection boundary line 51f faces the recessed surface 60a and does not contact the sliding surface 61b. This makes it possible to inhibit the cup 50 from being pressed against the guide member 60 in a state where the surface pressure component in the axial direction is large, and makes it possible to reduce the wear of the cup 50. For that reason, the inclination of the cup 50 can be reduced, and consequently the inclination of the needle 20 can be reduced, so that the variation in the fuel injection amount due to the variation in the valve opening and closing timing of the needle 20 can be reduced.

Further, in the fuel injection valve 1 according to the present embodiment, the adjacent surface 60a1 of the recessed surface 60a, which is adjacent to the sliding surface 61b, is shaped to gradually enlarge the gap CL1 between the fuel injection valve 1 and the cup 50 in the radial direction as a distance from the sliding surface 61b increases. In this example, contrary to the present embodiment, in the case where the adjacent surface 60a1 has a shape in which the radial direction is enlarged in a stepped manner, the surface pressure when the corner portion of the stepped portion is pressed against the cup 50 moving toward the nozzle hole side is increased, and there is a concern that the wear is accelerated. In view of the above circumstances, since the adjacent surface 60a1 according to the present embodiment has a shape that gradually expands in the radial direction, the above-mentioned surface pressure can be alleviated, and the fear of promoting the wear between the cup 50 and the guide member 60 can be reduced.

Further, in the fuel injection valve 1 according to the present embodiment, the adjacent surface 60a1 includes the tapered surface 60a2 extending linearly in sectional view. The inclination angle 61 at which the tapered surface 60a2 is tilted with respect to the sliding surface 61b is larger than the assumed maximum inclination angle 62 at which the cup 50 is tilted. For that reason, the possibility that the tilted cup 50 comes into contact with the tapered surface 60a2 can be reduced, and the fear of promoting the wear between the cup 50 and the guide member 60 can be reduced.

Further, in the fuel injection valve 1 according to the present embodiment, the boundary portion 60b including the boundary between the adjacent surface 60a1 and the sliding surface 61b has a shape curved to be convex inward in the radial direction. In this example, contrary to the present embodiment, in the case where the boundary portion has a sharp shape, the surface pressure when the boundary portion is pressed against the cup 50 moving toward the nozzle hole side is increased, and there is a fear of promoting wear. In view of the above circumstances, in the present embodiment, since the boundary portion 60b has a shape curved to be convex inward in the radial direction, the surface pressure can be alleviated, and the fear of promoting wear can be reduced.

Further, in the fuel injection valve 1 according to the present embodiment, the guide member 60 is made of a magnetic material, and the cup 50 is made of a non-magnetic material. According to the above configuration, the parallel surface of the cup 50 can be prevented from being pressed against the sliding surface 61b of the guide member 60 by the electromagnetic attraction force acting on the cup 50 in the radial direction. Therefore, the wear between the cup 50 and the guide member 60 can be reduced.

Further, in the fuel injection valve 1 according to the present embodiment, the cup 50 and the guide member 60 have the same hardness. In general, a nonmagnetic material has a lower hardness than a magnetic material. Nevertheless, in the present embodiment, as described above, a high-hardness nonmagnetic material is used as the cup 50 instead of a general nonmagnetic material. For that reason, the possibility that the wear of the member on the low hardness side is accelerated when there is a difference in hardness can be avoided while avoiding the electromagnetic attraction force acting on the cup 50.

Further, in the fuel injection valve 1 according to the present embodiment, the gap CL1 between the parallel surface of the cup 50 and the sliding surface 61b of the guide member 60 is larger than the gap CL2 between the cup 50 and the needle 20.

In this example, the needle 20 may be opened and closed in a state of being tilted with respect to the direction of the axis line C. When the needle 20 is tilted, the cup 50 is tilted by a tilting force, and when the cup 50 is tilted, the force with which the cup 50 is pressed against the guide member 60 increases, which may cause wear. Therefore, according to the present embodiment in which the recessed surface 60a is applied to a configuration in which wear is concerned as described above, the wear reduction effect by the recessed surface 60a can be more effectively exhibited.

<Detailed Description of Configuration Group E>

Next, a configuration group E including at least the press-fit structure between the outer core 31 and the inner core 32 and the configuration related to the press-fit structure among the configurations of the fuel injection valve 1 according to the present embodiment will be described in detail with reference to FIGS. 38 and 39. In addition, a modification of the configuration group E will be described later with reference to FIGS. 40 to 42.

Figure 38:
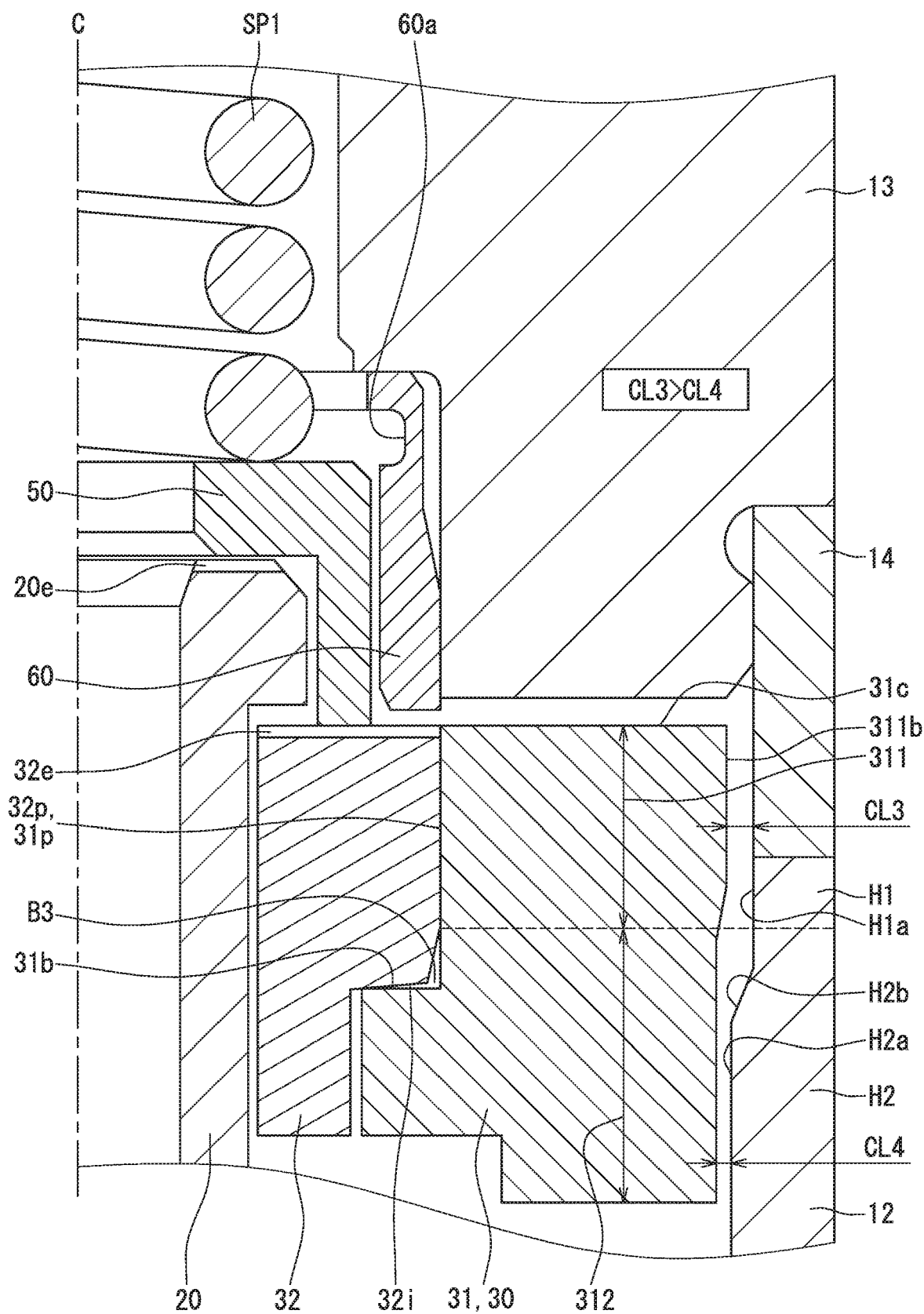
FIG. 38 is a sectional view showing a gap between a movable core and a holder at the time of closing the valve according to the first embodiment.

As shown in FIG. 38, a press-fit surface 31p formed on the inner peripheral surface of the outer core 31 and a press-fit surface 32p formed on the outer peripheral surface of the inner core 32 are press-fitted to each other. Those press-fit surfaces 31p and 32p are not formed over the entire area in the direction of the axis line C, but are formed partially in the direction of the axis line C.

In the present embodiment, the press-fit surfaces 31p and 32p are formed on a part of the movable core 30 on the side opposite to the nozzle hole, and in the following description, a portion of the outer core 31 where the press-fit surface 31p is formed and the entire portion in the direction of the axis line C including the press-fit surface 31p is referred to as a press-fit region 311. A portion of the outer core 31 where the press-fit surface 31p is not formed and the entire portion in the radial direction which does not include the press-fit surface 31p is referred to as a non-press-fit region 312. In other words, in the direction of the axis line C, the outer core 31 is divided into a press-fit region 311 on a side opposite to the nozzle hole and a non-press-fit region 312 on the nozzle hole side adjacent to the press-fit region in the direction of the axis line C.

The non-press-fit region 312 is formed with a locking portion 31b that contacts a locking portion 32i of the inner core 32 in the direction of the axis line C. The locking portion 32i prevents the inner core 32 from being deviated toward the nozzle hole side with respect to the outer core 31 due to the collision of the inner core 32 with the guide member 60 and the like. In the inner peripheral surface of the non-press-fit region 312, a gap B3 from the inner core 32 is provided in a portion from the locking portion 31b to the boundary of the press-fit region 311. In other words, the gap B3 is located at the boundary between the press-fit region 311 and the non-press-fit region 312.

The gap B3 functions as a region for confining burrs generated when the inner core 32 is press-fitted into the outer core 31. Since the material of the outer core 31 is softer than that of the inner core 32, the burrs are generated on the press-fit surface 31p of the outer core 31. More specifically, the above-mentioned burrs are generated when the nozzle hole side end portion of the press-fit surface 32p of the inner core 32 scrapes off a part of the press-fit surface 31p of the outer core 31.

In the present embodiment, after the inner core 32 has been assembled to the outer core 31, the communication grooves 32e and the outer communication grooves 31e are provided by cutting or the like, and then the first core contact surface 32c and the second core contact surface 32b are ground. As a result, the positions of the first core contact surface 32c and the second core contact surface 32b in the axis line C are aligned.

Figure 39:
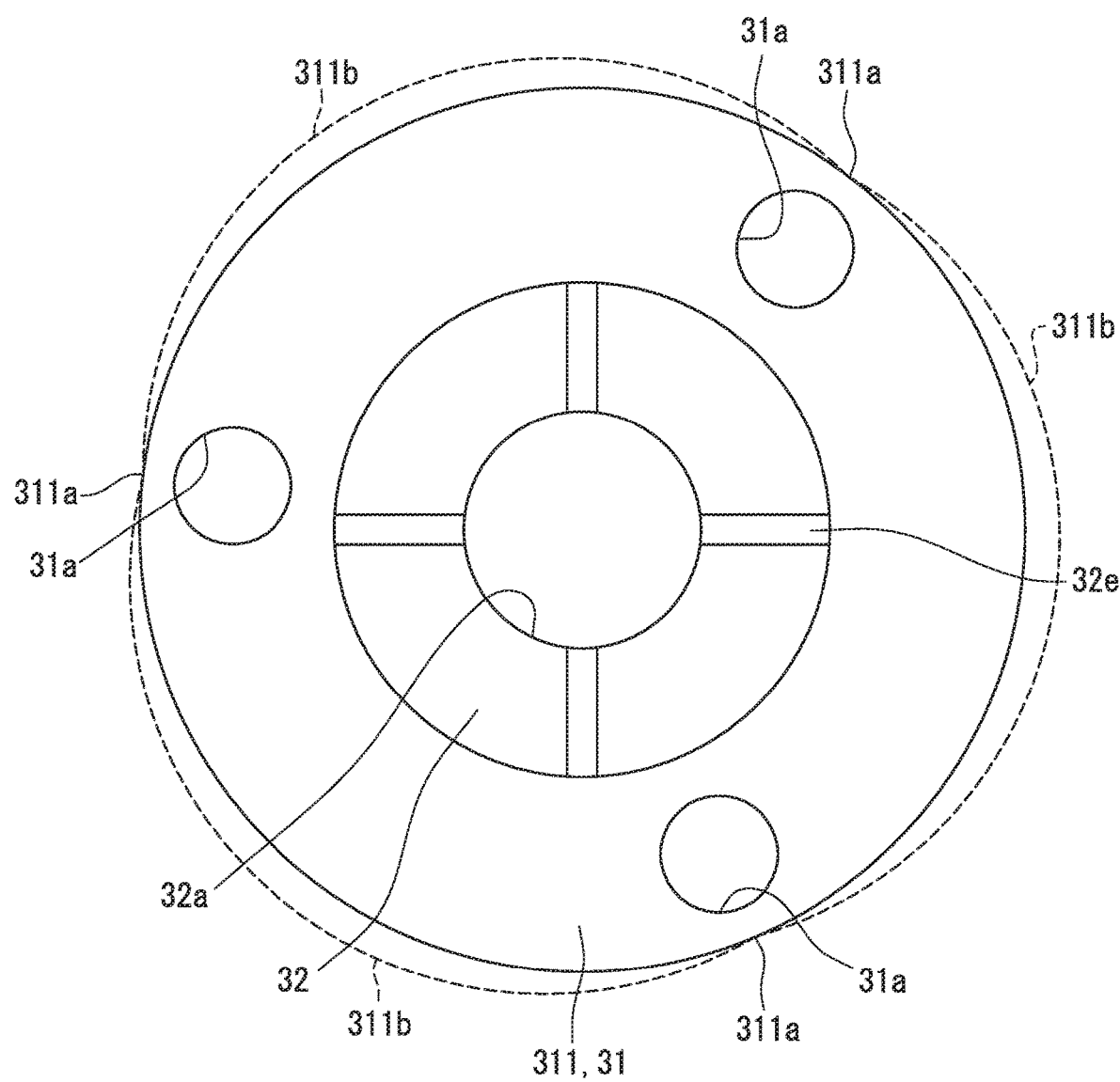
FIG. 39 is a top view of the needle shown in FIG. 38 as seen from the side opposite to the nozzle hole.

The outer peripheral surface of the outer core 31 indicated by a solid line in FIG. 39 shows a state before press-fitting with the inner core 32, and is circular (perfect circle) in a top view. On the other hand, in the state after the press-fit with the inner core 32, the outer peripheral surface of the press-fit region 311 of the outer core 31 expands outward in the radial direction as indicated by a dotted line in FIG. 39. However, a portion where the through holes 31a exist (small expansion portion 311a) is less likely to expand than a portion where the through holes 31a do not exist (large expansion portion 311b). Therefore, the outer peripheral surface of the press-fit region 311 after the press-fit deformation is not a perfect circle, and the large expansion portion 311b has a shape with a diameter larger than that of the small expansion portion 311a. In the state before press-fitting, the diameter of the outer peripheral surface of the press-fit region 311 is the same as that of the non-press-fit region 312. Therefore, in the state after the press-fit, the outer peripheral surface of the press-fit region 311 has a diameter larger than that of the outer peripheral surface of the non-press-fit region 312 (refer to FIG. 38).

The holder for movably accommodating the movable core 30 has the main body 12, which is a magnetic member having magnetism, and the non-magnetic member 14 adjacent to the main body 12 in the moving direction, and an end face of the main body 12 and an end face of the non-magnetic member 14 are welded to each other. A portion of the holder facing the outer peripheral surface of the press-fit region 311 is defined as a press-fit facing portion H1, and a portion of the holder facing the outer peripheral surface of the non-press-fit region 312 is defined as a non-press-fit facing portion H2. A minimum gap in the radial direction between the inner peripheral surface of the press-fit facing portion H1 and the outer peripheral surface of the press-fit region 311 is defined as a press-fit portion gap CL3, and a minimum gap in the radial direction between the inner peripheral surface of the non-press-fit facing portion H2 and the outer peripheral surface of the non-press-fit region 312 is defined as a non-press-fit portion gap CL4. A minimum inner diameter of the press-fit facing portion H1 is set to be larger than a minimum inner diameter of the non-press-fit facing portion H2 so that the press-fit portion gap CL3 is larger than the non-press-fit portion gap CL4.

The inner peripheral surface of the press-fit facing portion H1 has a shape extending in parallel with the moving direction of the movable core 30 (in the direction of the axis line C). The inner peripheral surface of the non-press-fit facing portion H2 has a parallel surface H2a extending in parallel with the moving direction, and a connection surface H2b connecting the inner peripheral surface of the press-fit facing portion H1 and the parallel surface H2a. The connection surface H2b has a shape in which the inner diameter gradually decreases toward the parallel surface H2a. Although a part of the main body 12 is included in the non-press-fit facing portion H2, the non-magnetic member 14 is not included in the non-press-fit facing portion H2, and the parallel surface H2a and the connection surface H2b are formed by the main body 12. In other words, the main body 12 has a shape having the parallel surface H2a and the connection surface H2b having different inner diameter dimensions. The non-press-fit portion gap CL4, which is the smallest gap between the non-press-fit facing portion H2 and the non-press-fit region 312, corresponds to a gap in the parallel surface H2a formed by the main body 12.

More specifically, a flow channel cross-sectional area defined by the press-fit portion gap CL3 is larger than a flow channel cross-sectional area defined by the non-press-fit portion gap CL4. Those flow channel cross-sectional areas are areas of a cross section perpendicular to the axis line C of the flow channel defined by the press-fit portion gap CL3 and CL4.

The inner peripheral surface H1a of the press-fit facing portion H1 has a shape extending in parallel with the moving direction. The press-fit facing portion H1 includes a part of the non-magnetic member 14 and a part of the main body 12. The non-magnetic member 14 is formed to have a uniform inner diameter dimension along the entire axis line C direction. The press-fit portion gap CL3, which is the smallest gap between the press-fit facing portion H1 and the press-fit region 311, corresponds to a gap at a portion of the main body 12 on the side opposite to the nozzle hole with respect to the connection surface H2b, or at the non-magnetic member 14.

When the movable core 30 attracted to the fixed core 13 is configured by press-fitting the inner core 32 for collision with the guide member 60 and the like and the outer core 31 for the magnetic circuit, the outer diameter of the outer core 31 is slightly expanded by the press-fitting. As a result, the gap between the inner peripheral surface of the holder accommodating the movable core 30 and the outer peripheral surface of the outer core 31 becomes small, and a flow resistance received by the movable core 30 from the fuel existing in the gap becomes large. Since it is difficult to manage the amount by which the outer diameter expands due to press-fitting, a machine difference variation occurs in the magnitude of the flow resistance, resulting in a variation in the moving speed of the movable core 30. As a result, the machine difference variation occurs in the valve opening responsiveness, resulting in a large variation in the injection amount.

On the other hand, the fuel injection valve 1 according to the present embodiment includes the needle 20 (valve body), the fixed core 13, the movable core 30, the main body 12 (holder) and the non-magnetic member 14 (holder), and the guide member 60 (stopper member). The movable core 30 has a cylindrical shape, and moves together with the needle 20 by the magnetic attraction force to open the nozzle holes 11a. The holder has a movable chamber 12a filled with fuel, and accommodates the movable core 30 in the movable chamber 12a in a movable state. The guide member 60 contacts the movable core 30 and restricts the movable core 30 from moving away from the nozzle holes 11a. The movable core 30 has the inner core 32 contacting the guide member 60, and the outer core 31 press-fitted into the outer peripheral surface of the inner core 32. The outer core 31 has the press-fit region 311 which is press-fitted into the outer peripheral surface of the inner core 32 in the moving direction of the movable core 30, and the non-press-fit region 312 which is not press-fit into the outer peripheral surface of the inner core 32 and is adjacent to the press-fit region 311 in the moving direction. Among the gaps between the inner peripheral surface of the holder and the outer peripheral surface of the movable core 30, the smallest gap CL3 in the press-fit region 311 is larger than the smallest gap CL4 in the non-press-fit region 312.

In this example, the flow resistance received by the movable core 30 from the fuel existing in the gap between the outer core outer peripheral surface and the holder inner peripheral surface is greatly influenced by the smallest gap when the size of the gap changes in accordance with the axial position. The gap CL3 in the press-fit region 311 in the gap between the inner peripheral surface of the holder and the outer peripheral surface of the movable cores is larger than the gap CL4 in the non-press-fit region 312. Therefore, contrary to the present embodiment, when the minimum gap CL3 in the press-fit region 311 is smaller than the minimum gap CL4 in the non-press-fit region 312, the flow resistance is greatly affected by the gap CL3 in the press-fit region 311. As a result, a large variation in the flow resistance between machines occurs. In contrast, according to the present embodiment, the minimum gap CL3 in the press-fit region 311 is larger than the minimum gap CL4 in the non-press-fit region 312. For that reason, the flow resistance can be inhibited from being affected by the gap CL3 in the press-fit regions 311, and the moving speed of the movable core 30 can be inhibited from varying. As a result, the machine difference variation in the valve opening response can be inhibited, and consequently, the injection amount variation can be reduced.

Further, in the fuel injection valve 1 according to the present embodiment, the inner peripheral surface H1a of the press-fit facing portion H1 has a shape extending in parallel with the moving direction. The inner peripheral surface of the non-press-fit facing portion H2 has a parallel surface H2a extending in parallel with the moving direction, and a connection surface H2b connecting the inner peripheral surface of the press-fit facing portion H1 and the parallel surface H2a. The connection surface H2b has a shape in which the inner diameter gradually decreases toward the parallel surface H2a.

A boundary between a portion (large expansion portion 311b) in which expansion is largely generated by press-fitting and a portion (small expansion portion 311a) in which expansion is hardly generated is gradually expanded. In view of the above circumstances, according to the present embodiment having the connection surface H2b whose inner diameter gradually decreases, the gap of the magnetic circuit provided by the portion of the connection surface H2b can be made as small as possible. As shown in FIG. 38, the connection surface H2b may have a tapered shape in which the inner diameter changes linearly gradually, a curved shape in which the inner diameter changes in a curved manner, or a stepped shape in which the inner diameter changes in a stepped manner.

Further, in the fuel injection valve 1 according to the present embodiment, the holder has the main body 12 (magnetic member) having magnetism, and the non-magnetic member 14 adjacent to the main body 12 in the moving direction, and the end face of the main body 12 and the end face of the non-magnetic member 14 are welded to each other. This makes it possible to carry out a step of making the inner diameter of the holder large or small and a step of removing a weld mark from the inner peripheral surface of the holder in a series of operations, thereby being capable of reducing a labor required for making the inner diameter of the holder large or small.

Further, in the fuel injection valve 1 according to the present embodiment, three or more through holes 31a penetrating in the moving direction are provided in the outer core 31 at regular intervals in the circumferential direction. According to the above configuration, there are three or more locations around the axial direction at regular intervals where the flow resistance received by the movable core 30 from the fuel in the movable chamber 12a is low. For that reason, when the movable core 30 moves in the direction of the axis line C, a change in the inclination direction of the movable core 30 with respect to the direction of the axis line C can be reduced. Therefore, since the behavior of the movable core 30 can be inhibited from becoming unstable, the variation in the valve opening response can be further reduced.

[Modification E1]

Figure 40:
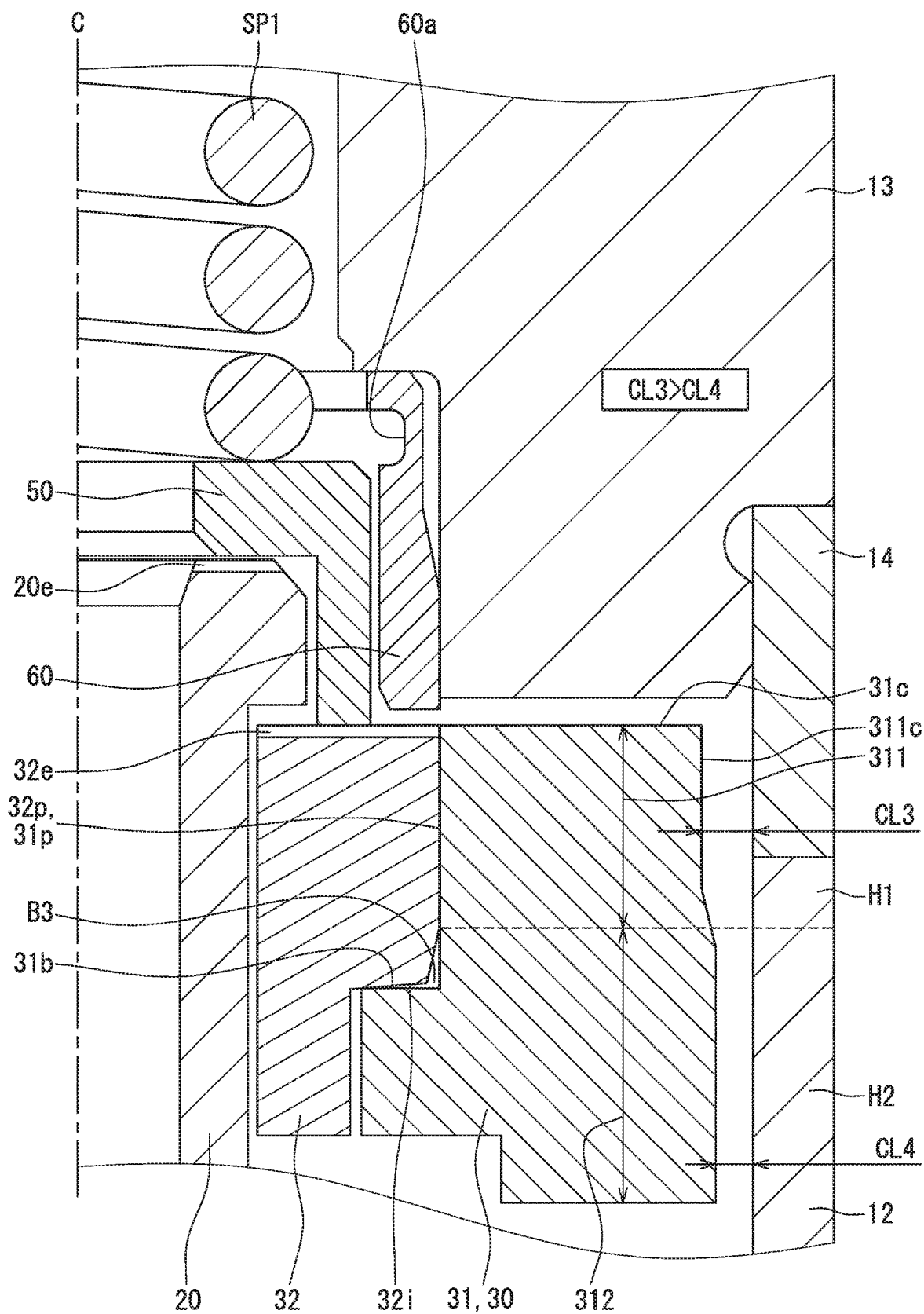
FIG. 40 is a sectional view showing Modification E1 with respect to FIG. 38.

In the present modification shown in FIG. 40, a maximum outer diameter of the outer core 31 in the press-fit region 311 is smaller than a maximum outer diameter of the outer core 31 in the non-press-fit region 312.

Specifically, the outer diameter of the press-fit region 311 is formed to be sufficiently smaller than the outer diameter of the non-press-fit region 312 before press-fitting, and the outer diameter of the press-fit region 311 is formed to be smaller than the outer diameter of the non-press-fit region 312 even when the press-fit region 311 is expanded by press-fitting. In short, in a state before press-fitting, the outer peripheral surface of the press-fit region 311 is cut to form a recess portion 311c, and a cutting depth of the recess portion 311c is set to be sufficiently large so that the recess portion 311c remains even after expansion due to press-fitting. In addition, an inner diameter dimension of the non-press-fit facing portion H2 is the same in the direction of the axis line C in the same manner as the press-fit facing portion H1.

As described above, since the outer peripheral surface of the press-fit region 311 is formed to be smaller than the non-press-fit region 312 and the inner peripheral surface of the non-press-fit facing portion H2 is formed to be the same as the press-fit facing portion H1, the press-fit portion gap CL3 is larger than the non-press-fit portion gap CL4. For that reason, the same effects as those of the fuel injection valve 1 shown in FIG. 39 are exhibited in the present modification.

[Modification E2]

Figure 41:
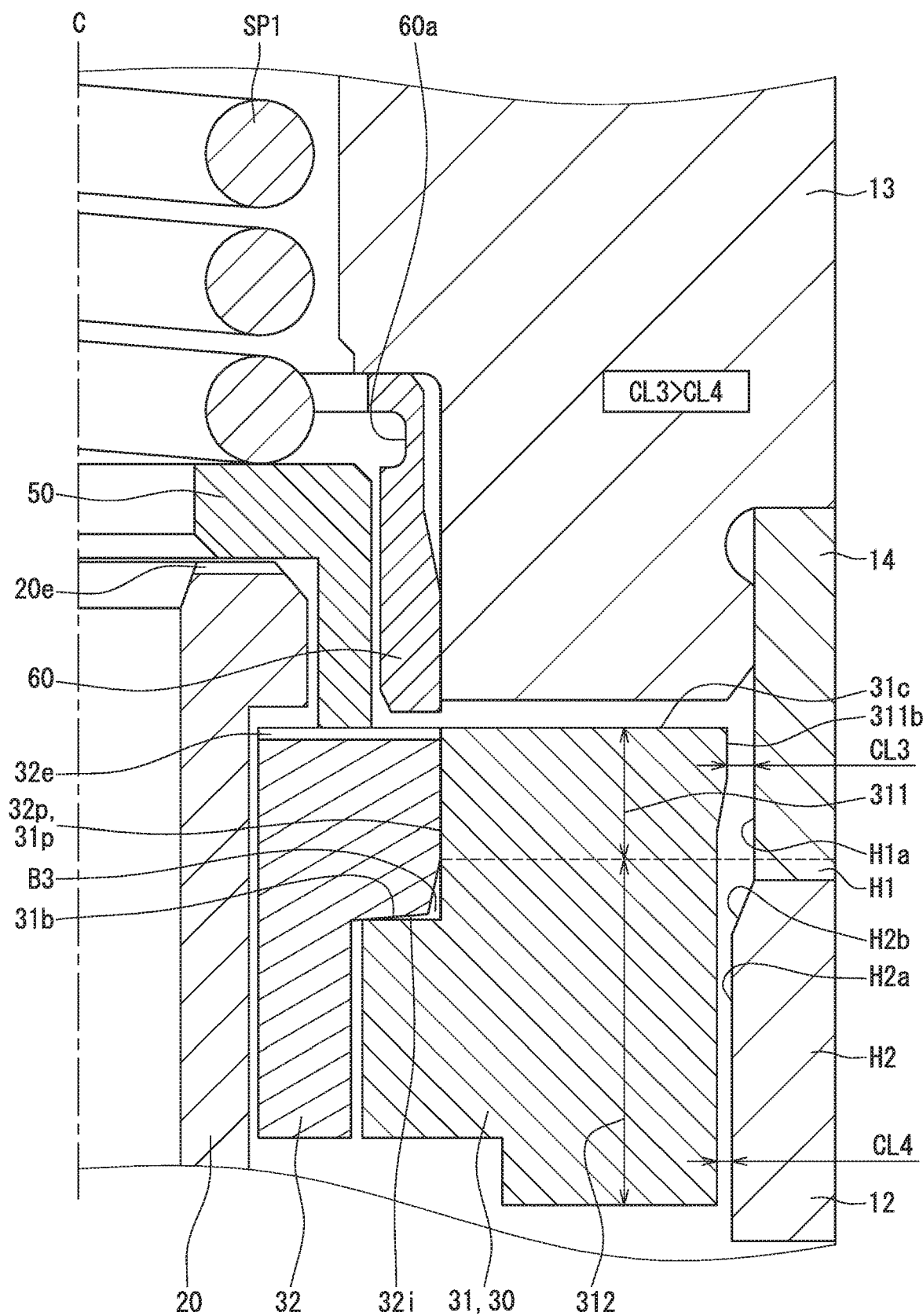
FIG. 41 is a sectional view showing Modification E2 with respect to FIG. 38.

In the present modification shown in FIG. 41, all of the press-fit facing portion H1 of the holder is made of the non-magnetic member 14, and the main body 12 is not included in the press-fit facing portion H1. For example, a length of the press-fit surfaces 31p and 32p in the direction of the axis line C is shortened as compared with the structure of FIG. 39, so that the entire press-fit facing portion H1 is made of the non-magnetic member 14. Alternatively, as compared with the structure of FIG. 39, the length of the non-magnetic member 14 in the direction of the axis line C is made longer, so that the entire press-fit facing portion H1 is made of the non-magnetic member 14. Also, in the present modification, since the press-fit portion gap CL3 is provided to be larger than the non-press-fit portion gap CL4, the same effects as those of the fuel injection valve 1 shown in FIG. 39 are exhibited.

[Modification E3]

Figure 42:
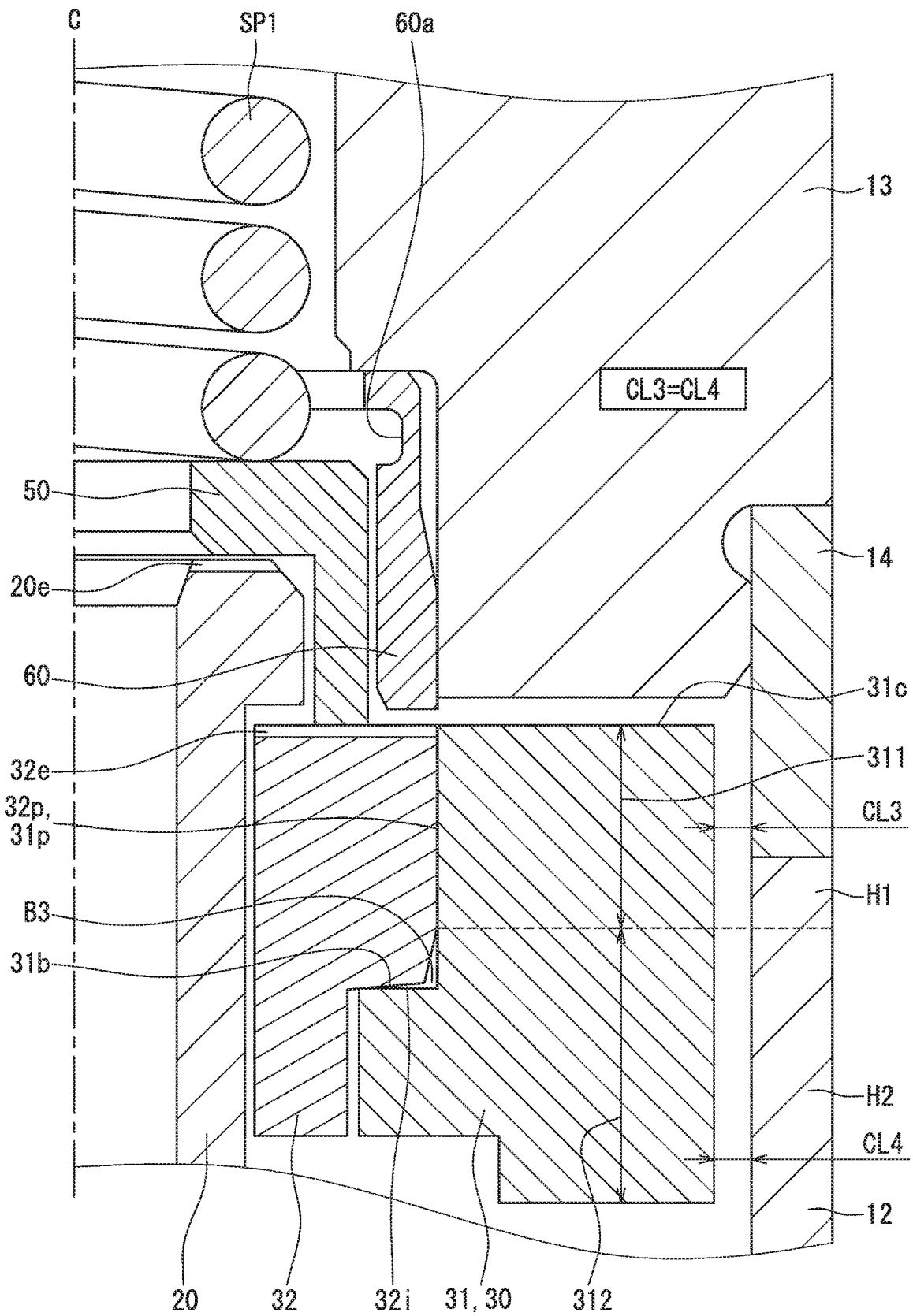
FIG. 42 is a sectional view showing Modification E3 with respect to FIG. 38.

In the present modification shown in FIG. 42, a portion of the press-fit region 311 which is expanded in the radial direction by press-fit is removed, and the maximum outer diameter of the outer core 31 in the press-fit region 311 is formed to be the same as the maximum outer diameter of the outer core 31 in the non-press-fit region 312.

More specifically, in a state before press-fitting with the inner core 32, the outer core 31 whose outer peripheral surface is circular (perfect circle) in a top view is prepared (preparation process) and is press-fitted with the inner core 32 (press-fitting process). Thereafter, the large expansion portion 311b (refer to FIG. 39) expanded by press-fitting is cut after press-fitting (cutting process), whereby the outer core 31 is formed so that the outer peripheral surface becomes circular (perfect circle) in the top view. The inner diameter dimensions of the press-fit facing portion H1 and the non-press-fit facing portion H2 are the same in the direction of the axis line C. Therefore, the press-fit portion gap CL3 and the non-press-fit portion gap CL4 are the same. Therefore, the same effects as those of FIG. 39 are exhibited by the present modification.

Second Embodiment

Figure 43:
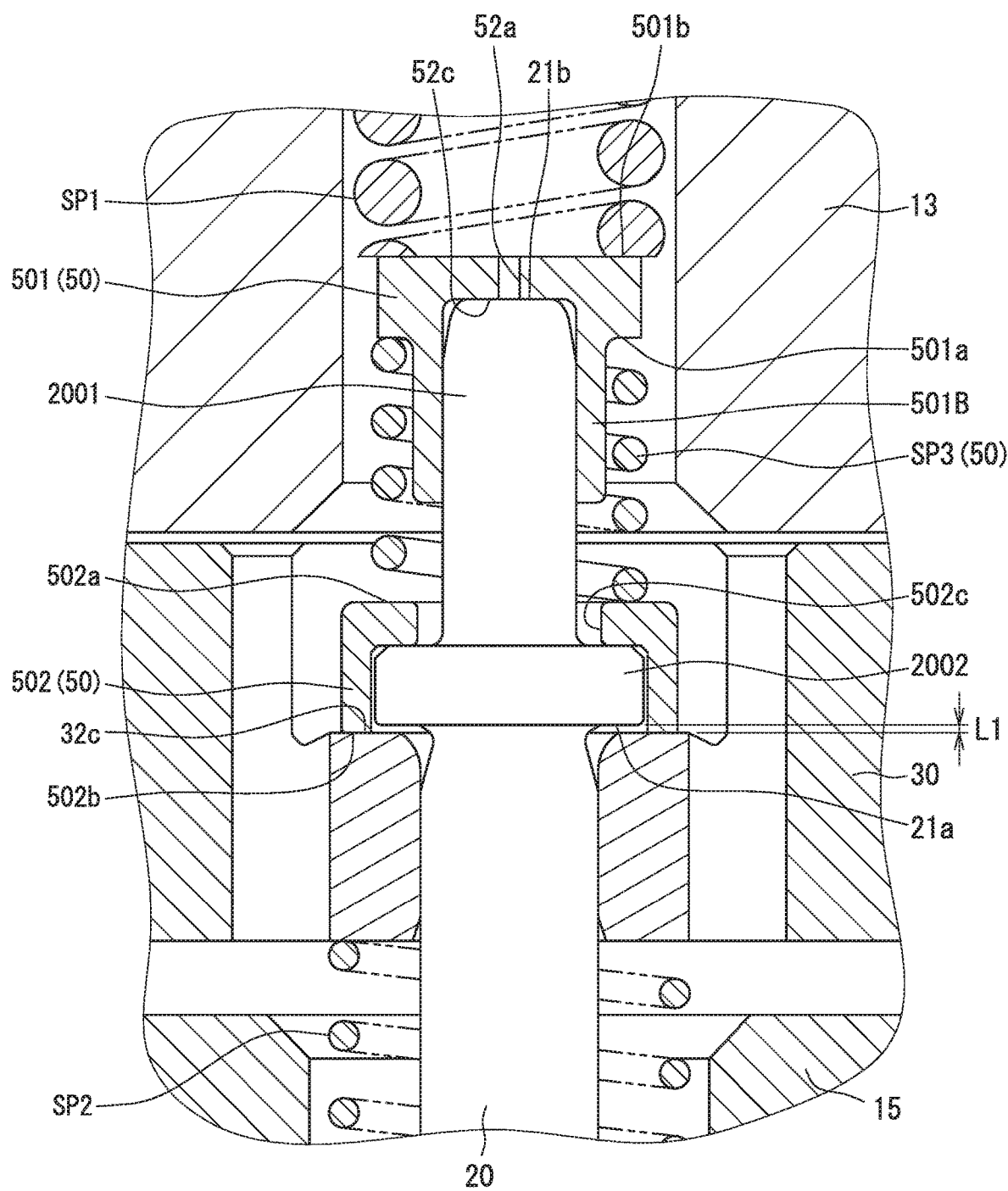
FIG. 43 is a sectional view of a fuel injection valve according to a second embodiment.

While the valve closing force transmission member according to the first embodiment is provided by the cup 50, a valve closing force transmission member according to the present embodiment is provided by a first cup 501, a second cup 502, and a third spring member SP3 (refer to FIG. 43) which will be described below. Except for the configuration to be described below, the configuration of a fuel injection valve according to the present embodiment is the same as the configuration of the fuel injection valve according to the first embodiment.

The first cup 501 contacts a first spring member SP1 and a needle 20, and transmits a valve closing elastic force by the first spring member SP1 to the needle 20. In short, the first cup 501 exhibits the same function as the circular plate portion 52 of the cup 50 according to the first embodiment. The first cup 501 is formed with a through hole 52a similar to that of the first embodiment.

The third spring member SP3 is an elastic member that is elastically deformed in the axial direction to exert an elastic force. One end of the third spring member SP3 contacts a contact surface 501a of the first cup 501, and the other end of the third spring member SP3 contacts a contact surface 502a of the second cup 502. As a result, the third spring member SP3 is sandwiched between the first cup 501 and the second cup 502 and is elastically deformed in the axial direction, and exhibits an elastic force due to the elastic deformation.

The second cup 502 contacts the movable core 30 during the valve closing operation to urge the movable core 30 toward the nozzle holes. In short, the second cup 502 exhibits the same function as that of the cylindrical portion 51 of the cup 50 according to the first embodiment. The third spring member SP3 exerts a function of transmitting a force in the axial direction between the first cup 501 and the second cup 502.

The needle 20 has a main body portion 2001 and an enlarged diameter portion 2002. A valve closing contact surface 21b is formed at an end of the main body portion 2001 on the side opposite to the nozzle holes. The valve closing contact surface 21b contacts a valve closing force transmission contact surface 52c of the valve closing force transmission member (first cup 501) in the same manner as in the first embodiment.

The enlarged diameter portion 2002 is located closer to the nozzle hole side than the valve closing contact surface 21b, and has a circular plate shape in which a diameter of the main body portion 2001 is enlarged. A valve opening contact surface 21a is formed on a surface of the nozzle hole side of the enlarged diameter portion 2002. The valve opening contact surface 21a contacts the first core contact surface 32c of the movable core 30 in the same manner as in the first embodiment. A length of a gap between the valve opening contact surface 21a and the first core contact surface 32c in the direction of the axis line C in a valve close state corresponds to a gap L1 according to the first embodiment.

In a state immediately after the energization of a coil 17 has been switched from OFF to ON, a magnetic attraction force acts on the movable core 30 to start the movement of the movable core 30 toward the valve opening side. Then, when the movable core 30 moves while pushing up the second cup 502 and the moving amount reaches the gap L1, the first core contact surface 32c of the movable core 30 collides with the valve opening contact surface 21a in the needle 20.

In the present embodiment, the guide member 60 is eliminated, and the movable core 30 contacts the fixed core 13, thereby regulating the valve opening operation amount of the needle 20. When the movable core 30 collides with the needle 20 as described above, a gap is provided between the fixed core 13 and the movable core 30, and the length of the gap in the direction of the axis line C corresponds to a lift L2 of the first embodiment.

The elastic force of the first spring member SP1 also acts on the needle 20 until the time of the collision. After the collision, the movable core 30 continues to move further by the magnetic attraction force, and when the movement amount after the collision reaches a lift L2, the movable core 30 collides with the fixed core 13 and stops moving. A separation distance between the body-side seat 11s and the valve body-side seat 20s in the direction of the axis line C at the time of stopping the movement corresponds to a full lift of the needle 20, and corresponds to the lift L2 described above.

Third Embodiment

Figure 44:
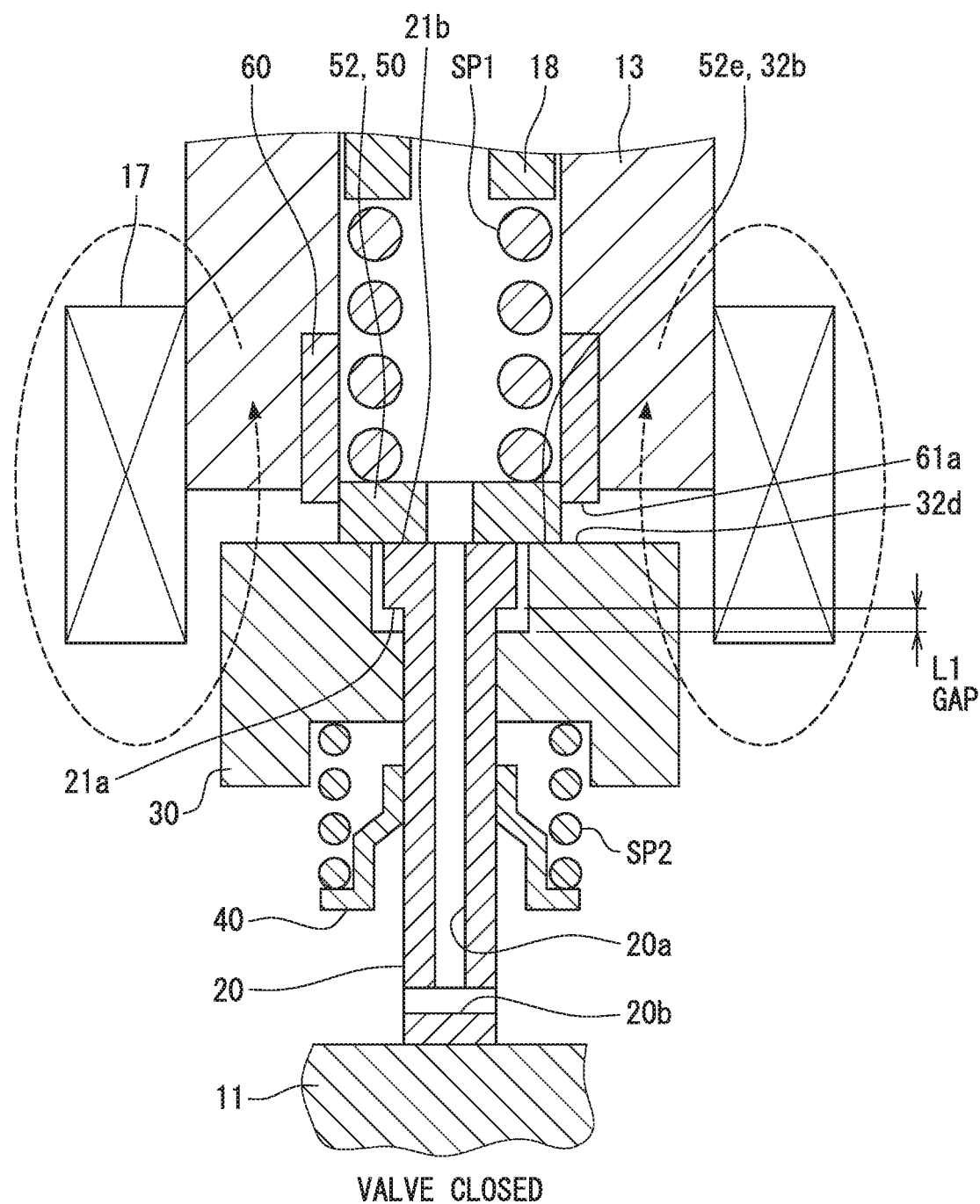
FIG. 44 is a sectional view of a fuel injection valve according to a third embodiment.

The valve closing force transmission member (cup 50) according to the first embodiment has the cup shape having the cylindrical portion 51 and the circular plate portion 52. On the other hand, a valve closing force transmission member according to the present embodiment has a circular plate shape configured by a circular plate portion 52 in which the cylindrical portion 51 is eliminated (refer to FIG. 44). Except for the configuration to be described below, the configuration of a fuel injection valve according to the present embodiment is the same as the configuration of the fuel injection valve according to the first embodiment.

In the first embodiment, a surface (core contact end face 51a) of the valve closing force transmission member, with which the contact surface (second core contact surface 32b) of the movable core 30 is in contact, is formed in the cylindrical portion 51. On the other hand, in the present embodiment, a surface of the circular plate portion 52 on the nozzle hole side functions as a core contact end face 52e (refer to FIG. 44) that contacts the movable core 30.

Other Embodiments

The disclosure herein is not limited to the combinations of components and/or elements shown in the embodiments. The disclosure may have additional portions that may be added to the embodiments. The disclosure encompasses omission of components and/or elements of the embodiments. The disclosure encompasses the replacement or combination of components and/or elements between one embodiment and another. For example, the fuel injection valve 1 according to the first embodiment includes all of the configuration groups A, B, C, D, and E, but may be a fuel injection valve having any combination of the configuration groups A, B, C, D, and E.

In the first embodiment, the temporary press-fitting is performed once as shown in FIG. 6, but the load measurement may be performed for each temporary press-fitting by performing the temporary press-fitting twice or more. According to the above configuration, the setting of the second set load to the target value can be realized with a high accuracy. In addition, since the load is measured every multiple of temporary press-fitting operations, the elastic modulus of the second spring member SP2 can be measured, and the degree of press-fitting in this press-fitting operation can be calculated with a high accuracy.

In the press-fitting operation shown in FIG. 6, the second set load is measured in a state where the progress of the press-fitting is stopped and the press-fitting is stopped, but the second set load may be measured while the press-fitting is performed. In other words, the press-fitting is performed while measuring the second set load, and the press-fitting is stopped and completed when the measured second set load reaches the target value.

In the press-fitting operation shown in FIG. 6, the second set load is measured while the cup 50 in the state of contacting the needle restricts the movement of the movable core 30, but the second set load may be measured while the contact portion 21 of the needle 20 restricts the movement of the movable core 30.

The communication grooves 32e shown in FIG. 12 are provided on the third core contact surface 32d in addition to the first core contact surface 32c and the second core contact surface 32b, but may not be provided on the third core contact surface 32d. Although the communication grooves 32e shown in FIG. 12 are provided over the entire area of the first core contact surface 32c in the radial direction, it is sufficient that the communication grooves 32e are provided in at least a portion of the first core contact surface 32c adjacent to the second core contact surface 32b.

Although the outer communication grooves 31e shown in FIG. 16 are disposed so as not to communicate with the through holes 31a, the outer communication grooves 31e may be disposed so as to communicate with the through holes 31a. The communication grooves 32g shown in FIG. 19 are provided across the first core contact surface 32c, the second core contact surface 32b, and the third core contact surface 32d, but may not be provided on the third core contact surface 32d.

Figure 21:
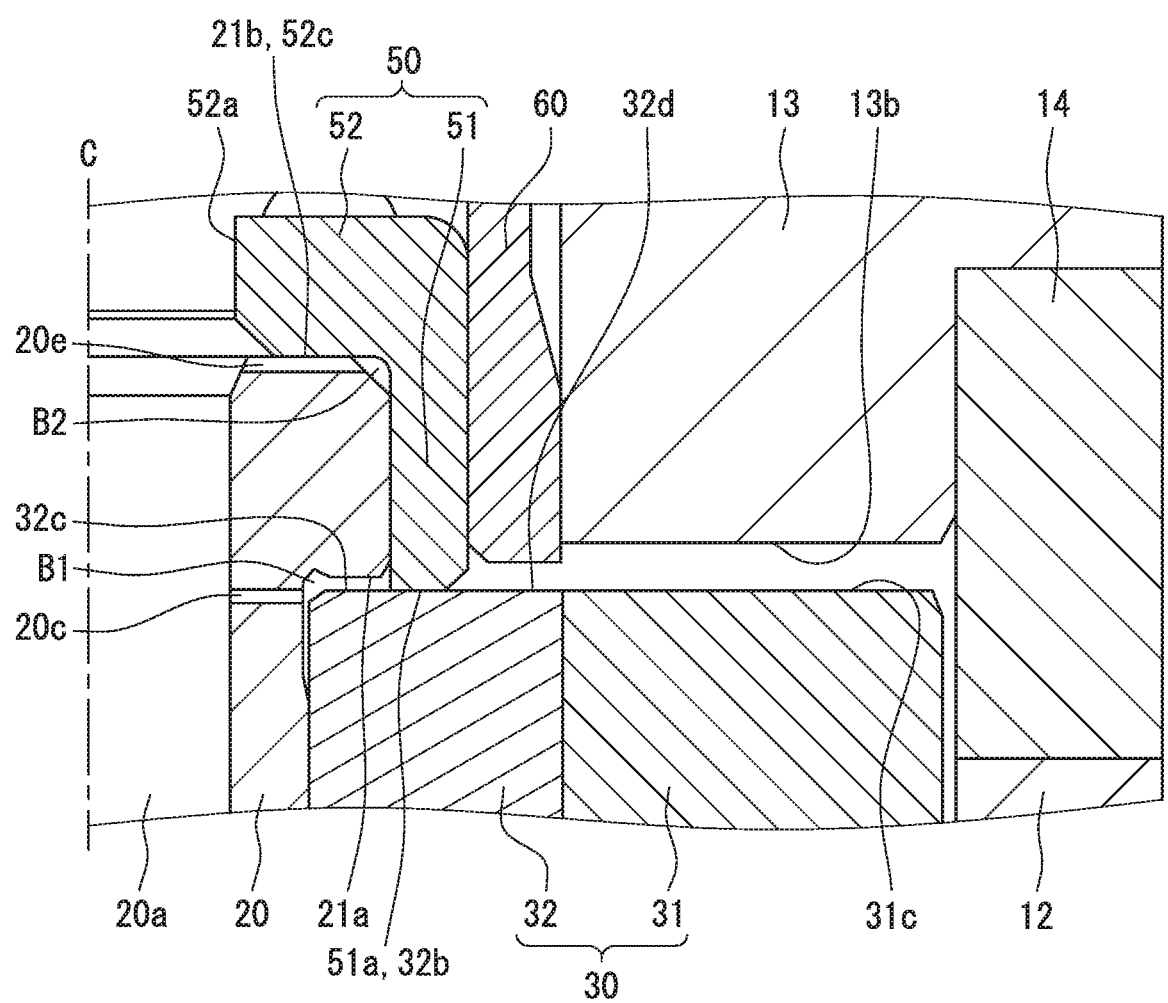
FIG. 21 is a sectional view showing Modification B4 with respect to FIG. 12.

In the examples of FIGS. 21, 22, and 23, the communication grooves 32e are eliminated, and instead of the communication grooves 32e, the communication holes 20c, the sliding surface communication grooves 20d, and the second sliding surface communication grooves 32h are provided. On the other hand, the fuel injection valve 1 may include any two or more of the communication grooves 32e, the communication holes 20c, the sliding surface communication grooves 20d, and the second sliding surface communication grooves 32h.

Although the sliding surface communication grooves 20d are provided in the needle 20 in an example of FIG. 22, the sliding surface communication grooves may be provided in the transmission member-side sliding surface 51c (refer to FIG. 22) of the cup 50 on which the needle 20 slides. In an example of FIG. 23, the second sliding surface communication grooves 32h is formed in the inner core 32, but the second sliding surface communication groove may be provided in the surface of the needle 20 that slides with the inner core 32.

In an example of FIG. 24, the main flow channels 20e for supplying the fuel to the valve closing contact surface 21b in a state of contacting the cup 50 are provided by the grooves provided in the needle 20, but may be provided by grooves provided in the cup 50. Specifically, the supply flow channel may be provided by providing grooves in the core contact end face 51a of the cylindrical portion 51.

In the first embodiment, the movable portion M is supported in the radial direction at two points of the needle 20, that is, the portion facing the inner wall surface 11c of the nozzle hole body 11 (the needle tip portion), and the outer peripheral surface 51d of the cup 50. On the other hand, the movable portion M may be supported from the radial direction at two positions, that is, the outer peripheral surface of the movable core 30 and the needle tip portion.

In the first embodiment, the inner core 32 is made of a nonmagnetic material, but may be made of a magnetic material. When the inner core 32 is made of a magnetic material, the inner core 32 may be made of a weak magnetic material that is weaker in magnetism than the outer core 31. Similarly, the needle 20 and the guide member 60 may be made of a weak magnetic material that is weaker than the outer core 31.

In the first embodiment, the cup 50 is interposed between the first spring member SP1 and the movable core 30 in order to realize a core boost structure in which the movable core 30 contacts the needle 20 to start the valve opening operation when the movable core 30 moves by a predetermined distance. On the other hand, the cup 50 may be eliminated, and a core boost structure in which a third spring member different from the first spring member SP1 is provided, and the movable core 30 is urged toward the nozzle hole by the third spring member may be employed.

In the first embodiment, in order to avoid a magnetic short circuit between the fixed core 13 and the main body 12, the non-magnetic member 14 is disposed between the fixed core 13 and the main body 12. Instead of the non-magnetic member 14, a magnetic member having a shape having a magnetic throttle portion for inhibiting the magnetic short-circuit may be disposed between the fixed core 13 and the main body 12. Alternatively, the non-magnetic member 14 may be eliminated, and a magnetic throttle portion for inhibiting the magnetic short circuit may be formed in the fixed core 13 or the main body 12.

The sleeve 40 according to the first embodiment has a shape in which the connection portion 42 extends on the upper side of the support portion 43 (on the side opposite to the nozzle holes) and the insertion cylindrical portion 41 extends on the upper side of the connection portion 42. On the other hand, the sleeve 40 may have a shape in which the connection portion 42 extends below the support portion 43 (on the nozzle hole side) and the insertion cylindrical portion 41 further extends below the connection portion 42. The sleeve 40 may also be a hollow shaped ring extending annularly around the needle 20. In this instance, the upper surface of the ring supports the second spring member SP2, and the inner peripheral surface of the ring is press-fitted into the press-fit portion 23.

The cup 50 according to the first embodiment has the cup shape having the circular plate portion 52 and the cylindrical portion 51. On the other hand, the cup 50 may have a flat plate shape. In this instance, the upper surface (upper surface) of the flat plate contacts the first spring member SP1, and the lower surface (lower surface) of the flat plate contacts the movable core 30.

The support member 18 according to the first embodiment has the cylindrical shape, but may have a C-shaped cross-sectional shape in which a slit extending in the direction of the axis line C is provided in a cylindrical shape.

The movable core 30 according to the first embodiment has the structure having two parts, that is, the outer core 31 and the inner core 32. The inner core 32 is made of a material having a higher hardness than the outer core 31, and has a surface that contacts the cup 50 and the guide member 60, and a surface that slides with the needle 20. On the other hand, the movable core 30 may have a structure in which the inner core 32 is eliminated.

When the movable core 30 has the structure in which the inner core 32 is eliminated as described above, it is preferable that the contact surface of the movable core 30 that contacts the cup 50 and the guide member 60 and the sliding surface that slides with the needle 20 are plated. One specific example of plating applied to the contact surface is chromium. One specific example of plating applied to the sliding surface is nickel phosphorus.

The fuel injection valve 1 according to the first embodiment has the structure in which the movable core 30 contacts the guide member 60 attached to the fixed core 13. On the other hand, the movable core 30 may contact the fixed core 13 in which the guide member 60 is eliminated. In short, the inner core 32 may contact the guide member 60, or the inner core 32 may contact the fixed core 13 in which the guide member 60 is eliminated. Further, the structure may be applied in which the movable core 30 in which the inner core 32 is abolished contacts the guide member 60, or the structure may be applied in which the movable core 30 in which the inner core 32 is abolished contacts the fixed core 13 in which the guide member 60 is abolished.

In the case where the movable core 30 has the structure in which the inner core 32 is eliminated as described above, the surface of the movable core 30 on the side opposite to the nozzle hole, which contacts the needle 20, corresponds to the first core contact surface 32c. Further, in the case of the structure in which the guide member 60 is eliminated as described above, the surface of the movable core 30 that contacts the fixed core 13 corresponds to the third core contact surface 32d.

In the first embodiment, the communication grooves 32e are provided in the portion of the inner core 32 which contacts the guide member 60. On the other hand, in the case of the structure in which the guide member 60 is eliminated as described above, the communication grooves 32e are provided in the portion of the inner core 32 which contacts the fixed core 13. When the movable core 30 has the structure in which the inner core 32 is eliminated as described above, the communication grooves 32e are provided in the portion of the movable core 30 which contacts the fixed core 13.

The cup 50 according to the first embodiment slides in the direction of the axis line C while contacting the inner peripheral surface of the guide member 60. On the other hand, the cup 50 may be configured to move in the direction of the axis line C while defining a predetermined gap with the inner peripheral surface of the guide member 60.

In the first embodiment, the inner peripheral surface of the second spring member SP2 is guided by the connection portion 42 of the sleeve 40. On the other hand, the outer peripheral surface of the second spring member SP2 may be guided by the outer core 31.

In the first embodiment, one end of the second spring member SP2 is supported by the movable core 30, and the other end of the second spring member SP2 is supported by the sleeve 40 attached to the needle 20. On the other hand, the sleeve 40 may be eliminated, and the other end of the second spring member SP2 may be supported by the main body 12.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A fuel injection valve comprising:
   a valve body that opens and closes a nozzle hole for injecting a fuel;
   a fixed core that generates a magnetic attraction force upon energization of a coil;
   a movable core that is attracted and moved by the fixed core, the movable core coming into contact with a valve opening contact surface of the valve body when the movable core is moved by a predetermined distance to cause the valve body to start a valve opening operation;
   a spring that is elastically deformed by the valve opening operation of the valve body and exerts a valve closing elastic force that causes the valve body to perform a valve closing operation; and
   a cup that transmits the valve closing elastic force to the valve body by contacting a valve closing contact surface of the valve body, wherein
   the cup is in contact with the valve closing contact surface at a start of the predetermined-distance-movement of the movable core together with the cup,
   the valve closing contact surface of the valve body has a groove forming a supply flow channel that supplies the fuel to the valve closing contact surface which is in a state contacting the cup,
   the cup has a through hole which is a part of a flow channel through which the fuel flows to the nozzle hole,
   the supply flow channel is directly connected to the through hole when the valve body contacts the valve closing contact surface;
   the valve closing contact surface is formed in a region extending annularly in a view from a moving direction of the movable core, and
   the supply flow channel has a main flow channel extending across the region to connect an annularly inner side and an annularly outer side of the region.

2. The fuel injection valve according to claim 1, wherein
   the valve body has an internal passage through which the fuel is configured to flow toward the nozzle hole,
   an outer peripheral surface of the valve body functions as a wall surface of a passage through which the fuel flows toward the nozzle hole, and
   the main flow channel extends to connect an inner peripheral surface defining the internal passage and the outer peripheral surface of the valve body.

3. The fuel injection valve according to claim 1, wherein the main flow channel is one of a plurality of main flow channels, and
   the plurality of main flow channels are arranged at regular intervals in a circumferential direction in the view from the moving direction of the movable core.

4. The fuel injection valve according to claim 1, wherein the supply flow channel has a branch flow channel branching from the main flow channel.

5. The fuel injection valve according to claim 4, wherein the branch flow channel has a shape annularly extending in the view from the moving direction of the movable core.

6. The fuel injection valve according to claim 1, wherein
   the main flow channel includes a straight portion extending linearly in the view from the moving direction of the movable core, and an inflow portion communicating with the straight portion and having a fuel inflow port, and
   a flow channel cross section of the inflow portion has a shape larger in area than a flow channel cross section of the straight portion.

7. The fuel injection valve according to claim 1, wherein a depth dimension of the groove forming the supply flow channel is larger than a width dimension of the groove.

8. The fuel injection valve according to claim 1, wherein
   the valve body includes a sliding surface on which the valve closing force transmission member slides, and
   the sliding surface has a communication groove that communicates with the supply fuel channel.

9. The fuel injection valve according to claim 1, wherein
   the cup has a cylindrical portion that slides on the valve body,
   the movable core includes a core contact surface that contacts an end face of the cylindrical portion,
   the core contact surface has a communication groove, and
   when the valve body contacts the valve closing contact surface, and the cylindrical portion contacts the core contact surface, an inner peripheral side and an outer peripheral side of the cylindrical portion communicate with each other through the communication groove.

10. A fuel injection valve comprising:
    a valve body that opens and closes a nozzle hole for injecting a fuel;
    a fixed core that generates a magnetic attraction force upon energization of a coil;
    a movable core that is attracted and moved by the fixed core, the movable core coming into contact with a valve opening contact surface of the valve body when the movable core is moved by a predetermined distance to cause the valve body to start a valve opening operation;
    a spring that is elastically deformed by the valve opening operation of the valve body and exerts a valve closing elastic force that causes the valve body to perform a valve closing operation; and
    a cup that transmits the valve closing elastic force to the valve body by contacting a valve closing contact surface of the valve body, wherein
    the cup is in contact with the valve closing contact surface at a start of the predetermined-distance movement of the movable core together with the cup,
    the valve body has a groove forming a supply flow channel that supplies the fuel to the valve closing contact surface which is in a state contacting the cup,
    the cup has a through hole which is a part of a flow channel through which the fuel flows to the nozzle hole,
    the supply flow channel is directly connected to the through hole when the valve body contacts the valve closing contact surface,
    the cup has a cylindrical portion that slides on the valve body, the movable core includes a core contact surface that contacts an end face of the cylindrical portion, the valve body includes a sliding surface on which the valve closing force transmission member slides, and the sliding surface has a communication groove that communicates with the supply fuel channel.

11. A fuel injection valve comprising:

a valve body that opens and closes a nozzle hole for injecting a fuel;

a fixed core that generates a magnetic attraction force upon energization of a coil;

a movable core that is attracted and moved by the fixed core, the movable core coming into contact with a valve opening contact surface of the valve body when the movable core is moved by a predetermined distance to cause the valve body to start a valve opening operation;

a spring that is elastically deformed by the valve opening operation of the valve body and exerts a valve closing elastic force that causes the valve body to perform a valve closing operation; and a cup that transmits the valve closing elastic force to the valve body by contacting a valve closing contact surface of the valve body, wherein the cup is in contact with the valve closing contact surface at a start of the predetermined-distance movement of the movable core together with the cup, the valve body has a groove forming a supply flow channel that supplies the fuel to the valve closing contact surface which is in a state contacting the cup, the cup has a through hole which is a part of a flow channel through which the fuel flows to the nozzle hole, the supply flow channel is directly connected to the through hole when the valve body contacts the valve closing contact surface, the cup has a cylindrical portion that slides on the valve body, the movable core includes a core contact surface that contacts an end face of the cylindrical portion, the core contact surface has a communication groove, and when the valve body contacts the valve closing contact surface, and the cylindrical portion contacts the core contact surface, an inner peripheral side and an outer peripheral side of the cylindrical portion communicate with each other through the communication groove.

\* \* \* \* \*